US009159128B2

(12) United States Patent
Madabhushi et al.

(10) Patent No.: US 9,159,128 B2
(45) Date of Patent: Oct. 13, 2015

(54) ENHANCED MULTI-PROTOCOL ANALYSIS VIA INTELLIGENT SUPERVISED EMBEDDING (EMPRAVISE) FOR MULTIMODAL DATA FUSION

(75) Inventors: Anant Madabhushi, South Plainfield, NJ (US); Satish Viswanath, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 143 days.

(21) Appl. No.: 13/978,812

(22) PCT Filed: Jan. 13, 2012

(86) PCT No.: PCT/US2012/021373
§ 371 (c)(1),
(2), (4) Date: Oct. 15, 2013

(87) PCT Pub. No.: WO2012/097336
PCT Pub. Date: Jul. 19, 2012

(65) Prior Publication Data
US 2014/0037172 A1 Feb. 6, 2014

Related U.S. Application Data

(60) Provisional application No. 61/432,234, filed on Jan. 13, 2011, provisional application No. 61/435,205, filed on Jan. 21, 2011.

(51) Int. Cl.
*G06K 9/00* (2006.01)
*G06T 7/00* (2006.01)
*G06K 9/62* (2006.01)

(52) U.S. Cl.
CPC .......... *G06T 7/0012* (2013.01); *G06K 9/6232* (2013.01); *G06K 9/6251* (2013.01); *G06K 9/6256* (2013.01); *G06K 2209/051* (2013.01)

(58) Field of Classification Search
None
See application file for complete search history.

(56) References Cited

U.S. PATENT DOCUMENTS

| 2008/0114564 A1 | 5/2008 | Ihara |
| 2008/0118124 A1 | 5/2008 | Madabhushi et al. |
| 2010/0293194 A1 | 11/2010 | Andersen et al. |

FOREIGN PATENT DOCUMENTS

WO 2009/105530 A2 8/2009

OTHER PUBLICATIONS

Madabhushi et al. "Computer-Aided Prognosis: Predicting Patient and Disease Outcome via Multi-ModelImage Analysis." IEEE International Symposim on Biomedical Imaging [online], 2010 [Retrieved on Apr. 19, 2012], pp. 1415-1418, Retrieved from the Internet: <URL: http://www.biomedicalimaging.org/archive/2010/>.

Madabhushi et al. "Computer-aided prognosis: Predicting patient and disease outcome via quantitative fusion of multi-scale, multi-modal data." Computerized Medical Imaging and Graphics [online], Epub Feb. 17, 2011 [Retrieved on Apr. 19, 2012], vol. 35, Iss. 7-8, pp. 506? 514, Retrieved from the Internet: <URL: http://www.ncbi.nlm.nih.gov/pubmed/21333490>.

*Primary Examiner* — Siamak Harandi
(74) *Attorney, Agent, or Firm* — Fox Rothschild LLP

(57) ABSTRACT

The present invention provides a system and method for analysis of multimodal imaging and non-imaging biomedical data, using a multi-parametric data representation and integration framework. The present invention makes use of (1) dimensionality reduction to account for differing dimensionalities and scale in multimodal biomedical data, and (2) a supervised ensemble of embeddings to accurately capture maximum available class information from the data.

17 Claims, 12 Drawing Sheets

(a)  (b)  (c)  (d)  (e)  (f)  (g)

(h)

ENHANCED MULTI-PROTOCOL ANALYSIS VIA INTELLIGENT SUPERVISED EMBEDDING (EMPRAVISE) FOR MULTIMODAL DATA FUSION

CROSS-REFERENCE TO RELATED APPLICATIONS

This application is the U.S. National Phase of International Patent Application Serial No. PCT/US12/21373, filed Jan. 13, 2012, which claims priority from U.S. provisional patent application Ser. No. 61/432,234, entitled "Enhanced multi-protocol analysis via intelligent supervised embedding (EMPRAVISE) for multimodal data fusion", filed Jan. 13, 2011, and U.S. provisional patent application Ser. No. 61/435,205, entitled "Enhanced multi-protocol analysis via intelligent supervised embedding (EMPRAVISE) for multimodal data fusion", filed Jan. 21, 2011, The disclosure of each of these applications is incorporated herein by reference in its entirety.

STATEMENT OF GOVERNMENT FUNDING

This invention was made with government support from the National Institute of Health under grant numbers R01CA136535, R01CA140772 and R03CA143991. The government has certain rights in the invention.

FIELD OF THE INVENTION

This invention relates to analysis of multi-channel biomedical data in imaging and non-imaging protocols used in classification and prediction of disease outcome.

BACKGROUND OF THE INVENTION

1. Ensemble Embedding

The analysis and classification of high-dimensional biomedical data has been significantly facilitated via the use of dimensionality reduction techniques, which allow classifier schemes to overcome issues such as the curse of dimensionality. This is an issue where the number of variables (features) is disproportionately large compared to the number of training instances (objects) (Bellman R: Adaptive control processes: a guided tour. Princeton University Press, 1961). Dimensionality reduction (DR) involves the projection of data originally represented in an N-dimensional (N-D) space into a lower n-dimensional (n-D) space (known as an embedding) such that n<<N. DR techniques are broadly categorized as linear or non-linear, based on the type of projection method used.

Linear DR techniques use simple linear projections and consequently linear cost functions. An example of a linear DR scheme is Principal Component Analysis (PCA) (Jollife I: Principal Component Analysis. Springer, 2002), which projects data objects onto the axes of maximum variance. However, maximizing the variance within the data best preserves class discrimination only when distinct separable clusters are present within the data, as shown in Lin, T. et al. (IEEE Transactions on Pattern Analysis and Machine Intelligence 30(5):796-809, 2008). In contrast, non-linear DR involves a non-linear mapping of the data into a reduced dimensional space. Typically these methods attempt to project data so that relative local adjacencies between high dimensional data objects, rather than some global measure such as variance, are best preserved during data reduction from N- to n-D space (Lee, G. et al., IEEE/ACM Transactions on Computational Biology and Bioinformatics, 5(3):1-17, 2008). This tends to better retain class-discriminatory information and may also account for any non-linear structures that exist in the data (such as manifolds), as illustrated in Saul, L et al. (Journal of Machine Learning Research, 4:119-155, 2003). Examples of these techniques include locally linear embedding (Saul, L. and Roweis, S., Journal of Machine. Learning Research, 4:119-155, 2003) (LLE), graph embedding (GE)(Shi, J. and Malik, J. IEEE Transactions on Pattern Analysis and Machine Intelligence 22(8):888-905, 2000), and isometric mapping (ISOMAP) (Tenenbaum, J. et al., Science 290(5500):2319-2323, 2000). Recent work has shown that in several scenarios, classification accuracy may be improved via the use of non-linear DR schemes (rather than linear DR) for gene-expression data (Lee, G. et al., IEEE/ACM Transactions on Computational Biology and Bioinformatics, 5(3):1-17, 2008; Dawson K, et al., BMC Bioinformatics, 6:195, 2005) as well as medical imagery (Madabhushi, A. et al., In Proc. 8th Int'l Conf. Medical Image Computing and Computer-Assisted Intervention (MICCAI), Volume 8(1), 729-737, 2005; Varini, C. et al., Biomedical Signal Processing and Control 1:56-63, 2006).

However, typical DR techniques such as Principal Component Analysis (PCA), graph embedding (GE), or locally linear embedding (LLE) may not guarantee an optimum result for one or both of the following reasons: (1) Noise in the original N-D space tends to adversely affect class discrimination, even if robust features are used (as shown in Quinlan J, The effect of noise on concept learning. In Machine learning: An artificial intelligence approach. Edited by Michalski R S, Carbonell J G, Mitchell T M, Morgan Kaufmann, 149-166, 1986). A single DR projection may also fail to account for such artifacts (as shown in Balasubramanian, M. et al., Science, 295(5552):7a, 2002; Chang, H. and Yeung, D. Robust locally linear embedding. Pattern Recognition 39(6): 1053-1065, 2006); (2) Sensitivity to choice of parameters being specified during projection; e.g. in Shao, C. et al., Dianzi Xuebao (Acta Electronica Sinica) 34(8):1497-1501, 2006), it was shown that varying the neighborhood parameter in ISOMAP can lead to significantly different embeddings.

1.1 Classifier and Clustering Ensembles

Researchers have attempted to address problems of classifier sensitivity to noise and choice of parameters via the development of classifier ensemble schemes, such as Boosting (Freund Y, Schapire R: A decision-theoretic generalization of on-line learning and an application to boosting. In Proc. 2nd European Conf. Computational Learning Theory, Springer-Verlag: 23-37, 1995) and Bagging (Breiman L: Bagging predictors. Machine Learning 24(2): 123-140, 1996). These classifier ensembles guarantee a lower error rate as compared to any of the individual members (known as "weak" classifiers), assuming that the individual weak classifiers are all uncorrelated (Dietterich T: Ensemble Methods in Machine Learning. In Proc. 1st Int'l Workshop on Multiple Classifier Systems, Springer-Verlag, 1-15, 2000). Similarly a consensus-based algorithm has been presented (Fred, A. and Jain, A., IEEE Transactions on Pattern Analysis and Machine Intelligence 27(6):835-850, 2005) to find a stable unsupervised clustering of data using unstable methods such as k-means (MacQueen J: Some Methods for Classification and Analysis of Multi Variate Observations. In Proc. Fifth Berkeley Symposium on Mathematical Statistics and Probability, University of California Press, 281-297, 1967). Multiple "uncorrelated" clusterings of the data were generated and used to construct a co-association matrix based on cluster membership of all the points in each clustering. Naturally occurring partitions in the data then were identified. This idea was extended further in Fern, X. and Brodley, C., Random Projection for High Dimensional Data Clustering: A Cluster Ensemble Approach. In Proc. 20th Int'l Conf. Machine Learning 2003:186-193), where a combination of clusterings based on simple linear transformations of high-dimensional data was considered. Therefore, ensemble techniques (1) make use of uncorrelated, or relatively independent, analyses (such as classifications or projections) of the data, and (2) combine multiple analyses (such as classifications or projections) to enable a more stable result.

1.2. Improved Dimensionality Reduction (DR) Schemes to Overcome Parameter Sensitivity As shown by Tenenbaum, J. et al., (Science 290(5500): 2319-2323, 2000), linear DR methods such as classical multi-dimensional scaling (Venna J and Kaski S: Local multidimensional scaling. Neural Networks 19(6):889-899, 2006) are unable to account for non-linear proximities and structures when calculating an embedding that best preserves pairwise distances between data objects. This led to the development of non-linear DR methods such as LLE (Saul L and Roweis S, Journal of Machine Learning Research, 4:119-155, 2003) and ISOMAP (Tenenbaum J et. al.., Science 290(5500):2319-2323, 2000), which make use of local neighborhoods to better calculate such proximities. DR methods are known to suffer from certain shortcomings (e.g., sensitivity to noise and/or change in parameters). A number of techniques have been proposed recently to overcome these shortcomings. Samko, O et al. (Pattern Recognition Letters 27(9):968-979, 2006) and Kouropteva O et al. (In Proc. 1st Int'l Conf. Fuzzy Systems and Knowledge Discovery, 359-363, 2002) proposed methods to choose the optimal neighborhood parameter for ISOMAP and LLE, respectively. This was done by first constructing multiple embeddings based on an intelligently selected subset of parameter values, and then choosing the embedding with the minimum residual variance. Attempts have been made to overcome problems due to noisy data by selecting data objects known to be most representative of their local neighborhood (landmarks) in ISOMAP (de Silva V, Tenenbaum J: Global Versus Local Methods in Nonlinear Dimensionality Reduction. In Proc. Adv. Neural Information Processing Systems (NIPS), Volume 15, MIT Press, 705 712, 2003), or estimating neighborhoods in LLE via selection of data objects that are unlikely to be outliers (noise) (Chang H and Yeung D: Robust locally linear embedding. Pattern Recognition, 39(6):1053-1065, 2006). Similarly, graph embedding (GE) has also been explored with respect to issues such as the scale of analysis and determining accurate groups in the data (Zelnik-Manor L, Perona P: Self-tuning spectral clustering. In Proc. Adv. Neural Information Processing Systems (NIPS), Volume 17, MIT Press, 1601-1608, 2004).

However, all of these methods require an exhaustive search of the parameter space in order to best save the specific problem being addressed. Alternatively, one may utilize class information within the supervised variants (Geng X et al., classification. IEEE Transactions on Systems, Man, and Cybernetics: Part B, Cybernetics 35(6):1098-107, 2005; de Ridder, D et al., In Proc. Artificial Neural Networks and Neural Information Processing, 333-341, 2003) of ISOMAP and LLE, which attempt to construct weighted neighborhood graphs that explicitly preserve class information while embedding the data.

1.3. Learning in the Context of Dimensionality Reduction

The application of classification theory to dimensionality reduction (DR) has begun to be explored recently. Athitsos et al presented a nearest neighbor retrieval method known as BoostMap (Athitsos V et al, IEEE Transactions on Pattern Analysis and Machine Intelligence, 30:89-104, 2008), in which distances from different reference objects are combined via boosting. The problem of selecting and weighting the most relevant distances to reference objects was posed in terms of classification in order to utilize the Adaboost algorithm (Freund Y and Schapire R, A decision-theoretic generalization of on-line learning and an application to boosting. In Proc. 2nd European Conf. Computational Learning Theory, Springer-Verlag, 23-37, 1995), and BoostMap was shown to improve the accuracy and speed of overall nearest neighbor discovery compared to traditional methods. DR has also previously been formulated in terms of maximizing the entropy (Lawrence N: Spectral Dimensionality Reduction via Maximum Entropy. In Proc. 14th Intn'l Conf. Artificial Intelligence and Statistics (AISTATS), Volume 15, 51-59, 2011) or via a simultaneous dimensionality reduction and regression methodology involving Bayesian mixture modeling (Mao, K. et al, Supervised Dimension Reduction Using Bayesian Mixture Modeling. In Proc. 13th Intn'l Conf. Artificial Intelligence and Statistics (AISTATS), Volume 9:501-508, 2010). The goal in such methods is to probabilistically estimate the relationships between points based on objective functions that are dependent on the data labels (Lawrence N: Spectral Dimensionality Reduction via Maximum Entropy. In Proc. 14th Intn'l Conf. Artificial Intelligence and Statistics (AISTATS), Volume 15, 51-59, 2011). These methods have been demonstrated in the context of application of PCA to non-linear datasets (Mao, K. et al., Supervised Dimension Reduction Using Bayesian Mixture Modeling, In Proc. 13th Intn'l Conf. Artificial Intelligence and Statistics (AISTATS), Volume 9 2010:501-508). More recently, investigators using multi-view learning algorithms (Blum A and Mitchell T: Combining labeled and unlabeled data with co-training. In Proc. 11th Annual Conf. Computational Learning Theory 92-100, 1998; Hou et al. (Multiple view semi-supervised dimensionality reduction. Pattern Recognition 43(3):720-730, 2009) have attempted to address the problem of improving the learning ability of a system by considering several disjoint subsets of features (views) of the data. In Hou, given that a hidden pattern exists in a dataset, different views of this data are each embedded and transformed such that known domain information (encoded via pairwise link constraints) is preserved within a common frame of reference. The authors then solve for a consensus pattern which is considered the best approximation of the underlying hidden pattern being solved for. A similar idea was examined in (Wachinger C et al., Manifold Learning for Image-Based Breathing Gating with Application to 4D Ultrasound. In Proc. 13th Intl Conf. Medical Image Computing and Computer-Assisted Intervention (MICCAI), Volume 6362, 26-33, 2010; Wachinger C et al., Manifold Learning for Multi-Modal Image Registration. In Proc. 11th British Machine Vision Conference (BMVC), 82.1-82.12, 2010) where ID projections of image data were co-registered in order to better perform operations such as image-based breathing gating as well as multi-modal registration. Such algorithms involve explicit transformations of embedding data to a target frame of reference, as well as being semi-supervised in encoding specific link constraints in the data.

2. Enhanced Multi-Protocol Analysis Via Intelligent Supervised Embedding (EMPrAvISE).

Quantitative integration of multi-channel (modalities, protocols) information allows for construction of sophisticated meta-classifiers for identification of disease presence (Lee, G. et al., Proc. *ISBI*, 2009, 77-80); Viswanath, S. et al, *SPIE Medical Imaging: Computer-Aided Diagnosis*, 2009, 7260: 726031). Such multi-channel meta-classifiers have been shown to perform significantly better compared to any individual data channel (Lee, G. et al., *Proc. ISBI*, 2009, 77-80).

From an intuitive perspective, this is because the different channels of information each capture complementary sets of information. For example, the detection accuracy and qualitative characterization of prostate cancer (CaP) in vivo has been shown to significantly improve when multiple magnetic resonance imaging (MRI) protocols are considered in combination, as compared to using individual imaging protocols. These protocols include: (1) T2-weighted MRI (T2w), capturing high resolution anatomical information, (2) Dynamic Contrast Enhanced MRI (DCE), characterizing micro-vascular function via uptake and washout of a paramagnetic contrast agent, and (3) Diffusion Weighted Imaging MRI (DWI), capturing water diffusion restriction via an Apparent Diffusion Coefficient (ADC) map. DCE and DWI MRI represent functional information, which complements structural information from T2w MRI (Kitajima, K. et al., *Magn Reson Imaging*, 2010, 31(3), 625-631).

Some of the most significant challenges involves quantitatively integrating multiparametric (T2w, DCE, DWI) MRI to construct a meta-classifier to detect prostate cancer (CaP). First, the issue of data alignment needs to be addressed, in order to bring the multiple channels of information (T2w, DCE, and DWI MRI) into the same spatial frame of reference, as explained for example by Viswanath et al. (Viswanath, S. et al., "Integrating structural and functional imaging for computer assisted detection of prostate cancer on multi-protocol in vivo 3 Tesla MRI," in [*SPIE Medical Imaging: Computer-Aided Diagnosis*], 2009, 7260: 726031). This can be done via image registration techniques, described for example in (Madabhushi, A. et al., "Combined Feature Ensemble Mutual Information Image Registration," U.S. Patent Publication number: US 2010/0177944 A1. Such image registration techniques account for differences in resolution amongst the different protocols. Post-alignment, the second challenge, knowledge representation, requires quantitative characterization of disease-pertinent information. Towards this end, textural and functional image feature extraction schemes previously developed in the context of multi-parametric MRI may be employed, such as described by Viswanath et al. (Viswanath, S. et al., "Integrating structural and functional imaging for computer assisted detection of prostate cancer on multi-protocol in vivo 3 Tesla MRI," in [*SPIE Medical Imaging: Computer-Aided Diagnosis*], 2009, 7260: 726031) and Madabhushi et al. (Madabhushi, A. et al., "Automated Detection of Prostatic Adenocarcinoma from High-Resolution Ex Vivo MRI," *Medical Imaging, IEEE Transactions on*, 2005, 24(12), 1611-1625).

The final step, data fusion, involves some combination of extracted quantitative descriptors to construct the integrated meta-classifier. Dimensionality reduction (DR), as described by Shi et al. (Shi, J. et al., "Pattern Analysis and Machine Intelligence," *IEEE Transactions* on, 2000, 22(8), 888-905), has been shown to be useful for such quantitative fusion, further described by Viswanath et al. (Viswanath, S et al., "A Comprehensive Segmentation, Registration, and Cancer Detection Scheme on 3 Tesla In Vivo Prostate DCE-MRI," in [*Proc. MICCAI*], 2008, 662-669). DR allows construction of a lower-dimensional embedding space, which accounts for differences in scale between the different protocols, as well as avoiding the curse of dimensionality. While the image descriptors are divorced from their physical meaning in embedding space (embedding features are not readily interpretable), relevant class-discriminatory information is largely preserved, as described by Lee et al. (Lee, G. et al., "Computational Biology and Bioinformatics," *IEEE Transactions on*, 2008, 5(3): 1-17). This makes DR suitable for multi-parametric classification.

Multi-modal data fusion strategies may be categorized as combination of data (COD) (where the information from each channel is combined prior to classification), and combination of interpretations (COI) (where independent classifications based on the individual channels are combined), as shown in FIG. 1. A COI approach has typically been shown to be sub-optimal, as inter-protocol dependencies are not accounted for, as described by Lee et al. (Lee, G. et al., *Proc. ISBI*, 2009, 77-80).

Thus, a number of COD strategies with the express purpose of building integrated quantitative meta-classifiers have recently been presented, including DR-based (Lee, G. et al., *Proc. ISBI*, 2009, 77-80), kernel-based (Lanckriet, G. et al., *Pac Symp Biocomput]*, 2004, 300-11) and feature-based (Verma, et al, *Academic Radiology*, 2008, 15(8): 966-977) approaches.

Multi-kernel learning (MKL) schemes, such as described in Lanckriet et al. (Lanckriet, G. R. et al., "Kernel-based data fusion and its application to protein function prediction in yeast," in *Pac Symp Biocomput]*, 2004, 300-311), represent and fuse multi-modal data based on choice of kernel. One of the challenges with MKL schemes is to identify an appropriate kernel for a particular problem, followed by learning associated weights. The most common approach for quantitative multi-parametric image data integration has involved concatenation of multi-parametric features, followed by classification in the concatenated feature space, as described by Verma et al. (Verma, R. et al., "Multiparametric Tissue Characterization of Brain Neoplasms and Their Recurrence Using Pattern Classification of MR Images," *Academic Radiology*, 2008, 15(8): 966-977).

Chan et al. (Chan et al., *Medical Physics*, 2003, 30(6): 2390-2398) used a concatenation approach in combining texture features from multi-parametric (T2w, line-scan diffusion, T2-mapping) 1.5 T in vivo prostate MRI to generate a statistical probability map for CaP presence via a Support Vector Machine (SVM) classifier. A Markov Random Field-based algorithm, as described by Liu et al. (Liu, X. et al., "Medical Imaging," *IEEE Transactions* on, 2009, 28(6): 906-915) as well as variants of the SVM algorithm Artan et al. (Artan, Y. et al., "Image Processing," *IEEE Transactions* on, 2010, 19(9): 2444-55); Ozer et al. (Ozer, S. et al, *Medical Physics*, 2010, 37(4): 1873-1883) were utilized to segment CaP regions on multi-parametric MRI via concatenation of quantitative descriptors such as T2w intensity, pharmacokinetic parameters (from DCE), and ADC maps (from DWI).

Lee et al. (Lee, G. et al., *Proc. ISBI*, 2009, 77-80) proposed data representation and subsequent fusion of the different modalities in a "meta-space" constructed using DR methods such as Graph Embedding (GE), as described by Shi et al. (Shi, J. et al., *IEEE Transactions* on, 2000, 22(8): 888-905). However, DR analysis of a high-dimensional feature space may not necessarily yield optimal results for multi-parametric representation and fusion due (a) to noise in the original N-D space which may adversely affect the embedding projection, or (b) to sensitivity to choice of parameters being specified during DR. For example, GE is known to suffer from issues relating to the scale of analysis as well as relating to the choice of parameters used in the method, as described by Zelnik-Manor et al. (Zelnik-Manor, L. et al., "Self-tuning spectral clustering," in [*Advances in Neural Information Processing Systems*], 2004, 17: 1601-1608, MIT Press). Varying these parameters can result in significantly different appearing embeddings, with no way of determining which embedding is optimal for the purposes of multi-parametric data integration and classification. There is hence a clear need for a DR scheme that is less sensitive to choice of parameters, while simultaneously providing a quantitative framework for multi-parametric data fusion and subsequent classification.

Researchers have attempted to address problems of sensitivity to noise and choice of parameters in the context of automated classification schemes via the development of classifier ensembles, as described by Freund et al. (Freund, Y. et al., "A decision-theoretic generalization of on-line learning and an application to boosting," in [*Proc. 2nd European Conf. Computational Learning Theory*], 1995, 23-37, Springer-Verlag)); and Breiman et al. (Breiman, L., *Machine Learning*, 1996, 24(2): 123-140). These algorithms combine multiple "weak" classifiers to construct a "strong" classifier which has an overall probability of error that is lower compared to any of the individual weak classifiers. Related work, which applies ensemble theory in the context of DR, has been presented by Hou et al. (Hou, C. et al., *Pattern Recognition*, 2009, 43(3): 720-730), involving a semi-supervised ensemble of DR representations within multi-view learning framework for web data mining. Similarly, Athisos et al. (Athisos et al., *IEEE Transactions on Pattern Analysis and Machine Intelligence*, 2008, 30(1): 89-104) employed an ensemble algorithm for nearest neighbor discovery via DR within a content retrieval system.

Significance of Ensemble Embedding

The described invention provides a dimensionality reduction (DR) scheme, known as ensemble embedding that involves first generating and then combining multiple uncorrelated, independent (or base) n-D embeddings. These base embeddings may be obtained via either linear or non-linear DR techniques being applied to a large N-D feature space. Techniques to generate multiple base embeddings may be seen to be analogous to those for constructing classifier ensembles. In the latter, base classifiers with significant variance can be generated by varying the parameter associated with the classification method (k in kNN classifiers (Cover T and Hart P, IEEE Transactions on Information Theory, 13:21-27, 1967) or by varying the training data (combining decision trees via Bagging (Breiman L: Bagging predictors. Machine Learning, 24(2):123-140, 1996). Previously, a consensus method for LLE was examined (Tiwari P et al, Consensus-locally linear embedding (C-LLE): application to prostate cancer detection on magnetic resonance spectroscopy. In Proc. 11th Int'l Conf. Medical Image Computing and Computer-Assisted Intervention (MICCAI), Volume 5242(2), 330-338, 2008) with the underlying hypothesis that varying the neighborhood parameter ($\kappa$) will effectively generate multiple uncorrelated, independent embeddings for the purposes of constructing an ensemble embedding. The combination of such base embeddings for magnetic resonance spectroscopy data was found to result in a low-dimensional data representation, which enabled improved discrimination of cancerous and benign spectra compared to using any single application of LLE.

The described invention considers an approach inspired by random forests (Ho T, IEEE Transactions on Pattern Analysis and Machine Intelligence, 20(8):832 844, 1998) (which in turn is a modification of the Bagging algorithm (Breiman L: Bagging predictors. Machine Learning 24(2):123-140, 1996), where variations within the feature data are used to generate multiple embeddings, which are then combined via the ensemble embedding scheme of the present invention. Additionally, unlike most current DR approaches, which require tuning of associated parameters for optimal performance in different datasets, ensemble embedding offers a methodology that is not significantly sensitive to parameter choice or dataset type.

The described invention provides a method and system of classifying digital image containing multi-parametric data derived from a biological sample by representing and fusing the multi-parametric data via a multi-protocol analysis using an intelligent supervised embedding (EMPrAvISE) scheme that uses a DR method referred to herein as "ensemble embedding." The method and system constructs a single stable embedding by generating and combining multiple uncorrelated, independent embeddings derived from the multiparametric feature space, and better preserves class-discriminatory information as compared to any of the individual embeddings used in its construction.

The described invention (1) provides a framework for multi-parametric data analysis, (2) intelligently selects embeddings for combination via quantifying the nature of the embeddings, and (3) utilizes a supervised classification scheme to ensure that class-discriminatory information is specifically preserved within the final representation.

It inherently accounts for (1) differences in dimensionalities between individual protocols (via DR), (2) noise and parameter sensitivity issues with DR-based representation (via the use of an ensemble of embeddings), and (3) inter-protocol dependencies in the data (via intelligent ensemble embedding construction).

SUMMARY

According to one aspect, the described invention provides a method for analyzing multimodal data derived from a biological sample, comprising: (a) inputting, via a computing device, the multimodal data comprising a plurality of data; (b) generating, via the computing device, a plurality of quantitative descriptors in the multimodal data; (c) constructing, via the computing device, a higher dimensional multi-parametric feature space using the plurality of quantitative descriptors; (d) reducing, via the computing device, the higher dimensional multi-parametric feature space to a lower dimensional ensemble embedding by an ensemble embedding method; (e) obtaining, via the computing device, a classification for the biological sample based on the ensemble embedding; and (f) outputting, via the computing device, the classification for the biological sample, wherein the ensemble embedding method comprises: (i) generating, via the computing device, a plurality of base embeddings derived from the higher dimensional multi-parametric feature space, wherein the plurality of base embeddings comprises comprising weak embeddings and strong embeddings; (ii) calculating, via the computing device, an embedding strength for each base embedding; (iii) selecting, via the computing device, a plurality of the strong embeddings, wherein the embedding strength of each strong embedding is greater than a pre-specified threshold value; (iv) constructing, via the computing device, the lower dimensional ensemble embedding by: (1) quantifying, via the computing device, a plurality of pair-wise relationships for all quantitative descriptors in each strong embedding in step (iii) via a Euclidean pair-wise distance method; (2) normalizing, via the computing device, the plurality of pair-wise relationships to yield a plurality of normalized relationships; (3) propagating, via the computing device, the plurality of normalized relationships by a projection method; and (4) obtaining, via the computing device, the lower dimensional ensemble embedding and (v) optimizing, via the computing device, the generating a plurality of independent embeddings step (i), the calculating an embedding strength step (ii), the selecting a plurality of strong embeddings step (iii), and the constructing the lower dimensional ensemble embedding step (iv). According to one embodiment, the multimodal data is an image. According to another embodiment, the image is selected from the group consisting of a magnetic resonance imaging (MRI) image, a positron emission tomography (PET) image, a single-photon emission computed tomography (SPECT) image, an ultrasound image, an x-ray image, a computed tomography (CT) image, a micro-array image, and a gene expression image. According to another embodiment, the quantitative descriptor is a pixel. According to another embodiment, the plurality of base embeddings is generated using space perturbation method comprising: (1) generating, via the computing device, a plurality of boostrapped feature sub-sets from each quantitative descriptor of the plurality of quantitative descriptors contained within the higher dimensional multi-parametric feature space; and (2) embedding, via the computing device, a feature space associated with each bootstrapped feature subset of the plurality of boostrapped feature sub-sets into the higher dimensional multi-parametric feature space to create the plurality of independent embeddings. According to another embodiment, the plurality of base embeddings is generated by implementing Algorithm CreateEmbed, as given below:

---

Input: $F(c) \in \mathbb{R}^n$ for all objects $c \in C, n$
Output: $X_m(c) \in \mathbb{R}_m^n, m \in \{1, ..., M\}$
Data Structures: Feature subsets $\eta_m$, total number of subsets M, number of features in each subset V, DR method $\Phi$
begin
   0. for m = 1 to M do
     1. Select V < N features from $\mathbb{R}^N$, forming subset $\eta m$;
     2. Calculate $X_m(c) \in \mathbb{R}_m^n$ for all $c \in C$ using $\eta_m$ and method $\Phi$;
     3. endfor

--- end. According to another embodiment, the plurality of base embeddings is generated by implementing Algorithm (CreateWeakEmbed) as follows:

---

Algorithm CreateWeakEmbed

Input: $F(c) \in R^N$ for all objects $c \in C, n$
Output: $X_m(c) \in R_m^n, m \in \{1,..., M\}$
Data Structures: Feature subsets $F_m$, total number of subsets M, number of features in each subset V begin
   0. for m = 1 to M do
     1. Select V < N features from $R^N$, forming subset $F_m$;
     2. Calculate $X_m(c) \in R_m^n$, for all $c \in C$ via GE of the feature space associated with each $F_m$;
     3. endfor

---

End. According to another embodiment, the plurality of strong embeddings are selected by implementing Algorithm SelEmbed, as follows:

---

Algorithm SelEmbed

Input: $X_m(c) \in \mathbb{R}_m^n$ for all objects $c \in C, m \in \{1, ..., M\}$
Output: $X_k(c) \in \mathbb{R}_k^n, k \in \{1, ..., K\}$
Data Structures: A list Q, embedding strength function $\psi^{ES}$, embedding strength threshold $\theta$
begin
   0. for m = 1 to M do
     1. Calculate $\psi^{ES}(\mathbb{R}_m^n)$;
     2. if $\psi^{ES}(\mathbb{R}_m^n) > \theta$
     3. Put m in Q;
     4. endif
     5. endfor
   6. For each element k of Q, store $X_k(c) \in \mathbb{R}_k^n$ for all objects $c \in C$;
end.

---

According to another embodiment, the lower dimensional embedding is constructed by implementing Algorithm CalcEnsembleEmbed:

---

Algorithm CalcEnsembleEmbed

Input: $X_k(c) \in \mathbb{R}_k^n$ for all objects $c \in C, k \in \{1, ..., k\}$
Output: $\tilde{X}(c) \in \tilde{\mathbb{R}}^n$
Data Structures: Confusion matrix W, ML estimator, $\Omega$, projection method $\gamma$ begin
   0. for k = 1 to K do
     1. Calculate $W_k(i,j) = ||X_k(c) - X_k(d)||_2$ for all objects $c, d \in C$ with indices i,j;
     2. endfor
   3. Apply normalization to all $W_k$, $k \in \{1, ..., K\}$;
   4. Obtain $\tilde{W}(i,j) = \Omega[W_k(i,j)] \forall c, d \in C$;
   5. Apply projection method $\gamma$ to $\tilde{W}$ to obtain final ensemble embedding $\tilde{\mathbb{R}}^n$;

---

End. According to another embodiment, the biological sample is derived from a diseased tissue. According to another embodiment, the diseased tissue is a cancer tissue. According to another embodiment, the cancer is selected from the group consisting of a brain cancer, a prostate cancer, a breast cancer, a pancreatic cancer, a colon cancer, a leukemia, a lymphoma, a myeloma, a ovarian cancer, a skin cancer, a lung cancer, and a renal-cell cancer.

According to another aspect, the described invention provides a method for analyzing multimodal data derived from a biological sample by a multi-protocol analysis using an intelligent supervised embedding (EMPrAvISE) scheme, comprising: (a) inputting, via a computing device, the multimodal data, wherein the multimodal data comprises a plurality of data; (b) generating, via the computing device, a plurality of voxels in the multimodal data; (c) assigning, via the computing device, an intensity value to each voxel in the multimodal data; (d) registering, via the computing device, the plurality of data to create a plurality of registered data, such that the plurality of registered data have the same spatial frame as a reference datum, and computing a ground truth extent of disease for each voxel; (e) extracting from the plurality of registered data, via the computing device, a plurality of features and computing a plurality of quantitative descriptors corresponding to the plurality of features; and (f) fusing, via the computing device, the plurality of quantitative descriptors to create a plurality of ensemble embeddings by: (i) constructing, via the computing device, a higher dimensional multi-parametric feature space using the plurality of quantitative descriptors; (ii) computing, via the computing device, a plurality of pair-wise relationships for all quantitative descriptors of the plurality of quantitative descriptors in the higher dimensional multi-parametric feature space via a Euclidean pairwise distance method and storing the plurality of pair-wise relationships in a confusion matrix; (iii) generating, via the computing device, a plurality of independent embeddings derived from the higher dimensional multi-parametric feature space, wherein the plurality of independent embeddings comprise weak embeddings and strong embeddings; (iv) computing, via the computing device, an embedding strength for each independent embedding; (v) selecting, via the computing device, a plurality of strong embeddings from the plurality of independent embeddings, wherein the embedding strength of each strong embedding is greater than a pre-specified threshold value and wherein a pair-wise relationship between two quantitative descriptors in the higher dimensional multi-parametric feature space is preserved in each strong embedding; (vi) computing, via the computing device, a maximum likelihood estimate (MLE) of a probability distribution of each pair-wise relationship of the plurality of pairwise relationships in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix; and (vii) computing, via the computing device, the plurality of ensemble embeddings by a multi-dimensional scaling method, wherein each pair-wise relationship in each ensemble embedding equals the corresponding maximum likelihood estimate (MLE) of the pair-wise relationship in the ensemble matrix; (g) classifying, via the computing device, the biological sample into a disease class; and (h) outputting, via the computing device, the disease class. According to one embodiment, the multimodal data is an image. According to another embodiment, the image is selected from the group consisting of a magnetic resonance imaging (MRI) image, a positron emission tomography (PET) image, a single-photon emission computed tomography (SPECT) image, an ultrasound image, an x-ray image, a computed tomography (CT) image, a micro-array image, and a gene expression image. the disease is a cancer. According to another embodiment, the cancer is selected from a breast cancer, a prostate cancer, a brain cancer, a pancreatic cancer, a colon cancer, a leukemia, a lymphoma, a myeloma, a ovarian cancer, a skin cancer, a lung cancer, and a renal-cell cancer.

DETAILED DESCRIPTION OF THE INVENTION

Glossary

Figure 1:
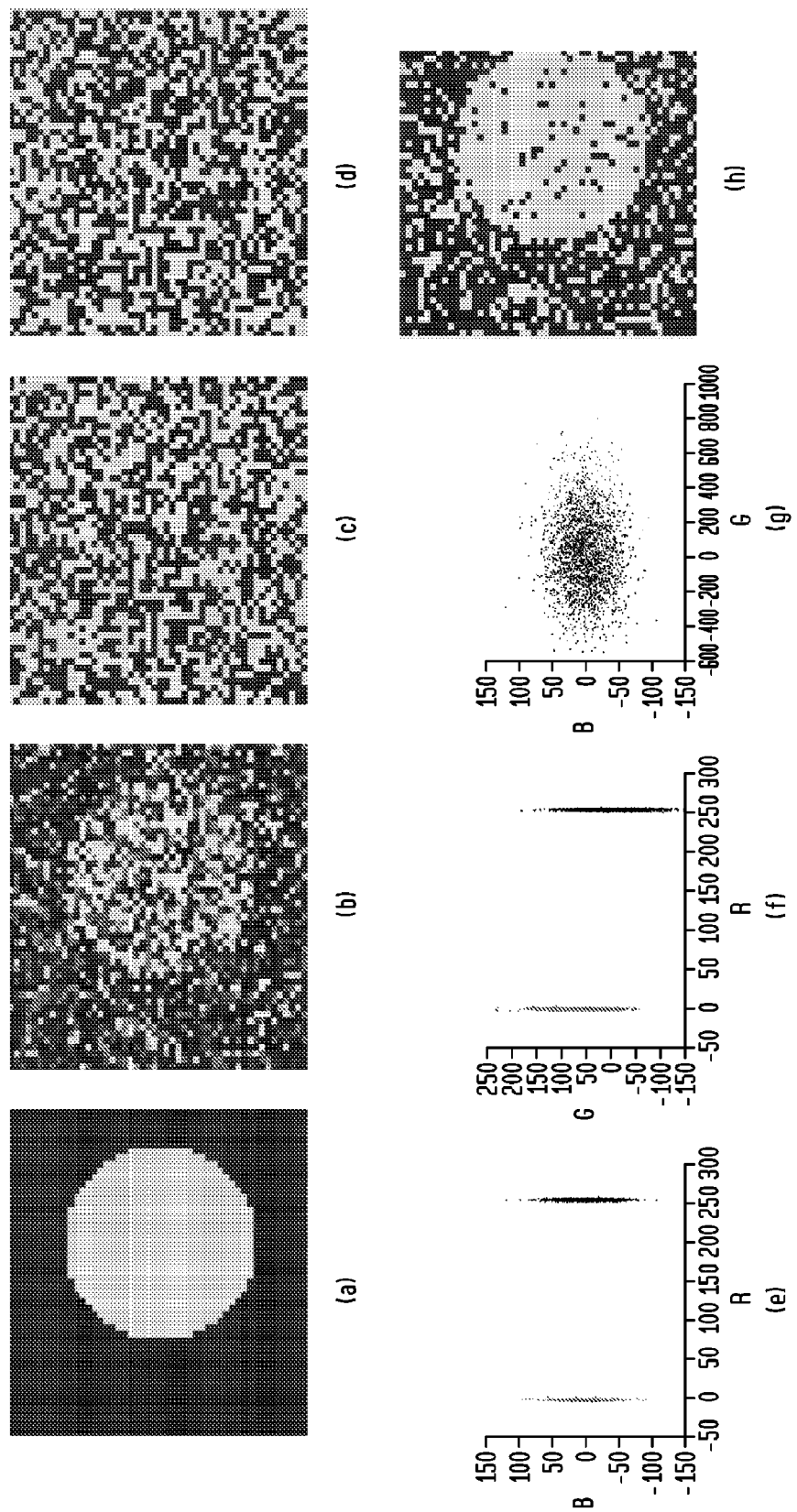
FIG. 1 shows an application of ensemble embedding in separating foreground (grey) and background (black) regions via pixel-level classification.

The abbreviation "ADC" as used herein signifies Apparent Diffusion Coefficient.

The abbreviation "AUC" as used herein signifies Area under the Curve.

The abbreviation "CaP" as used herein signifies prostate cancer.

The abbreviation "COD" as used herein signifies Combination of Data.

The abbreviation "COI" as used herein signifies Combination of Interpretations.

The abbreviation "CT" as used herein signifies Computed Tomography.

The abbreviation "DCE" as used herein signifies Dynamic Contrast Enhanced.

The abbreviation "DR" as used herein signifies Dimensionality Reduction.

The abbreviation "DWI" as used herein signifies Diffusion Weighted.

The abbreviation "EMPrAvISE" as used herein signifies Enhanced Multi-Protocol Analysis via Intelligent Supervised Embedding.

The abbreviation "FFD" as used herein signifies free form deformation.

The abbreviation "GE" as used herein signifies graph embedding.

The abbreviation "GM" as used herein signifies grey matter.

The abbreviation "ISOMAP" as used herein signifies isometric mapping.

The abbreviation "LLE" as used herein signifies locally linear embedding.

The abbreviation "MACMI" as used herein signifies multi-attribute, higher order mutual information (MI)-based elastic registration.

The abbreviation "MDS" as used herein signifies Multi-dimensional scaling.

The abbreviation "MKL" as used herein signifies Multi-kernel learning.

The abbreviation "MI" as used herein signifies mutual information.

The abbreviation "ML" as used herein signifies maximum likelihood.

The abbreviation "MLE" as used herein signifies maximum likelihood estimate.

The abbreviation "MNI" as used herein signifies the Montreal Neurological Institute.

The abbreviation "MRI" as used herein signifies magnetic resonance imaging.

The abbreviation "MS" as used herein signifies means shift.

The abbreviation "MSE" as used herein signifies mean squared error.

The abbreviation "N-D" as used herein signifies N-dimensional.

The abbreviation "PBT" as used herein signifies probabilistic boosting tree.

The abbreviation "PCA" as used herein signifies Principal Component Analysis.

The abbreviation "PD" as used herein signifies proton density.

The abbreviation "PET" as used herein signifies positron emission tomography.

The abbreviation "PPMM" as used herein signifies probabilistic pairwise Markov model.

The abbreviation "RAM" as used herein signifies random access memory.

The abbreviation "RGB" as used herein signifies red green blue.

The abbreviation "ROC" as used herein signifies receiver operating characteristic.

The abbreviation "RSI" as used herein signifies R-squared index.

The abbreviation "SN" as used herein signifies sensitivity.

The abbreviation "SP" as used herein signifies specificity.

The abbreviation "SPECT" as used herein signifies single-photon emission computed tomography.

The abbreviation "SSAGE" as used herein signifies semi-supervised variant of GE.

The abbreviation "SVM" as used herein signifies Support Vector Machine.

The abbreviation "T2w" as used herein signifies T2-weighted.

The abbreviation "WM" as used herein signifies white matter.

The abbreviation "WMHS" as used herein signifies whole mount histological section.

The term "adjacency" or "adjacencies" in its plural form as used herein refers to a pair-wise relationship between a pair of quantitative descriptors in which the relationship is a measure of the similarity, dissimilarity, or distance between the quantitative descriptors calculated in the high-dimensional descriptor space (e.g. Euclidean distance).

The term "base embedding" as used herein refers to an independent embedding. The term "independent embedding" includes weak embeddings and strong embeddings. According to some embodiments, the independent embeddings are selected from the group consisting of uncorrelated embeddings and identical embeddings. According to one embodiment, the independent embedding is an uncorrelated, independent embedding. According to another embodiment, the independent embedding is an identical embedding.

The term "cartesian coordinates" as used herein refers to a system of coordinates for locating a point on a plane (Cartesian plane) by its distance from each of two intersecting lines, or in space by its distance from each of three planes intersecting at a point.

The term "classifier" as used herein refers to a computational device capable of performing a classification function. A classification function is a discrete value output function, such as, for example, prediction of disease outcome. According to the described invention, each parameter has its own separate classifier. These classifiers are then combined to create a meta-classifier (combined classifier) which yields the final risk score.

The terms "classify" or "classifying" as used herein refers to the labeling of one or more objects (e.g. images, regions, pixels) into one of a number of predefined categories.

The term "confusion matrix" as used herein refers to a matrix wherein a plurality of pair-wise relationships computed for all quantitative descriptors of the plurality of quantitative descriptors in the higher dimensional multi-parametric feature space are stored.

The term "data" as used herein refers to individual facts, statistics or information obtained through a given method for disease detection, diagnosis or prognosis using samples. Exemplary data include, but are not limited to, image data.

The term "digital image" as used herein refers to a binary representation of an image. Digital images can be raster images (also called bitmap images) or vector images. Raster images have a finite set of digital values, called picture elements or pixels. Raster images contain a fixed number of rows and columns of pixels or voxels depending on whether the image is two-dimensional or three-dimensional. While pixels represent individual elements in a two-dimensional image, containing values representing the brightness at that point, voxels are individual grid elements within a three-dimensional image. Vector images are composed of vectors, each consisting of a point that has both direction and length.

The term "eigenvector" as used herein refers to a special set of vectors associated with a linear system of equations (i.e., a matrix equation) that are sometimes also known as characteristic vectors, proper vectors, or latent vectors. Each eigenvector is paired with a corresponding so-called "eigenvalue."

The term "embedding" (in its noun form) as used herein refers to a lower (n-) dimensional sub-space, denoted as ($R^n$) computed from and contained within a N-dimensional multi-parametric feature space ($R^N$) also known as the higher dimensional multi-parametric feature space, such that n<N. The higher dimensional multi-parametric feature space ($R^N$) contains a plurality of quantitative descriptor(s) computed from feature(s) extracted from N plurality of multimodal data obtained through N plurality of protocols. A pair-wise relationship between two quantitative descriptors in the higher dimensional feature space is preserved in a lower dimensional embedding.

The term "ensemble" as used herein refers to a supervised learning algorithm, that can be trained and then used to make predictions.

The term "ensemble embedding" as used herein refers to a lower n-dimensional sub-space ($\tilde{R}^n$) computed via the ensemble embedding or EMPrAvISE technique from a N-dimensional multi-parametric feature space ($R^N$) also known as the higher dimensional multi-parametric feature space, such that n<N. $\tilde{R}^n$ is calculated by generating multiple embeddings, intelligently selecting the best among them, and then accurately combining the selected embeddings to yield a representation that best preserves pair-wise relationships between quantitative descriptors in the higher dimensional feature space.

The term "ensemble matrix" as used herein refers to a matrix wherein maximum likelihood estimates (MLE) of the probability distributions of the plurality of pairwise relationships are stored.

The term "Euclidean pairwise distance method" as used herein refers to the Euclidean distance between two descriptors that is given by the Pythagorean formula for the distance between two Cartesian coordinates.

The term "extent" as used herein refers to a ratio of pixels in a region to pixels in the total bounding box.

The term "graph embedding method" as used herein refers to a method according to Shi et al. can be used. (Shi, J. et al., "Normalized Cuts and Image Segmentation," Pattern Analysis and Machine Intelligence, IEEE Transactions on 22(8), 888-905, 2000). The graph embedding method involves eigenvalue decomposition of a confusion matrix $W \in \Re^{|C| \times |C|}$, representing the adjacencies between all objects c∈C in high-dimensional feature space. The result of GE, X(c), is obtained from the maximization of the function $$S(X) = 2\gamma \times tr\left[\frac{X(D-W)X^T}{XDX^T}\right],$$

where tr is the trace operator, $X=[X(c_1), X(c_2), \ldots, X(c_q)]$, q=|C| and γ=q−1. D is a diagonal matrix where the diagonal element is defined as $$D(i,i) = \sum_j W(i,j).$$

Eigenvectors corresponding to the smallest n Eigenvalues of (D−W)X=λDX are calculated. The matrix X of the first n Eigenvectors is constructed, and $\forall_c \in C$, X(c) is defined as row i of X, such that $X(c)=[e_v(c)|v \in \{1,\ldots,n\}] \in R^n$.

The term "ground truth extent" as used herein refers to the extent (ratio of pixels in a region to pixels in the total bounding box) computed after registration of images from different modalities (or protocols) into the same spatial frame as a reference.

The term "higher dimensional multi-parametric feature space" as used herein refers to a space denoted as ($R^N$) that contains a plurality of quantitative descriptor(s) computed from feature(s) extracted from N plurality of multimodal data obtained through N plurality of protocols. A pair-wise relationship between two quantitative descriptors in the higher dimensional feature space is preserved in a lower dimensional embedding.

The term "maximum likelihood estimate" as used herein refers to an estimate or approximate calculation of parameters of a statistical model. Exemplary maximum likelihood estimators include, but are not limited to, mean, median, mode, variance, etc.

The term "mean squared error (MSE)" as used herein is defined as, in the pairwise relationship between every pair of objects c, d∈C in any embedding $\mathbb{R}^n$ with respect to the true pairwise relationships in $\hat{\mathbb{R}}^n$ as, $$\epsilon_X = E_{cd}(\delta^{cd} - \delta^{cd})^2 \qquad \text{Equation [6]}$$

where $E_{cd}$ is the expectation of the squared error in the pairwise relationships in $\mathbb{R}^n$ calculated over all pairs of objects c, d∈C. The expected MSE can be calculated over all K base embeddings specified above as, $$\epsilon_{K,X} = E_K[\epsilon_X] = E_K[E_{cd}(\delta^{cd} - \delta_k^{cd})^2] \qquad \text{Equation [7]}$$

The terms "modality" or "protocol" as used herein refer to a test or a method for disease detection, diagnosis or prognosis using disease samples, such as histopathology samples.

The terms "multi-channel" "multimodal" or "multi-parametric" as used herein refer to a plurality of data based on a plurality of disease features that can be measured/quantified, wherein such data are obtained through a plurality of protocols.

The term "node" as used herein refers to a point in a three-dimensional space, or a two-dimensional plane or surface. A collection of nodes along with edges connecting the nodes comprise a graph. The graph represents a model of three-dimensional space or two dimensional plane. All elements of a graph (model) may be moved or deformed continuously while still representing the same graph, i.e., the same collection of nodes and edges.

The term "noise sensitivity" as used herein refers to how an overall system performance changes as a function of erroneous inputs to the system, where such errors have been introduced by noise inherent to the system.

The term "normalizing" as used herein refers to rescaling of a random variable into the range [0, 1].

The term "normalized relationship" as used herein refers to rescaling of a pair-wise relationship into the range [0, 1].

The term "pairwise relationship" as used herein refers to a relationship between two quantitative descriptors computed from features extracted from biomedical data. Exemplary pairwise relationships include, but are not limited to adjacency, Euclidean distance, Pearson's correlation coefficient etc.

The term "parameter" as used herein refers to a variable, aspect, element, feature or attribute of a given data that can be observed, detected, measured, or quantified. Exemplary parameters include, but are not limited to, image parameters.

The term "parametric image" as used herein refers to assigning algorithmically determined value(s) to a pixel, which encodes some information regarding properties of the pixel and its local neighborhood.

The term "parameter sensitivity" as used herein refers to how the overall system performance changes as a function of the changes in the corresponding user-defined parameter values.

The term "Probabilistic Boosting Tree" or "PBT" as used herein refers to a framework for learning two or more class discriminative models to allow unseen samples to be correctly classified. In the training stage, a tree is recursively constructed in which each tree node is a strong classifier. The input training set is divided into two new sets, left and right ones, according to the learned classifier, each of which is then used to train the left and right sub-trees recursively. Zhuowen Tu, "Probabilistic Boosting-Tree: learning Discriminative Models for Classification, Recognition and Clustering," Proceeding, ICCV '05 Proceedings of the Tenth IEEE Intl Conference on Computer Vision, Vol. 2 (2005).

The term "probability distribution" as used herein refers to a mathematical formulae giving probabilities related to values of a random variable.

The term "projection method" as used herein refers to a multi-dimensional method, such as described by Venna et al. (Venna J. et al., "Local multidimensional scaling," Neural Networks 2006, 19(6):889-899), wherein each pair-wise relationship in each ensemble embedding equals the corresponding maximum likelihood estimate (MLE) of the pair-wise relationship.

The term "protocol" or "modality" as used herein refers to a test or a method for disease detection, diagnosis or prognosis using disease samples, such as histopathology samples.

The term "quantitative descriptor" as used herein refers to a mathematical representation of a feature.

The term "receiver operating characteristic (ROC) curve has the following meaning. The sensitivity of a diagnostic test is the proportion of patients for whom the outcome is positive that are correctly identified by the test. The specificity is the proportion of patients for whom the outcome is negative that are correctly identified by the test. When the cut-off value for a continuous diagnostic variable is increased (assuming that larger values indicate an increased chance of a positive outcome), the proportions of both true and false positives decreases. These proportions are the sensitivity and 1—specificity, respectively. A graph of sensitivity against 1—specificity is called a receiver operating characteristic (ROC) curve. The performance of a diagnostic variable can be quantified by calculating the area under the ROC curve (AUROC). Bewick, V. et al., Crit. Care 8(6): 508-512 (2004).

The term "registering" as used herein refers to spatially aligning two distinct images so that anatomy of interest occupies the same pixels in both images.

The term "RGB color space" as used herein refers to an additive color model in which red, green, and blue light is added together in various ways to reproduce a broad array of colors.

The term "sensitivity" as used herein refers to the proportion of patients for whom disease outcome is positive that are correctly identified by a given diagnostic protocol.

The term "specificity" as used herein refers to the proportion of patients for whom disease outcome is negative that are correctly identified by a given diagnostic protocol.

The term "surrogate ground truth" as used herein refers to an approximation of the ground truth (also referred to as the gold standard).

The term "true embedding" as used herein refers to a lower n-dimensional sub-space ($\hat{\mathbb{R}}^n$) for which embedding strength $\psi^{ES}(\hat{\mathbb{R}}^n)=1$. A true embedding $\hat{\mathbb{R}}^n$ is one for which the triangle relationship is satisfied for all unique triplets c, d, e∈C, hence perfectly preserving all pairwise relationships from $\mathbb{R}^N$ to $\hat{\mathbb{R}}^n$.

The term "strong embedding" as used herein refers to a lower n-dimensional sub-space ($\ddot{\mathbb{R}}^n$), for which embedding strength $\psi^{ES}(\ddot{\mathbb{R}}^n)>\theta$. A strong embedding is defined as one which accurately preserves the triangle relationship for more than some significant fraction (θ) of the unique triplets of objects c, d, e∈C, that exist.

The term "uncorrelated, independent" as used herein refers to the method of constructing base embeddings; similar to their usage in ensemble classification literature (Dietterich T: Ensemble Methods in Machine Learning. In Proc. 1st Int'l Workshop on Multiple Classifier Systems, Springer-Verlag: 1-15, 2000).

The term "vector" as used herein refers to a quantity possessing both magnitude and direction, represented by an arrow, the direction of which indicates the direction of the quantity and the length of which is proportional to the magnitude.

The term "voxel" as used herein refers to a volume element of an individual grid in a three-dimensional space. A voxel is analogous to a pixel that represents an individual element in a two-dimensional image.

The term "weak embedding" as used herein refers to a lower n-dimensional sub-space ($\dot{\mathbb{R}}^n$) that is not a strong embedding.

I. Systems and Methods for Generating and Combining Multiple Low-Dimensional Embeddings (Ensemble Embeddings)

According to one aspect, the described invention provides a dimension reduction scheme to be known as ensemble embedding, which aims to overcome the problems of sensitivity to noise and choice of parameters that plague several popular DR schemes (Balasubramanian, M. et al., Science, 295(5552):7a, 2002; Chang, H. and Yeung, D. Robust locally linear embedding. Pattern Recognition 39(6):1053-1065, 2006; Shao, C. et al., Dianzi Xuebao (Acta Electronica Sinica) 34(8):1497-1501, 2006). The ensemble embedding scheme constructs a single stable embedding, known as an ensemble embedding, by generating and combining multiple uncorrelated, independent embeddings. The single stable embedding better preserves specific types of information in the data (such as class-based separation) as compared to any of the individual embeddings. The ensemble embedding scheme can be used in conjunction with either linear or non-linear DR methods and is intended to be easily generalizable to a large number of applications and problem domains. The present invention provides evidence of the superiority of the ensemble embedding representation for a variety of classification and clustering applications.

Ia. A Method for Analyzing Multimodal Data

According to another aspect, the described invention provides a method for analyzing multimodal data derived from a biological sample, comprising:

(a) inputting, via a computing device, the multimodal data comprising a plurality of data;

(b) generating, via the computing device, a plurality of quantitative descriptors to describe the multimodal data;

(c) constructing, via the computing device, a higher dimensional multi-parametric feature space using the plurality of quantitative descriptors;

(d) reducing, via the computing device, the higher dimensional multi-parametric feature space to a lower dimensional ensemble embedding by an ensemble embedding method comprising:

(i) generating, via the computing device, a plurality of independent embeddings comprising weak embeddings and strong embeddings derived from the higher dimensional multi-parametric feature space, (ii) calculating, via the computing device, an embedding strength for each independent embedding;

(iii) selecting, via the computing device, a plurality of the strong embeddings, wherein the embedding strength of each strong embedding is greater than a pre-specified threshold value;

(iv) constructing, via the computing device, the lower dimensional ensemble embedding by:

(1) quantifying, via the computing device, a plurality of pair-wise relationships for all quantitative descriptors in each strong embedding of the plurality of strong embeddings in step (iii) via a Euclidean pair-wise distance method;

(2) normalizing, via the computing device, the plurality of pair-wise relationships to yield a plurality of normalized relationships; and (3) propagating, via the computing device, the plurality of normalized relationships by a projection method; and (4) obtaining, via the computing device, the lower dimensional ensemble embedding.

(v) optimizing, via the computing device, the generating a plurality of independent embeddings step (i), the calculating an embedding strength step (ii), the selecting a plurality of strong embeddings step (iii), and the constructing the lower dimensional ensemble embedding step (iv); and (e) obtaining, via the computing device, a classification for the biological sample based on the ensemble embedding; and (f) outputting, via the computing device, the classification for the biological sample.

According to some embodiments, the multimodal data is a digital image. According to some such embodiments, the multimodal data is a spectrum.

According to some such embodiments, the plurality of data in the multimodal data comprises a digital image. According to some such embodiments, the plurality of data comprises a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array image. In some embodiments, the digital image is a histopathology image of a diseased tissue. According to some embodiments, the digital image is derived from a biological sample.

According to some such embodiments, the biological sample is a diseased tissue sample. Exemplary diseased tissue samples include, but are not limited to, a tissue sample obtained from a patient with a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) a T2-weighted (T2w) MRI image, (2) a Dynamic Contrast Enhanced (DCE) MRI image, (3) a Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) image is a Diffusion Weighted (DWI) MRI image. According to one embodiment, the magnetic resonance imaging (MRI) image is a proton density (PD) MRI image.

Exemplary protocols include, but are not limited to, a magnetic resonance imaging (MRI) protocol, a positron emission tomography (PET) protocol, a single-photon emission computed tomography (SPECT) protocol, an ultrasound protocol, an x-ray protocol, a computed tomography (CT) protocol, a micro-array protocol, a spectroscopy protocol, a spectrometry protocol, etc.

According to some such embodiments, the protocol is a magnetic resonance imaging (MRI) protocol. According to some such embodiments, the magnetic resonance imaging (MRI) protocol is selected from the group consisting of (1) T2-weighted (T2w) MRI, (2) Dynamic Contrast Enhanced (DCE) MRI, (3) Diffusion Weighted (DWI) MRI, or a combination thereof. According to one embodiment, the magnetic resonance imaging (MRI) protocol is a T2-weighted (T2w) MRI protocol. According to one embodiment, the magnetic resonance imaging (MRI) protocol is a Dynamic Contrast Enhanced (DCE) MRI protocol. According to one embodiment, the magnetic resonance imaging (MRI) protocol is a Diffusion Weighted (DWI) MRI protocol. The T2-weighted (T2w) MRI protocol captures high resolution anatomical information from a histopathology image. The Dynamic Contrast Enhanced (DCE) MRI protocol characterizes microvascular function via uptake and washout of a paramagnetic contrast agent. The Diffusion Weighted (DWI) MRI protocol captures water diffusion restriction via an Apparent Diffusion Coefficient (ADC) map. According to one embodiment, the magnetic resonance imaging (MRI) protocol is a proton density (PD) MRI protocol.

According to some embodiments, the multimodal data is two-dimensional. According to some embodiments, the multimodal data is three-dimensional. According to some embodiments, the multimodal data is multi-dimensional. According to some embodiments, the multimodal data has a resolution ranging between 256×256 voxels and 512×512 voxels. According to one embodiment, the multimodal data has a resolution of 256×256 voxels. According to one embodiment, the multimodal data has a resolution of 512×512 voxels. According to some embodiments, the multimodal data has a resolution ranging from 100×100 voxels to 5000×5000 voxels, including all permutations thereof. According to another embodiment, the multimodal data has a resolution of at least 100×100 voxels. According to another embodiment, the multimodal data has a resolution of at least 200×200 voxels. According to another embodiment, the multimodal data has a resolution of at least 300×300 voxels. According to another embodiment, the multimodal data has a resolution of at least 400×400 voxels. According to another embodiment, the multimodal data has a resolution of at least 500×500 voxels. According to another embodiment, the multimodal data has a resolution of at least 600×600 voxels. According to another embodiment, the multimodal data has a resolution of at least 700×700 voxels. According to another embodiment, the multimodal data has a resolution of at least 800×800 voxels. According to another embodiment, the multimodal data has a resolution of at least 900×900 voxels. According to another embodiment, the multimodal data has a resolution of at least 1000×1000 voxels. According to another embodiment, the multimodal data has a resolution of at least 2000×2000 voxels. According to another embodiment, the multimodal data has a resolution of at least 3000×3000 voxels. According to another embodiment, the multimodal data has a resolution of at least 4000×4000 voxels. According to another embodiment, the multimodal data has a resolution of at least 5000×5000 voxels.

FIG. 1 illustrates an application of ensemble embedding in separating foreground (grey) and background (black) regions via pixel-level classification. FIG. 1(a) shows a simple RGB image to which Gaussian noise was added to the G and B color channels (see FIG. 1(b)). Each of the 3 color channels is considered as a separate feature (i.e., N=3) for all of the image objects (pixels). Classification via replicated k-means clustering (Fred, A. et al., Intelligence 27(6):835-850, 2005) of all the objects (without considering class information) was first performed using the noisy RGB feature information (FIG. 1(b)), in order to distinguish the foreground from background. The labels so obtained for each object (pixel) then are visualized in the image shown in FIG. 1(c), where the color of the pixel corresponds to its cluster label. The 2 colors in FIG. 1(c) hence correspond to the 2 classes (clusters) obtained. No discernible regions are observable in this figure. Application of DR (via GE) reduces the data to an n=2-D space, where the graph embedding algorithm (Shi, J and Malik, J., IEEE Transactions on Pattern Analysis and Machine Intelligence 2000, 22(8):888-905) non-linearly projects the data such that the object classes are maximally discriminable in the reduced dimensional space. However, as seen in FIG. 1(d), clustering this reduced embedding space but does not yield any obviously discernible image partitions either.

By plotting all the objects onto 2D plots using only the R (x-axis)-G (y-axis) (FIG. 1(e)) and R (x-axis)-B (y-axis) (FIG. 1(f)) color channels respectively, it can be observed that separation between the two classes exists only along the R axis. In contrast, the 2D G (x axis)-B (y-axis) plot (FIG. 1(g)) shows no apparent separation between the classes. Combining 1D embeddings obtained via applying graph embedding to FIGS. 1(e) and (f), followed by unsupervised clustering, yields the ensemble embedding result shown in FIG. 1(h). The ensemble embedding method shows results in superior background/foreground partitioning compared to the results shown in FIGS. 1(c),(d).

Dimensionality reduction (DR) enables the construction of a lower dimensional space (embedding) from a higher dimensional feature space while preserving object-class discriminability. However, several popular DR approaches suffer from sensitivity to choice of parameters and/or presence of noise in the data. The ensemble embedding dimensionality reduction (DR) method described herein overcomes these problems by generating and combining multiple low-dimensional embeddings, hence exploiting the variance among them in a manner similar to ensemble classifier schemes such as Bagging.

According to one embodiment, the quantitative descriptor is a pixel. According to another embodiment, the quantitative descriptor is a voxel. According to another embodiment, the quantitative descriptor is a vector. According to another embodiment, the quantitative descriptor is an intensity value.

(a) Inputting, Via a Computing Device, the Multimodal Data

According to some embodiments, the method for analyzing multimodal data derived from a biological sample comprises (a) inputting, via a computing device, the multimodal data comprising a plurality of data.

According to some embodiments, the multimodal data is a digital image. According to some such embodiments, the multimodal data is a spectrum.

According to some such embodiments, the plurality of data in the multimodal data comprises a digital image. According to some such embodiments, the plurality of data comprises a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array image. In some embodiments, the digital image is a histopathology image of a diseased tissue. According to some embodiments, the digital image is derived from a biological sample.

According to some such embodiments, the biological sample is a diseased tissue sample. Exemplary diseased tissue samples include, but are not limited to, a tissue sample obtained from a patient with a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) a T2-weighted (T2w) MRI image, (2) a Dynamic Contrast Enhanced (DCE) MRI image, (3) a Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) image is a Diffusion Weighted (DWI) MRI image. According to one embodiment, the magnetic resonance imaging (MRI) image is a proton density (PD) MRI image.

Exemplary protocols include, but are not limited to, a magnetic resonance imaging (MRI) protocol, a positron emission tomography (PET) protocol, a single-photon emission computed tomography (SPECT) protocol, an ultrasound protocol, an x-ray protocol, a computed tomography (CT) protocol, a micro-array protocol, a spectroscopy protocol, a spectrometry protocol, etc.

According to some such embodiments, the protocol is a magnetic resonance imaging (MRI) protocol. According to some such embodiments, the magnetic resonance imaging (MRI) protocol is selected from the group consisting of (1) T2-weighted (T2w) MRI, (2) Dynamic Contrast Enhanced (DCE) MRI, (3) Diffusion Weighted (DWI) MRI, or a combination thereof. According to one embodiment, the magnetic resonance imaging (MRI) protocol is a T2-weighted (T2w) MRI protocol. According to one embodiment, the magnetic resonance imaging (MRI) protocol is a Dynamic Contrast Enhanced (DCE) MRI protocol. According to one embodiment, the magnetic resonance imaging (MRI) protocol is a Diffusion Weighted (DWI) MRI protocol. The T2-weighted (T2w) MRI protocol captures high resolution anatomical information from a histopathology image. The Dynamic Contrast Enhanced (DCE) MRI protocol characterizes microvascular function via uptake and washout of a paramagnetic contrast agent. The Diffusion Weighted (DWI) MRI protocol captures water diffusion restriction via an Apparent Diffusion Coefficient (ADC) map. According to one embodiment, the magnetic resonance imaging (MRI) protocol is a proton density (PD) MRI protocol.

(b) Generating, Via the Computing Device, a Plurality of Quantitative Descriptors According to some embodiments, the method for analyzing multimodal data derived from a biological sample comprises (b) generating, via the computing device, a plurality of quantitative descriptors to describe the multimodal data.

According to one embodiment, the quantitative descriptor is a pixel. According to another embodiment, the quantitative descriptor is a voxel. According to another embodiment, the quantitative descriptor is a vector. According to another embodiment, the quantitative descriptor is an intensity value.

(c) Constructing, Via the Computing Device, a Higher Dimensional Multi-Parametric Feature Space According to some embodiments, the method for analyzing multimodal data derived from a biological sample comprises (c) constructing, via the computing device, a higher dimensional multi-parametric feature space using the plurality of quantitative descriptors.

(d) Reducing, Via the Computing Device, the Higher Dimensional Multi-Parametric Feature Space to a Lower Dimensional Ensemble Embedding According to some embodiments, the method for analyzing multimodal data derived from a biological sample comprises (d) reducing, via the computing device, the higher dimensional multi-parametric feature space to a lower dimensional ensemble embedding by an ensemble embedding method comprising:
  (i) generating, via the computing device, a plurality of independent embeddings comprising weak embeddings and strong embeddings derived from the higher dimensional multi-parametric feature space,
  (ii) calculating, via the computing device, an embedding strength for each independent embedding;
  (iii) selecting, via the computing device, a plurality of the strong embeddings, wherein the embedding strength of each strong embedding is greater than a pre-specified threshold value;
  (iv) constructing, via the computing device, the lower dimensional ensemble embedding by:
    (1) quantifying, via the computing device, a plurality of pair-wise relationships for all quantitative descriptors in each strong embedding in step (iii) via a Euclidean pair-wise distance method;
    (2) normalizing, via the computing device, the plurality of pair-wise relationships to yield a plurality of normalized relationships;
    (3) propagating, via the computing device, the plurality of normalized relationships by a projection method; and
    (4) obtaining, via the computing device, the lower dimensional ensemble embedding.
  (v) repeating, via the computing device, the generating a plurality of base embeddings step (i), the calculating an embedding strength step (ii), the selecting a plurality of strong embeddings step (iii), and the constructing the lower dimensional ensemble embedding step (iv).

(i) Generating, Via the Computing Device, a Plurality of Independent Embeddings Comprising Weak Embeddings and Strong Embeddings Derived from the Higher Dimensional Multi-Parametric Features Space Step According to some such embodiments, reducing step (d) comprises (i) generating, via the computing device, a plurality of independent embeddings comprising weak embeddings and strong embeddings derived from the higher dimensional multi-parametric feature space.

According to some embodiments, generating step (i) comprises a dimensionality reduction (DR) method to generate the plurality of independent embeddings comprising weak embeddings and strong embeddings. According to some such embodiments, generating step (i) comprises a linear dimensionality reduction (DR) method to generate the plurality of independent embeddings comprising weak embeddings and strong embeddings. Exemplary linear DR methods include, but are not limited to, principal component analysis (PCA) methods, such as described by Jollife (Jollife I: Principal Component Analysis. Springer, 2002), which projects data objects onto the axes of maximum variance.

According to some embodiments, generating step (i) comprises a non-linear dimensionality reduction (DR) method to generate the plurality of independent embeddings comprising weak embeddings and strong embeddings. Non-linear DR involves a non-linear mapping of the data into a reduced dimensional space. Exemplary non-linear DR methods include, but are not limited to locally linear embedding (LLE), such as described by Saul et al. (Saul, L. and Roweis, S., Journal of Machine Learning Research, 4:119-155, 2003), graph embedding (GE) (Shi, J. and Malik, J. IEEE Transactions on Pattern Analysis and Machine Intelligence 22(8): 888-905, 2000), and isometric mapping (ISOMAP) (Tenenbaum, J. et al., Science 290(5500):2319-2323, 2000).

According to some embodiments, generating step (i) comprises a feature space perturbation method to generate the plurality of independent embeddings comprising weak embeddings and strong embeddings.

According to some embodiments, the feature space perturbation method comprises:
  (1) generating, via the computing device, a plurality of boostrapped feature sub-sets from each quantitative descriptor of the plurality of quantitative descriptors contained within the higher dimensional multi-parametric feature space; and
  (2) embedding, via the computing device, a feature space associated with each bootstrapped feature subset of the plurality of boostrapped feature sub-sets into the higher dimensional multi-parametric feature space to create the plurality of independent embeddings.

According to some embodiments, embedding step (2) is implemented by a graph embedding method. According to some such embodiments, the graph embedding method comprises eigenvalue decomposition of the confusion matrix representing adjacencies for the plurality of pair-wise relationships for all quantitative descriptors in the higher dimensional multi-parametric feature space.

Graph Embedding according to Shi et al. can be used. (Shi, J. et al., "Normalized Cuts and Image Segmentation," Pattern Analysis and Machine Intelligence, IEEE Transactions on 22(8), 888-905, 2000). The graph embedding method involves eigenvalue decomposition of a confusion matrix $W \in \Re^{|C| \times |C|}$, representing the adjacencies between all objects $c \in C$ in high-dimensional feature space. The result of GE, X(c), is obtained from the maximization of the function $$S(X) = 2\gamma \times tr\left[\frac{X(D-W)X^T}{XDX^T}\right],$$

where tr is the trace operator, $X=[X(c_1), X(c_2), \ldots, X(c_q)]$, $q=|C|$ and $\gamma=q-1$. D is a diagonal matrix where the diagonal element is defined as $$D(i,i) = \sum_j W(i,j).$$

Eigenvectors corresponding to the smallest n Eigenvalues of $(D-W)X=\lambda DX$ are calculated. The matrix X of the first n Eigenvectors is constructed, and $\forall_c \epsilon C$, $X(c)$ is defined as row i of X, such that $X(c)=[e_v(c)|\epsilon\{1,\ldots,n\}]\epsilon R^n$.

According to one embodiment, generating step (i) is implemented through Algorithm CreateEmbed, as given below:

---
Input: $F(c)\epsilon \mathbb{R}^n$ for all objects $c \epsilon C$, n
Output: $X_m(c) \epsilon \mathbb{R}_m^n$, $m \epsilon \{1, \ldots, M\}$
Data Structures: Feature subsets $\eta_m$, total number of subsets M, number of features in each subset V, DR method $\Phi$
begin
  0. for m = 1 to M do
    1.    Select V < N features from $\mathbb{R}^N$, forming subset $\eta m$;
    2.    Calculate $X_m(c) \epsilon \mathbb{R}_m^n$ for all $c \epsilon C$ using $\eta_m$ and method $\Phi$;
    3. endfor
End.
---

According to another embodiment, generating step (i) is implemented through Algorithm (CreateWeakEmbed) as follows:

---
Algorithm CreateWeakEmbed

Input: $F(c) \in R^N$ for all objects $c \in C$, n
Output: $X_m(c) \in R_m^n$, $m \in \{1, \ldots, M\}$
Data Structures: Feature subsets $F_m$, total number of subsets M, number of features in each subset V begin
  0. for m = 1 to M do
    1.    Select V < N features from $R^N$, forming subset $F_m$;
    2.    Calculate $X_m(c) \in R_m^n$, for all $c \in C$ via GE of the feature space associated with each $F_m$;
    3.    endfor
End.
---

(ii) Calculating, Via the Computing Device, an Embedding Strength for Each Independent Embedding Step According to some such embodiments, reducing step (d) comprises (ii) calculating, via the computing device, an embedding strength for each independent embedding.

According to one embodiment, calculating an embedding strength step (ii) comprises a supervised evaluation method to yield the embedding strength.

The supervised evaluation of embedding strength method is as follows. It was shown that embedding strength increases as a function of classification accuracy (Theorem 1, below), implying that strong embeddings will have high classification accuracies. Intuitively, this can be explained as strong embeddings showing greater class separation compared to weak embeddings. Given a binary labeled set of samples C, the sets of objects corresponding to the two classes are denoted as $S^+$ and $S^-$, such that $C=S^+\cup S^-$ and $S^+\cap S^-=\emptyset$. When using a classification algorithm that does not consider class labels, classification accuracy can be evaluated as follows:

1. Apply classification algorithm to C (embedded in $\mathbb{R}^n$) to find T clusters (unordered, labeled set of objects), denoted via $\hat{\Psi}_\tau$, $t\epsilon\{1, \ldots, T\}$.
2. For each $\hat{\Psi}_\tau$
  (a) Calculate DTP=$|\hat{\Psi}_\tau \cap S^+|$.
  (b) Calculate DTN=$|(C-\hat{\Psi}_\tau)\cap S^-|$.
  (c) Calculate classification accuracy for $\hat{\Psi}_\tau$, as $$\phi^{Acc}(\hat{\Psi}_t) = \frac{DTP + DTN}{|S^+ \cup S^-|}.$$

3. Calculate classification accuracy of $\mathbb{R}^n$ as $\phi^{Acc}$ ($\mathbb{R}^n$)=$\max_{96}[\phi^{Acc}(\hat{\Psi}_\tau)]$.

As classification has been done without considering label information, it should be evaluated which of the clusters so obtained shows the greatest overlap with $S^+$ (the class of interest). Therefore, the classification accuracy of the cluster showing the most overlap with $S^+$ is considered as an approximation of the embedding strength of $\mathbb{R}^n$, i.e., $\psi^{ES}(\mathbb{R}^n) \approx \phi^{Acc}(\mathbb{R}^n)$.

According to another embodiment, calculating an embedding strength step (ii) comprises an unsupervised evaluation method to yield the embedding strength.

Unsupervised evaluation of embedding strength is as follows: A measure, known as the R-squared index (RSI) is used, which is based from cluster validity measures (Halkidi Metal., Journal of Intelligent Information Systems, 17(2-3): 107-145, 2001) and can be calculated as follows:

1. Apply classification algorithm to C (embedded in Rn) to find T clusters (unordered, labeled set of objects), denoted via $\hat{\Psi}_\tau$, $t\epsilon\{1, \ldots, T\}$.
2. $SST=\Sigma_{j=1}^n[\Sigma_{i=1}^R(X(c_j)-\overline{X(c_j)})^2]$ where $\overline{X(c_j)}$ is the mean of data values in the $j^{th}$ dimension).
3. Calculate $$SSB = \sum_{\substack{j=1 \ldots n \\ t=1 \ldots T}} \left[\sum_{i=1}^{|\hat{\Psi}_t|} (X(c_t) - \overline{X(c_j)})^2\right].$$

4. Calculate R-squared index of $\mathbb{R}^n$ as $$\phi^{RS}(\mathbb{R}^n) = \frac{SST - SSB}{SST}$$

RSI may be considered both a measure of the degree of difference between clusters found in a dataset as well as measurement of the degree of homogeneity between them. The values of $\phi^{RS}$ ranges between 0 and 1, where if $\phi^{RS}=1$, no difference exists among clusters. Conversely, a value close to $\phi^{RS}=1$ suggests well-defined, separable clusters in the embedding space. Note that when using RSI to evaluate embedding strength, it will be difficult to ensure that all selected embeddings are strong with no a priori information. In such a case, it can be attempted to ensure that a significant majority of the embeddings selected are strong, which will also ensure that the ensemble embedding $\hat{\mathbb{R}}^n$ is strong (based off Proposition 1).

(iii) Selecting, Via the Computing Device, a Plurality of Strong Embeddings Step According to some such embodiments, reducing step (d) comprises (iii) selecting, via the computing device, a plurality of strong embeddings from the plurality of uncorrelated and independent embeddings, wherein the embedding strength of each strong embedding is greater than a pre-specified threshold value.

The pre-specified threshold value denoted as $\theta$ is a parameter, which is specified to construct the ensemble embedding. It was found that the results are relatively robust to variations in $\theta$. In general, $\theta$ can be defined based on the manner of evaluating the embedding strength in step (ii). The range of $\theta$ is the range of numbers between 0.5 and 1 inclusive. According to some embodiments, the pre-specified threshold value is at least 0.5, at least 0.6, at least 0.7, at least 0.8, at last 0.9, or 1.0. According to one embodiment, the pre-specified threshold value is at least 0.5. According to one embodiment, the pre-specified threshold value is at least 0.6. According to one embodiment, the pre-specified threshold value is at least 0.7. According to one embodiment, the pre-specified threshold value is at least 0.8. According to one embodiment, the pre-specified threshold value is at least 0.9. According to one embodiment, the pre-specified threshold value is 1.0.

According to one embodiment, selecting a plurality of strong embeddings step (iii) is implemented by Algorithm SelEmbed, as follows:

---
Algorithm SelEmbed

Input: $X_m(c) \in \mathbb{R}_m^n$ for all objects $c \in C$, $m \in \{1, \ldots, M\}$
Output: $X_k(c) \in \mathbb{R}_k^n$, $k \in \{1, \ldots, K\}$
Data Structures: A list Q, embedding strength function $\psi^{ES}$, embedding strength threshold $\theta$
begin
  0. for m = 1 to M do
  1.     Calculate $\psi^{ES}(\mathbb{R}_m^n)$;
  2.     If $\psi^{ES}(\mathbb{R}_m^n) > \theta$
  3.     Put m in Q;
  4.     endif
  5. endfor
  6. For each element k of Q, store $X_k(c) \in \mathbb{R}_k^n$ for all objects $c \in C$;
end.
---

(iv) Constructing, Via the Computing Device, the Lower Dimensional Ensemble Embedding Step According to some embodiments, reducing step (d) reducing, via the computing device, the higher dimensional multiparametric feature space to a lower dimensional ensemble embedding by an ensemble embedding method comprises (iv) constructing, via the computing device, the lower dimensional ensemble embedding by:

(1) quantifying, via the computing device, a plurality of pair-wise relationships for all quantitative descriptors in each strong embedding of the plurality of strong embeddings in step (iii) via a Euclidean pair-wise distance method;

(2) normalizing, via the computing device, the plurality of pair-wise relationships to yield a plurality of normalized relationships; and (3) propagating, via the computing device, the plurality of normalized relationships by a projection method; and (4) obtaining, via the computing device, the lower dimensional ensemble embedding.

According to one embodiment, constructing the lower dimensional embedding step (iv) is implemented via Algorithm CalcEnsembleEmbed:

---
Algorithm CalcEnsembleEmbed

Input: $X_k(c) \in \mathbb{R}_k^n$ for all objects $c \in C$, $k \in \{1, \ldots, k\}$
Output: $\tilde{X}(c) \in \tilde{\mathbb{R}}^n$
Data Structures: Confusion matrix W, ML estimator, $\Omega$, projection method $\gamma$
begin
  0. for k = 1 to K do
  1.     Calculate $W_k(i,j) = \|X_k(c) - X_k(d)\|_2$ for all objects $c, d \in C$ with indices i, j;
  2. endfor
  3. Apply normalization to all $W_k$, $k \in \{1, \ldots, K\}$;
  4. Obtain $\tilde{W}(i,j) = \Omega[W_k(i,j)] \forall c, d \in C$;
  5. Apply projection method $\gamma$ to $\tilde{W}$ to obtain final ensemble embedding $\tilde{\mathbb{R}}^n$;
end.
---

(v) Optimizing, Via the Computing Device, the Generating a Plurality of Base Embeddings Step (i), the Computing an Embedding Strength Step (ii), the Selecting a Plurality of Strong Embeddings Step (iii), and the Constructing the Lower Dimensional Ensemble Embedding Step (iv) Step According to some embodiments, reducing step (d) reducing, via the computing device, the higher dimensional multiparametric feature space to a lower dimensional ensemble embedding by an ensemble embedding method, comprises (v) optimizing, via the computing device, the generating a plurality of base embeddings step (i), the computing an embedding strength step (ii), the selecting a plurality of strong embeddings step (iii), and the constructing the lower dimensional ensemble embedding step (iv).

According to some such embodiments, repeating step (v) comprises a fast implementation of a means shift (MS) algorithm to iteratively represent data objects via their most representative cluster centers. A fast implementation of a means shift (MS) algorithm can be according to the method described by Yang et al. (Yang C et al., Improved fast gauss transform and efficient kernel density estimation. In Proc. 9th IEEE Intl Conf. Computer Vision (ICCV), 664-671, 2003).

According to one embodiment, repeating step (v) is implemented through Algorithm EnsembleEmbedMS:

---
Algorithm EnsembleEmbedMS

Input: $F(c) \in \mathbb{R}^N$ for all objects $c \in C$, n
Output: $\tilde{X}(c) \in \tilde{\mathbb{R}}^n$
Data Structures: Reduced set of objects $\bar{c} \in \bar{C}$
begin
  0. Apply MS (Yang C et al., Improved fast gauss transform and efficient kernel density estimation. In Proc. 9th IEEE Int'l Conf. Computer Vision (ICCV), 664-671, 2003) to $\mathbb{R}^N$ resulting in $\mathbb{R}^V$ for sub-sampled set of objects $\bar{c} \in \bar{C}$;
  1. Save Map from sub-sampled set of objects $\bar{c} \in \bar{C}$ to original set of objects $c \in C$;
  2. $X_m(\bar{c}) = \text{CreatEmbed}(F(\bar{c})|\eta_m, \Phi, M, V)$, $\forall m \in \{1, ..., M\}$
  3. $X_k(\bar{c}) = \text{SelEmbed}(X_m(\bar{c})|Q, \psi, \theta), \forall k \in \{1, ..., K\}$, $\forall m \in \{1, ..., M\}$;
  4. $\tilde{X}_k(\bar{c}) = \text{CalcConsEmbed}(X_k(\bar{c})|W, \Omega, \gamma)$, $\forall k \in \{1, ..., K\}$;
  5. Use MS and Map to calculate $\tilde{X}(\bar{c}) \in \tilde{\mathbb{R}}^n$ for all objects $c \in C$;
End.
---

(e) Obtaining, Via the Computing Device, a Classification for the Biological Sample Based on the Ensemble Embedding Step According to some embodiments, the method for analyzing multimodal data derived from a biological sample comprises (e) obtaining, via the computing device, a classification for the biological sample based on the ensemble embedding.

(f) Outputting, Via the Computing Device, the Classification for the Biological Sample According to some embodiments, the method for, analyzing multimodal data derived from a biological sample comprises (f) outputting, via the computing device, the classification for the biological sample.

Ib. A System for Analyzing Multimodal Data

According to another aspect, the described invention provides a system for analyzing multimodal data derived from a biological sample, comprising:

(a) a computing device configured to input the multimodal data comprising a plurality of data;

(b) the computing device configured to generate a plurality of quantitative descriptors to describe the multimodal data;

(c) the computing device configured to construct a higher dimensional multi-parametric feature space using the plurality of quantitative descriptors;

(d) the computing device configured to reduce the higher dimensional multi-parametric feature space to a lower dimensional ensemble embedding by an ensemble embedding method, wherein the computing device is further configured:

(i) to generate a plurality of independent embeddings comprising weak embeddings and strong embeddings derived from the higher dimensional multi-parametric feature space, (ii) to calculate an embedding strength for each independent embedding;

(iii) to select a plurality of the strong embeddings, wherein the embedding strength of each strong embedding is greater than a pre-specified threshold value;

(iv) to construct the lower dimensional ensemble embedding, wherein the computing device is further configured:

(1) to quantify a plurality of pair-wise relationships for all quantitative descriptors in each strong embedding of the plurality of strong embeddings in step (iii) via a Euclidean pair-wise distance method;

(2) to normalize the plurality of pair-wise relationships to yield a plurality of normalized relationships; and (3) to propagate the plurality of normalized relationships by a projection method; and (4) to obtain the lower dimensional ensemble embedding.

(v) to optimize the generating a plurality of independent embeddings step (i), the calculating an embedding strength step (ii), the selecting a plurality of strong embeddings step (iii), and the constructing the lower dimensional ensemble embedding step (iv); and (e) the computing device configured to obtain a classification for the biological sample based on the ensemble embedding; and (f) the computing device configured to output the classification for the biological sample.

According to some embodiments, the multimodal data is a digital image. According to some such embodiments, the multimodal data is a spectrum.

According to some such embodiments, the plurality of data in the multimodal data comprises a digital image. According to some such embodiments, the plurality of data comprises a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array image. In some embodiments, the digital image is a histopathology image of a diseased tissue. According to some embodiments, the digital image is derived from a biological sample.

According to some such embodiments, the biological sample is a diseased tissue sample. Exemplary diseased tissue samples include, but are not limited to, a tissue sample obtained from a patient with a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) a T2-weighted (T2w) MRI image, (2) a Dynamic Contrast Enhanced (DCE) MRI image, (3) a Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) image is a Diffusion Weighted (DWI) MRI image. According to one embodiment, the magnetic resonance imaging (MRI) image is a proton density (PD) MRI image.

Exemplary protocols include, but are not limited to, a magnetic resonance imaging (MRI) protocol, a positron emission tomography (PET) protocol, a single-photon emission computed tomography (SPECT) protocol, an ultrasound protocol, an x-ray protocol, a computed tomography (CT) protocol, a micro-array protocol, a spectroscopy protocol, a spectrometry protocol, etc.

According to some such embodiments, the protocol is a magnetic resonance imaging (MRI) protocol. According to some such embodiments, the magnetic resonance imaging (MRI) protocol is selected from the group consisting of (1) T2-weighted (T2w) MRI, (2) Dynamic Contrast Enhanced (DCE) MRI, (3) Diffusion Weighted (DWI) MRI, or a combination thereof. According to one embodiment, the magnetic resonance imaging (MRI) protocol is a T2-weighted (T2w) MRI protocol. According to one embodiment, the magnetic resonance imaging (MRI) protocol is a Dynamic Contrast Enhanced (DCE) MRI protocol. According to one embodiment, the magnetic resonance imaging (MRI) protocol is a Diffusion Weighted (DWI) MRI protocol. The T2-weighted (T2w) MRI protocol captures high resolution anatomical information from a histopathology image. The Dynamic Contrast Enhanced (DCE) MRI protocol characterizes microvascular function via uptake and washout of a paramagnetic contrast agent. The Diffusion Weighted (DWI) MRI protocol captures water diffusion restriction via an Apparent Diffusion Coefficient (ADC) map. According to one embodiment, the magnetic resonance imaging (MRI) protocol is a proton density (PD) MRI protocol.

According to some embodiments, the multimodal data is two-dimensional. According to some embodiments, the multimodal data is three-dimensional. According to some embodiments, the multimodal data is multi-dimensional. According to some embodiments, the multimodal data has a resolution ranging between 256×256 voxels and 512×512 voxels. According to one embodiment, the multimodal data has a resolution of 256×256 voxels. According to one embodiment, the multimodal data has a resolution of 512×512 voxels. According to some embodiments, the multimodal data has a resolution ranging from 100×100 voxels to 5000×5000 voxels, including all permutations thereof. According to another embodiment, the multimodal data has a resolution of at least 100×100 voxels. According to another embodiment, the multimodal data has a resolution of at least 200×200 voxels. According to another embodiment, the multimodal data has a resolution of at least 300×300 voxels. According to another embodiment, the multimodal data has a resolution of at least 400×400 voxels. According to another embodiment, the multimodal data has a resolution of at least 500×500 voxels. According to another embodiment, the multimodal data has a resolution of at least 600×600 voxels. According to another embodiment, the multimodal data has a resolution of at least 700×700 voxels. According to another embodiment, the multimodal data has a resolution of at least 800×800 voxels. According to another embodiment, the multimodal data has a resolution of at least 900×900 voxels. According to another embodiment, the multimodal data has a resolution of at least 1000×1000 voxels. According to another embodiment, the multimodal data has a resolution of at least 2000×2000 voxels. According to another embodiment, the multimodal data has a resolution of at least 3000×3000 voxels. According to another embodiment, the multimodal data has a resolution of at least 4000×4000 voxels. According to another embodiment, the multimodal data has a resolution of at least 5000×5000 voxels.

According to one embodiment, the quantitative descriptor is a pixel. According to another embodiment, the quantitative descriptor is a voxel. According to another embodiment, the quantitative descriptor is a vector. According to another embodiment, the quantitative descriptor is an intensity value.

(a) A Computing Device Configured to Input the Multimodal Data

According to some embodiments, the system for analyzing multimodal data derived from a biological sample comprises (a) a computing device configured to input the multimodal data comprising a plurality of data.

According to some embodiments, the multimodal data is a digital image. According to some such embodiments, the multimodal data is a spectrum.

According to some such embodiments, the plurality of data in the multimodal data comprises a digital image. According to some such embodiments, the plurality of data comprises a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array image. In some embodiments, the digital image is a histopathology image of a diseased tissue. According to some embodiments, the digital image is derived from a biological sample.

According to some such embodiments, the biological sample is a diseased tissue sample. Exemplary diseased tissue samples include, but are not limited to, a tissue sample obtained from a patient with a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) a T2-weighted (T2w) MRI image, (2) a Dynamic Contrast Enhanced (DCE) MRI image, (3) a Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) image is a Diffusion Weighted (DWI) MRI image. According to one embodiment, the magnetic resonance imaging (MRI) image is a proton density (PD) MRI image.

Exemplary protocols include, but are not limited to, a magnetic resonance imaging (MRI) protocol, a positron emission tomography (PET) protocol, a single-photon emission computed tomography (SPECT) protocol, an ultrasound protocol, an x-ray protocol, a computed tomography (CT) protocol, a micro-array protocol, a spectroscopy protocol, a spectrometry protocol, etc.

According to some such embodiments, the protocol is a magnetic resonance imaging (MRI) protocol. According to some such embodiments, the magnetic resonance imaging (MRI) protocol is selected from the group consisting of (1) T2-weighted (T2w) MRI, (2) Dynamic Contrast Enhanced (DCE) MRI, (3) Diffusion Weighted (DWI) MRI, or a combination thereof. According to one embodiment, the magnetic resonance imaging (MRI) protocol is a T2-weighted (T2w) MRI protocol. According to one embodiment, the magnetic resonance imaging (MRI) protocol is a Dynamic Contrast Enhanced (DCE) MRI protocol. According to one embodiment, the magnetic resonance imaging (MRI) protocol is a Diffusion Weighted (DWI) MRI protocol. The T2-weighted (T2w) MRI protocol captures high resolution anatomical information from a histopathology image. The Dynamic Contrast Enhanced (DCE) MRI protocol characterizes microvascular function via uptake and washout of a paramagnetic contrast agent. The Diffusion Weighted (DWI) MRI protocol captures water diffusion restriction via an Apparent Diffusion Coefficient (ADC) map. According to one embodiment, the magnetic resonance imaging (MRI) protocol is a proton density (PD) MRI protocol.

(b) The Computing Device Configured to Generate a Plurality of Quantitative Descriptors According to some embodiments, the system for analyzing multimodal data derived from a biological sample comprises (b) the computing device configured to generate a plurality of quantitative descriptors.

According to one embodiment, the quantitative descriptor is a pixel. According to another embodiment, the quantitative descriptor is a voxel. According to another embodiment, the quantitative descriptor is a vector. According to another embodiment, the quantitative descriptor is an intensity value.

(c) The Computing Device Configured to Construct a Higher Dimensional Multi-Parametric Feature Space Using the Plurality of Quantitative Descriptors According to some embodiments, the system for analyzing multimodal data derived from a biological sample comprises (c) the computing device configured to construct a higher dimensional multi-parametric feature space using the plurality of quantitative descriptors.

(d) The Computing Device Configured to Reduce the Higher Dimensional Multi-Parametric Feature Space to a Lower Dimensional Ensemble Embedding According to some embodiments, the system for analyzing multimodal data derived from a biological sample comprises (d) the computing device configured to reduce the higher dimensional multi-parametric feature space to a lower dimensional ensemble embedding by an ensemble embedding method, wherein the computing device is further configured:
  (i) to generate a plurality of independent embeddings comprising weak embeddings and strong embeddings derived from the higher dimensional multi-parametric feature space,
  (ii) to calculate an embedding strength for each independent embedding;
  (iii) to select a plurality of the strong embeddings, wherein the embedding strength of each strong embedding is greater than a pre-specified threshold value;
  (iv) to construct the lower dimensional ensemble embedding, wherein the computing device is further configured:
    (1) to quantify a plurality of pair-wise relationships for all quantitative descriptors in each strong embedding of the plurality of strong embeddings in step (iii) via a Euclidean pair-wise distance method;
    (2) to normalize the plurality of pair-wise relationships to yield a plurality of normalized relationships; and
    (3) to propagate the plurality of normalized relationships by a projection method; and
    (4) to obtain the lower dimensional ensemble embedding.
  (v) to optimize the generating a plurality of independent embeddings step (i), the calculating an embedding strength step (ii), the selecting a plurality of strong embeddings step (iii), and the constructing the lower dimensional ensemble embedding step (iv).

(i) To Generate a Plurality of Independent Embeddings Comprising Weak Embeddings and Strong Embeddings Derived from the Higher Dimensional Multi-Parametric Feature Space According to some embodiments, computing device (d) is further configured (i) to generate a plurality of independent embeddings comprising weak embeddings and strong embeddings derived from the higher dimensional multi-parametric feature space.

According to some embodiments, the computing device (d) is further configured (i) to generate a plurality of independent embeddings comprising weak embeddings and strong embeddings derived from the higher dimensional multi-parametric feature space by implementing a dimensionality reduction (DR) method to generate the plurality of independent embeddings comprising weak embeddings and strong embeddings. According to some such embodiments, generating step (i) comprises a linear dimensionality reduction (DR) method to generate the plurality of independent embeddings comprising weak embeddings and strong embeddings. Exemplary linear DR methods include, but are not limited to, principal component analysis (PCA) methods, such as described by Jollife (Jollife I: Principal Component Analysis. Springer, 2002), which projects data objects onto the axes of maximum variance.

According to some embodiments, the computing device (d) is further configured (i) to generate a plurality of independent embeddings comprising weak embeddings and strong embeddings derived from the higher dimensional multi-parametric feature space by implementing a non-linear dimensionality reduction (DR) method to generate the plurality of independent embeddings comprising weak embeddings and strong embeddings. Non-linear DR involves a non-linear mapping of the data into a reduced dimensional space. Exemplary non-linear DR methods include, but are not limited to locally linear embedding (LLE), such as described by Saul et al. (Saul, L. and Roweis, S., Journal of Machine Learning Research, 4:119-155, 2003), graph embedding (GE) (Shi, J. and Malik, J. IEEE Transactions on Pattern Analysis and Machine Intelligence 22(8):888-905, 2000), and isometric mapping (ISOMAP) (Tenenbaum, J. et al., Science 290 (5500):2319-2323, 2000).

According to some embodiments, the computing device (d) further configured (i) to generate a plurality of independent embeddings comprising weak embeddings and strong embeddings derived from the higher dimensional multi-parametric feature space by implementing a feature space perturbation method to generate the plurality of independent embeddings comprising weak embeddings and strong embeddings.

According to some embodiments, the computing device (d) further configured (i) to generate a plurality of independent embeddings is further configured:
  (1) to generate a plurality of boostrapped feature sub-sets from each quantitative descriptor of the plurality of quantitative descriptors contained within the higher dimensional multi-parametric feature space; and
  (2) to embed a feature space associated with each bootstrapped feature subset of the plurality of boostrapped feature sub-sets into the higher dimensional multi-parametric feature space to create the plurality of independent embeddings.

According to some embodiments, the computing device (d) further configured (i) to generate a plurality of independent embeddings is further configured (2) to embed a feature space associated with each bootstrapped feature subset of the plurality of boostrapped feature sub-sets into the higher dimensional multi-parametric feature space to create the plurality of independent embeddings by implementing by a graph embedding method. According to some such embodiments, the graph embedding method comprises eigenvalue decomposition of the confusion matrix representing adjacencies for the plurality of pair-wise relationships for all quantitative descriptors in the higher dimensional multi-parametric feature space.

Graph Embedding according to Shi et al. can be used. (Shi, J. et al., "Normalized Cuts and Image Segmentation," Pattern Analysis and Machine Intelligence, IEEE Transactions on 22(8), 888-905, 2000). The graph embedding method involves eigenvalue decomposition of a confusion matrix $W \in \Re^{|C| \times |C|}$, representing the adjacencies between all objects $c \in C$ in high-dimensional feature space. The result of GE, $X(c)$, is obtained from the maximization of the function $$S(X) = 2\gamma \times tr\left[\frac{X(D-W)X^T}{XDX^T}\right],$$

where tr is the trace operator, $X=[X(c_1), X(c_2), \ldots, X(c_q)]$, $q=|C|$ and $\gamma=q-1$. D is a diagonal matrix where the diagonal element is defined as $$D(i,i) = \sum_j W(i,j).$$

Eigenvectors corresponding to the smallest n Eigenvalues of $(D-W)X=\lambda DX$ are calculated. The matrix X of the first n Eigenvectors is constructed, and $\forall_c \in C$, X (c) is defined as row i of X, such that $X(c)=[e_v(c)|v\in\{1,\ldots,n\}]\in R^n$.

According to one embodiment, generating step (i) is implemented through Algorithm CreateEmbed, as given below:

Input: $F(c) \in \mathbb{R}^n$ for all objects $c \in C$, n
Output: $X_m(c) \in \mathbb{R}_m^n$, $m \in \{1, \ldots, M\}$
Data Structures: Feature subsets $\eta_m$, total number of subsets M, number of features in each subset V, DR method $\Phi$
begin
  0. for m = 1 to M do
    1.    Select V < N features from $\mathbb{R}^N$, forming subset $\eta m$;
    2.    Calculate $X_m$, (c) $\in \mathbb{R}_m^n$ for all $c \in C$ using $\eta_m$ and method $\Phi$;
    3. endfor
End.

According to some embodiments, the computing device (d) further configured (i) to generate a plurality of independent embeddings comprising weak embeddings and strong embeddings derived from the higher dimensional multi-parametric feature space by implementing the following steps of Algorithm (CreateWeakEmbed) as follows:

Algorithm CreateWeakEmbed

Input: $F(c) \in R^N$ for all objects $c \in C$, n
Output: $X_m(c) \in R_m^n$, $m \in \{1, \ldots, M\}$
Data Structures: Feature subsets $F_m$, total number of subsets M, number of features in each subset V begin
  0. for m = 1 to M do
    1.    Select V < N features from $R^N$, forming subset $F_m$;
    2.    Calculate $X_m(c) \in R_m^n$, for all $c \in C$ via GE of the feature
space
      associated with each $F_m$;
    3.    endfor
End.

(ii) To Calculate an Embedding Strength for Each Independent Embedding

According to some such embodiments, computing device (d) is further configured (ii) to calculate an embedding strength for each independent embedding.

According to one embodiment, computing device (d) further configured (ii) to calculate an embedding strength (ii) is further configured to use a supervised evaluation method to yield the embedding strength.

The supervised evaluation of embedding strength method is as follows. It was shown that embedding strength increases as a function of classification accuracy (Theorem 1, below), implying that strong embeddings will have high classification accuracies. Intuitively, this can be explained as strong embeddings showing greater class separation compared to weak embeddings. Given a binary labeled set of samples C, the sets of objects corresponding to the two classes are denoted as $S^+$ and $S^-$, such that $C=S^+ \cup S^-$ and $S^+ \cap S^- = \emptyset$. When using a classification algorithm that does not consider class labels, classification accuracy can be evaluated as follows:

1. Apply classification algorithm to C (embedded in $\mathbb{R}^n$) to find T clusters (unordered, labeled set of objects), denoted via $\hat{\Psi}_\tau$, $t \in \{1, \ldots, T\}$.
2. For each $\hat{\Psi}_\tau$
  (a) Calculate $DTP=|\hat{\Psi}_{96} \cap S^+|$.
  (b) Calculate $DTN=|(C-\hat{\Psi}_\tau) \cap S^-|$.
  (c) Calculate classification accuracy for $\hat{\Psi}_\tau$, as $$\phi^{Acc}(\hat{\Psi}_t) = \frac{DTP+DTN}{|S^+ \cup S^-|}.$$

3. Calculate classification accuracy of $\mathbb{R}^n$ as $\phi^{Acc}(\mathbb{R}^n)=\max_\tau [\phi^{Acc}(\hat{\Psi}_\tau)]$.

As classification has been done without considering label information, it should be evaluated which of the clusters so obtained shows the greatest overlap with $S^+$ (the class of interest). Therefore, the classification accuracy of the cluster showing the most overlap with $S^+$ is considered as an approximation of the embedding strength of $\mathbb{R}^n$, i.e., $\psi^{ES}(\mathbb{R}^n) \approx \phi^{Acc}(\mathbb{R}^n)$.

According to one embodiment, computing device (d) further configured (ii) to calculate an embedding strength (ii) is further configured to use an unsupervised evaluation method to yield the embedding strength.

Unsupervised evaluation of embedding strength is as follows: A measure, known as the R-squared index (RSI) is used, which is based from cluster validity measures (Halkidi M et al., Journal of Intelligent Information Systems, 17(2-3): 107-145, 2001) and can be calculated as follows:
1. Apply classification algorithm to C (embedded in Rn) to find T clusters (unordered, labeled set of objects), denoted via $\hat{\Psi}_\tau$, $t \in \{1, \ldots, T\}$.
2. $SST = \sum_{j=1}^{n}[\sum_{i=1}^{R}(X(c_i) - \overline{X(c_j)})^2]$ where $\overline{X(c_j)}$ is the mean of data values in the $j^{th}$ dimension).
3. Calculate $$SSB = \sum_{\substack{j=1\ldots n \\ t=1\ldots T}}\left[\sum_{i=1}^{|\hat{\Psi}_t|}(X(c_t) - \overline{X(c_j)})^2\right].$$

4. Calculate R-squared index of $\mathbb{R}^n$ as $$\phi^{RS}(\mathbb{R}^n) = \frac{SST - SSB}{SST}$$

RSI may be considered both a measure of the degree of difference between clusters found in a dataset as well as measurement of the degree of homogeneity between them. The values of $\phi^{RS}$ ranges between 0 and 1, where if $\phi^{RS}=1$, no difference exists among clusters. Conversely, a value close to $\phi^{RS}=1$ suggests well-defined, separable clusters in the embedding space. Note that when using RSI to evaluate embedding strength, it will be difficult to ensure that all selected embeddings are strong with no a priori information. In such a case, it can be attempted to ensure that a significant majority of the embeddings selected are strong, which will also ensure that the ensemble embedding $\hat{\mathbb{R}}^n$ is strong (based off Proposition 1).

(iii) To Select a Plurality of the Strong Embeddings

According to some embodiments, computing device (d) is further configured to (iii) to select a plurality of the strong embeddings, wherein the embedding strength of each strong embedding is greater than a pre-specified threshold value.

The pre-specified threshold value denoted as $\theta$ is a parameter, which is specified to construct the ensemble embedding. It was found that the results are relatively robust to variations in $\theta$. In general, $\theta$ can be defined based on the manner of evaluating the embedding strength in step (ii). The range of $\theta$ is the range of numbers between 0.5 and 1 inclusive. According to some embodiments, the pre-specified threshold value is at least 0.5, at least 0.6, at least 0.7, at least 0.8, at last 0.9, or 1.0. According to one embodiment, the pre-specified threshold value is at least 0.5. According to one embodiment, the pre-specified threshold value is at least 0.6. According to one embodiment, the pre-specified threshold value is at least 0.7. According to one embodiment, the pre-specified threshold value is at least 0.8. According to one embodiment, the pre-specified threshold value is at least 0.9. According to one embodiment, the pre-specified threshold value is 1.0.

According to some embodiments, computing device (d) further configured to (iii) to select a plurality of the strong embeddings, is further configured to implement the following steps of Algorithm SelEmbed, as follows:

---
Algorithm SelEmbed

Input: $X_m(c) \in \mathbb{R}_m^n$ for all objects $c \in C$, $m \in (1, \ldots, M)$
Output: $X_k(c) \in \mathbb{R}_k^n$, $k \in \{1, \ldots, K\}$
Data Structures: A list Q, embedding strength function $\psi^{ES}$, embedding strength threshold $\theta$
begin
  0. for m = 1 to M do
    1.    Calculate $\psi^{ES}(\mathbb{R}_m^n)$;
    2.    If $\psi^{ES}(\mathbb{R}_m^n) > \theta$
    3.    Put m in Q;
    4.    endif
    5. endfor
  6. For each element k of Q, store $X_k(c) \in \mathbb{R}_k^n$ for all objects $c \in C$;
end.

---

(iv) To Construct the Lower Dimensional Ensemble Embedding

According to some embodiments, computing device (d) configured to reduce the higher dimensional multi-parametric feature space to a lower dimensional ensemble embedding by an ensemble embedding method is further configured (iv) to construct the lower dimensional ensemble embedding, wherein the computing device is further configured:
  (1) to quantify a plurality of pair-wise relationships for all quantitative descriptors in each strong embedding of the plurality of strong embeddings in step (iii) via a Euclidean pair-wise distance method;
  (2) to normalize the plurality of pair-wise relationships to yield a plurality of normalized relationships; and
  (3) to propagate the plurality of normalized relationships by a projection method; and
  (4) to obtain the lower dimensional ensemble embedding.

According to one embodiment, computing device (d) configured to reduce the higher dimensional multi-parametric feature space to a lower dimensional ensemble embedding by an ensemble embedding method further configured (iv) to construct the lower dimensional ensemble embedding is further configured to implement the following steps of Algorithm CalcEnsembleEmbed:

---
Algorithm CalcEnsembleEmbed

Input: $X_k(c) \in \mathbb{R}_k^n$ for all objects $c \in C$, $k \in \{1, \ldots, k\}$
Output: $\tilde{X}(c) \in \tilde{\mathbb{R}}^n$
Data Structures: Confusion matrix W, ML estimator, $\Omega$, projection method $\gamma$
begin
  0. for k = 1 to K do
    1.    Calculate $W_k(i, j) = \|X_k(c) - X_k(d)\|_2$ for all objects c, $d \in C$ with indices i, j;
  2. endfor
  3. Apply normalization to all $W_k$, $k \in \{1, \ldots, K\}$;
  4. Obtain $\tilde{W}(i, j) = \Omega[W_k(i, j)] \forall c, d \in C$;
  5. Apply projection method $\gamma$ to $\tilde{W}$ to obtain final ensemble embedding $\tilde{\mathbb{R}}^n$;
end.

---

(v) To Optimize the Generating a Plurality of Independent Embeddings Step (i), the Calculating an Embedding Strength Step (ii), the Selecting a Plurality of Strong Embeddings Step (iii), and the Constructing the Lower Dimensional Ensemble Embedding Step (iv)

According to some embodiments, computing device (d) configured to reduce the higher dimensional multi-parametric feature space to a lower dimensional ensemble embedding by an ensemble embedding method is further configured (v) to optimize the generating a plurality of base embeddings step (i), the computing an embedding strength step (ii), the selecting a plurality of strong embeddings step (iii), and the constructing the lower dimensional ensemble embedding step (iv).

According to some embodiments, computing device (d) configured to reduce the higher dimensional multi-parametric feature space to a lower dimensional ensemble embedding by an ensemble embedding method further configured (v) to optimize is further configured to apply a fast implementation of a means shift (MS) algorithm to iteratively represent data objects via their most representative cluster centers. A fast implementation of a means shift (MS) algorithm can be according to the method described by Yang et al. (Yang C et al., Improved fast gauss transform and efficient kernel density estimation. In Proc. 9th IEEE Int'l Conf. Computer Vision (ICCV), 664-671, 2003).

According to one embodiment, computing device (d) configured to reduce the higher dimensional multi-parametric feature space to a lower dimensional ensemble embedding by an ensemble embedding method further configured (v) to optimize is further configured to implement the following steps of Algorithm EnsembleEmbedMS:

---
Algorithm EnsembleEmbedMS

Input: $F(c) \in \mathbb{R}^N$ for all objects $c \in C$, n
Output: $\tilde{X}(c) \in \tilde{\mathbb{R}}^n$
Data Structures: Reduced set of objects $\bar{c} \in \bar{C}$
begin
  0. Apply MS (Yang C et al., Improved fast gauss transform and efficient kernel density estimation. In Proc. 9th IEEE Int'l Conf. Computer Vision (ICCV), 664-671, 2003) to $\mathbb{R}^N$ resulting in $\bar{\mathbb{R}}^N$ for sub-sampled set of objects $\bar{c} \in \bar{C}$;
  1. Save Map from sub-sampled set of objects $\bar{c} \in \bar{C}$ to original set of objects $c \in C$;
  2. $X_m(\bar{c})$ = CreatEmbed($F(\bar{c})|\eta_m, \Phi, M, V$), $\forall m \in \{1, \ldots, M\}$;
  3. $X_k(\bar{c})$ = SelEmbed($X_m(\bar{c})|Q, \psi, \theta$), $\forall k \in \{1, \ldots, K\}$, $\forall m \in \{1, \ldots, M\}$;
  4. $\tilde{X}_k(\bar{c})$ = CalcConsEmbed($X_k(\bar{c})|W, \Omega, \gamma$), $\forall k \in \{1, \ldots, K\}$;
  5. Use MS and Map to calculate $\tilde{X}(c) \in \tilde{\mathbb{R}}^n$ for all objects $c \in C$;
End.

(e) The Computing Device Configured to Obtain a Classification for the Biological Sample According to some embodiments, the system for analyzing multimodal data derived from a biological sample comprises (e) the computing device configured to obtain a classification for the biological sample based on the ensemble embedding.

(f) The Computing Device Configured to Output the Classification for the Biological Sample According to some embodiments, the system for analyzing multimodal data derived from a biological sample comprises (f) the computing device configured to output the classification for the biological sample.

1. THEORY OF ENSEMBLE EMBEDDING

Ensemble embedding includes generation and combination of multiple embeddings in order to construct a more stable, stronger result. Thus, first, various terms associated with embedding construction are defined. Based on these, the concept of generating and combining multiple independent embeddings comprising weak embeddings and strong embeddings can be formalized mathematically, which in turn make it possible to derive necessary and sufficient conditions that must be satisfied when constructing a ensemble embedding. Based on these conditions the specific algorithmic steps are presented in more detail below. Notation that is used in this section is summarized in Table 1.

TABLE 1

Notation and symbols

| | | | |
|---|---|---|---|
| $\mathbb{R}^N$ | High(N)-dimensional space | $\mathbb{R}^n$ | Low(n)-dimensional space |
| c, d, e | Objects in set C | Z | Number of unique triplets in C |
| F(c) | High-dimensional feature vector | X(c) | Embedding vector |
| $\Lambda^{cd}$ | Pairwise relationship in $\mathbb{R}^N$ | $\delta^{cd}$ | Pairwise relationship in $\mathbb{R}^n$ |
| $\Delta(c, d, e)$ | Triangle relationship (Defn. 1) | $\psi^{ES}(\mathbb{R}^n)$ | Embedding strength (Defn. 2) |
| $\hat{\mathbb{R}}^n$ | True embedding (Defn. 3) | $\hat{\delta}^{cd}$ | Pairwise relationship in $\hat{\mathbb{R}}^n$ |
| $\mathring{\mathbb{R}}^n$ | Strong embedding (Defn. 4) | $\mathbb{R}_n$ | Weak embedding |
| $\tilde{\mathbb{R}}^n$ | Consensus embedding (Defn. 5) | $\tilde{\delta}^{cd}$ | Pairwise relationship in $\tilde{\mathbb{R}}^n$ |
| M | Number of generated embeddings | K | Number of selected embeddings |
| R | Number of objects in C | $\tilde{X}(c)$ | Consensus embedding vector |

An object is referred to by its label c and is defined as a point in an N-dimensional space $\mathbb{R}^N$. It is represented by an N-tuple F(c) comprising its unique N-dimensional co-ordinates. In a sub-space $\mathbb{R}^N \subset \mathbb{R}^n$ such that n<<N, this object c in a set C is represented by an n-tuple of its unique n-dimensional coordinates X(c). $\mathbb{R}^n$ is also known as the embedding of objects c∈C and is always calculated via some projection of $\mathbb{R}^N$. For example in the case of R3, F(c)={$f_1, f_2, f_3$} can be defined based on the co-ordinate locations {$f_1, f_2, f_3$} on each of the 3 axes for object. The corresponding embedding vector of c∈C in $\mathbb{R}^2$ will be X(c)={$e_1, e_2$} with co-ordinate axes locations ($e_1, e_2$). Note that in general, determining the target dimensionality (n) for any $\mathbb{R}^N$ may be done by a number of algorithms such as the one used in Levina, E et al. (Maximum Likelihood Estimation of Intrinsic Dimension. In Proc. Adv. Neural Information Processing Systems (NIPS), Volume 17, MIT Press, 777-784, 2005)

The notation $\Lambda^{cd}$, henceforth referred to as the pairwise relationship, will represent the relationship between two objects c, d∈C with corresponding vectors F(c). F(d)∈$\mathbb{R}^N$. Similarly, the notation $\delta^{cd}$ will be used to represent the pairwise relationship between two objects c, d∈C with embedding vectors X(c), X(d)∈$\mathbb{R}^n$. It is assumed that this relationship satisfies the three properties of a metric (e.g. Euclidean distance). Finally, a triplet of objects c, d, e∈C is referred to as an unique triplet if c≠d, d≠e and c≠e. Unique triplets will be denoted simply as (c, d, e).

2. DEFINITIONS

Definition 1

The function $\Delta$ defined on a unique triplet (c, d, e) is called a triangle relationship, $\Delta(c, d, e)$, if when $\Lambda^{cd} < \Lambda^{ce}$ and $\Lambda^{cd} < \Lambda^{de}$, then $\delta^{cd} < \delta^{ce}$ and $\delta^{cd} < \delta^{de}$.

For objects c, d∈C whose relative pairwise relationships in $\mathbb{R}^N$ are preserved in $\mathbb{R}^n$, the triangle relationship $\Delta(c, d, e)=1$. For ease of notation, the triangle relationship $\Delta(c, d, e)$ will be referred to as $\Delta$ where appropriate. Note that for a set of R unique objects (R=|C|,|.| is cardinality of a set), $$Z = \frac{R!}{3!(R-3)!}$$

unique triplets may be formed.

Definition 2

Given Z unique triplets c, d∈C and an embedding $\mathbb{R}^n$ of all objects c, d, e∈C, the associated embedding strength $$\psi^{ES}(\mathbb{R}^n) = \frac{\sum_C \Delta(c, d, e)}{Z}.$$

The embedding strength (ES) of an embedding $\mathbb{R}^n$, denoted $\psi^{ES}(\mathbb{R}^n)$ is hence the fraction of unique triplets c, d, e∈C for which $\psi^{ES}(\hat{\mathbb{R}}^n)=1$.

Definition 3

A true embedding, $\hat{\mathbb{R}}^n$, is an embedding for which $\psi^{ES}(\hat{\mathbb{R}}^n)=1$.

A true embedding $\hat{\mathbb{R}}^n$ is one for which the triangle relationship is satisfied for all unique triplets c, d, e∈C, hence perfectly preserving all pairwise relationships from $\mathbb{R}^N$ to $\hat{\mathbb{R}}^n$. Additionally, for all objects c, d∈C in $\hat{\mathbb{R}}^n$, the pairwise relationship is denoted as $\hat{\delta}^{cd}$.

Note that according to Definition 3, the most optimal true embedding may be considered to be the original $\mathbb{R}^N$ itself, i.e., $\hat{\delta}^{cd}=\Lambda^{cd}$. However, as RN may not be optimal for classification (due to the curse of dimensionality), it is attempted to approximate a true embedding as best possible in n-D space.

Note that multiple true embeddings in n-D space may be calculated from a single $\mathbb{R}^N$; any one of these may be chosen to calculate $\hat{\delta}^{cd}$.

Practically speaking, any $\mathbb{R}^n$ will be associated with some degree of error compared to the original $\mathbb{R}^N$. This is almost a given since some loss of information and concomitant error can be expected to occur in going from a high- to a low-dimensional space. The probability of pairwise relationships can be calculated as being accurately preserved from $\mathbb{R}^N$ to $\mathbb{R}^n$, i.e., the probability that $\Delta(c, d, e)=1$ for any unique triplet$(c, d, e) \in C$ in any $\mathbb{R}^n$ as, $$p(\Delta | c, d, e, \mathbb{R}^n) = \frac{\sum_C \Delta(c, d, e)}{Z}. \quad \text{Equation [1]}$$

Note that the probability in Equation 1 is binomial as the complementary probability to $p(\Delta|c, d, e, \mathbb{R}^n)$ (i.e. the probability that $\Delta(c, d, e) \neq 1$ for any unique triplet $(c, d, e) \in C$ in any $\mathbb{R}^n$) is given by $1-1-p(\Delta|c, d, e, \mathbb{R}^n)$ (in the case of binomial probabilities, event outcomes can be broken down into two probabilities which are complementary, i.e. they sum to 1).

Definition 4

A strong embedding, $\ddot{\mathbb{R}}^n$, is an embedding for which $\psi^{ES}(\ddot{\mathbb{R}}^n) > \theta$.

In other words, a strong embedding is defined as one which accurately preserves the triangle relationship for more than some significant fraction ($\theta$) of the unique triplets of objects $e, d, e \in C$, that exist. An embedding $\mathbb{R}^n$, which is not a strong embedding is referred to as a weak embedding, denoted as $\dot{\mathbb{R}}^n$. Multiple uncorrelated (i.e. independent) embeddings can be calculated from a single $\mathbb{R}^N$, which may be denoted as $R_m^n$, $m \in \{1, \ldots, M\}$, where M is total number of possible uncorrelated embeddings. Note that both strong and weak embeddings will be present among all of the M possible embeddings. All objects $c, d \in C$ can then be characterized by corresponding embedding vectors $X_m(c), X_m(d) \in R_m^n$ with corresponding pairwise relationship $\delta_m^{cd}$. Given multiple $\delta_m^{cd}$, a distribution $p(X=\delta_m^{cd})$ can be formed, over all M embeddings. It is hypothesized that the maximum likelihood estimate (MLE) of $p(X=\delta_m^{cd})$, denoted as $\hat{\delta}_m^{cd}$, will approximate the true pairwise relationship $\hat{\delta}^{cd} \hat{} \delta cd$ for objects $c, d \in C$.

Definition 5

An embedding $\mathbb{R}^n$ is called a ensemble embedding, $\hat{\mathbb{R}}^n$, if for all objects $c, d \in C$ $\delta^{cd} = \tilde{\delta}^{cd}$. The ensemble embedding vectors for all objects are denoted as $c \in C$ by $\tilde{X}(c) \in \hat{\mathbb{R}}^n$. Additionally, from Equation [1], $p(\Delta|c, d, e, \hat{\mathbb{R}}^n)$ represents the probability that $\Delta(c, d, e)=1$ for any $(c, d, e) \in C$ in $\hat{\mathbb{R}}^n$.

3. NECESSARY AND SUFFICIENT CONDITIONS FOR ENSEMBLE EMBEDDING

While $\hat{\mathbb{R}}^n$ is expected to approximate $\hat{\mathbb{R}}^n$ as best possible, it cannot be guaranteed that $\psi^{ES}(\hat{\mathbb{R}}^n)=1$ as this is dependent on how well $\hat{\delta}^{cd}$ approximates $\hat{\delta}^{cd}$, for all objects $c, d \in C$. PC. $\hat{\delta}^{cd}$ may be calculated inaccurately as a result of considering pairwise relationships derived from weak embeddings, $\dot{\mathbb{R}}^n$, present amongst the M embeddings that are generated. As Proposition 1 and Lemma 1 below demonstrate, in order to ensure that $\psi^{ES}(\hat{\mathbb{R}}^n) \to 1$, $\hat{\mathbb{R}}^n$ must be constructed from a combination of multiple strong embeddings $\ddot{\mathbb{R}}^n$ alone, so as to avoid including weak embeddings.

Proposition 1

If $K \leq M$ independent, strong embeddings $\mathbb{R}_k^n$, $k \in \{1, \ldots, K\}$, with a constant $p(\Delta|c, d, e, \mathbb{R}_k^n)$ that $\Delta(c, d, e)=1$ for all $(c, d, e) \in C$ are used to calculate $\mathbb{R}^n$, $\psi^{ES}(\hat{\mathbb{R}}^n) \to 1$ as $K \to \infty$.

Lemma 1

If $K \leq M$ independent, weak embeddings $\mathbb{R}_k^n$, $k \in \{1, \ldots, K\}$, with, $\psi^{ES}(\mathbb{R}_k^n) \leq \theta$ are used to calculate $\hat{\mathbb{R}}^n$, then $\psi^{ES}(\hat{\mathbb{R}}^n) \ll \theta$.

Proof.

From Equation 1 and Definitions 2, 4, if, $\psi^{ES}(\mathbb{R}_k^n) \leq \theta$ then $p(\Delta|c, d, e, \mathbb{R}_k^n) \leq \theta$. Substituting $p(\Delta|c, d, e, \mathbb{R}_k^n)$ in Equation 2, will result in $p(\Delta|c, d, e, \hat{\mathbb{R}}^n) \ll \theta$. Thus $\psi^{ES}(\hat{\mathbb{R}}^n) \ll \theta$ and $\hat{\mathbb{R}}^n$ will be weak.

Proposition 1 and Lemma 1 together demonstrate the necessary and sufficient nature of the conditions required to construct a ensemble embedding: that if a total of M base embeddings are calculated from a single RN, some minimum number of strong embeddings (K≤M) must be considered to construct a $\hat{\mathbb{R}}^n$ that is a strong embedding. Further, a $\hat{\mathbb{R}}^n$ so constructed will have an embedding strength $\psi(\hat{\mathbb{R}}^n)$ that will increase significantly as more strong embeddings are included in its computation. Appendix B shows an additional property of $\hat{\mathbb{R}}^n$ showing that it preserves information from RN with less inherent error than any $\hat{\mathbb{R}}^n$ used in its construction.

4. ALGORITHMS AND IMPLEMENTATION

Based on Proposition 1, 3 distinct steps are typically required for calculating a ensemble embedding. First, a number of base embeddings (M), the steps for which are described CreateEmbed, are generated. Then strong embeddings are selected from amongst M base embeddings generated, which are described in SelEmbed. Criteria for selecting strong embeddings also are presented below. Selected embeddings are combined to result in the final ensemble embedding representation as explained in CalcEnsembleEmbed. Some of the computational considerations of the implementation of algorithm is presented below.

Creating n-Dimensional Data Embeddings

One of the requirements for ensemble embedding is the calculation of multiple uncorrelated, independent embeddings $\mathbb{R}^n$ from a single $\mathbb{R}^N$. This is also true of ensemble classification systems such as Boosting (Freund Y, Schapire R: A decision-theoretic generalization of on-line learning and an application to boosting. In Proc. 2nd European Conf. Computational Learning Theory, Springer-Verlag, 23-37, 1995) and Bagging (Breiman L: Bagging predictors. Machine Learning, 24(2):123-140, 1996), which require multiple uncorrelated, independent classifications of the data to be generated prior to combination. As disclosed previously, the terms "uncorrelated" and "independent" are used in the described invention with reference to the method of constructing embeddings, as borrowed from ensemble classification literature (Dietterich T: Ensemble Methods in Machine Learning. In Proc. 1st Int'l Workshop on Multiple Classifier Systems, Springer-Verlag, 1-15, 2000). Similar to random forests (Ho T., IEEE Transactions on Pattern Analysis and Machine Intelligence 20(8):832 844, 1998). A feature space perturbation technique is used to generate uncorrelated (base) embeddings. This is implemented by first creating M bootstrapped feature subsets of V features each (every subset $\eta_m$, $m \in \{1, \ldots, M\}$ containing $$\binom{N}{V}$$

features, no DR involved). Note, that the number of samples in each V-dimensional subset is the same as in the original N-dimensional space. Each V-dimensional $\eta_m$ is then embedded in n-D space via DR (i.e. projecting from $\mathfrak{R}^V$ to $\mathfrak{R}^n$. M is chosen such that each of N dimensions appears in at least one $\eta_m$.

---
Algorithm CreateEmbed
---

Input: $F(c) \in \mathbb{R}^n$ for all objects $c \in C$, n
Output: $X_m(c) \in \mathbb{R}_m^n$, $m \in \{1, \ldots, M\}$
Data Structures: Feature subsets $\eta_m$, total number of subsets M, number of features in each subset V, DR method $\Phi$
begin
0. for m = 1 to M do
1.     Select V < N features from $\mathbb{R}^N$, forming subset $\eta m$;
2.     Calculate $X_m(c) \in \mathbb{R}_m^n$ for all $c \in C$ using $\eta_m$ and method $\Phi$;
3. endfor
end As presented above, multiple methods exist to generate base embeddings, such as varying a parameter associated with a method (e.g. neighborhood parameter in LLE, as shown in (Tiwari P et al., Consensus-locally linear embedding (C-LLE): application to prostate cancer detection on magnetic resonance spectroscopy. In Proc. 11th Int'l Conf. Medical Image Computing and Computer-Assisted Intervention (MICCAI), Volume 5242(2), 330-338, 2008) as well as the method explored in the described invention (feature space perturbation). These methods are analogous to methods in the literature for generating base classifiers in a classifier ensemble (Dietterich T: Ensemble Methods in Machine Learning. In Proc. 1st Int'l Workshop on Multiple Classifier Systems, Springer-Verlag, 1-15, 2000), such as varying k in kNN classifiers (changing associated parameter) (Kuncheva L: Combining pattern classifiers: methods and algorithms. Wiley-Interscience, 2004), or varying the training set for decision trees (perturbing the feature space) (Ho, T, IEEE Transactions on Pattern Analysis and Machine Intelligence 20(8):832-844, 1998).

Selection of Strong Embeddings

M base embeddings strengths $\psi^{ES}(\mathbb{R}_m^n)$ are calculated for all $\mathbb{R}_m^n$, $m \in \{1, \ldots, M\}$. The calculation of $\psi^{ES}$ can be done via performance evaluation measures such as those described below, based on the application and prior domain knowledge. Embeddings for which $\psi^{ES}(\mathbb{R}_m^n) > \theta$ then are selected as strong embeddings, where $\theta$ is a pre-specified threshold.

---
Algorithm SelEmbed
---

Input: $X_m(c) \in \mathbb{R}_m^n$ for all objects $c \in C$, $m \in \{1, \ldots, M\}$
Output: $X_k(c) \in \mathbb{R}_k^n$, $k \in \{1, \ldots, K\}$
Data Structures: A list Q, embedding strength function $\psi^{ES}$, embedding strength threshold $\theta$ ---
Algorithm SelEmbed
--- begin
0. for m = 1 to M do
1.     Calculate $\psi^{ES}(\mathbb{R}_m^n)$;
2.     If $\psi^{ES}(\mathbb{R}_m^n) > \theta$
3.     Put m in Q;
4.    endif
5. endfor
6. For each element k of Q, store $X_k(c) \in \mathbb{R}_k^n$ for all objects $c \in C$;
end Note that while $\theta$ can be considered to be a parameter, which needs to be specified to construct the ensemble embedding, it was found that the results are relatively robust to variations in $\theta$. In general, $\theta$ can be defined based on the manner of evaluating the embedding strength, as discussed in the next section.

Two performance measures are presented in order to evaluate embedding strength: one measure being supervised and relying on label information; the other being unsupervised and driven by the separability of distinct clusters in the reduced dimensional embedding space. In Experiment 3, the two performance measures are compared against each other to determine their relative effectiveness in constructing a strong ensemble embedding.

Supervised Evaluation of Embedding Strength:

It was shown that embedding strength increases as a function of classification accuracy (Theorem 1, below), implying that strong embeddings will have high classification accuracies. Intuitively, this can be explained as strong embeddings showing greater class separation compared to weak embeddings. Given a binary labeled set of samples C, the sets of objects corresponding to the two classes are denoted as $S^+$ and $S^-$, such that $C = S^+ \cup S^-$ and $S^+ \cap S^- = \emptyset$. When using a classification algorithm that does not consider class labels, classification accuracy can be evaluated as follows:

1. Apply classification algorithm to C (embedded in $\mathbb{R}^n$) to find T clusters (unordered, labeled set of objects), denoted via $\hat{\Psi}_\tau$, $t \in \{1, \ldots, T\}$.
2. For each $\hat{\Psi}_\tau$.
  (a) Calculate $DTP = |\hat{\Psi}_\tau \cap S^+|$.
  (b) Calculate $DTN = |(C - \hat{\Psi}_\tau) \cap S^-|$.
  (c) Calculate classification accuracy for $\hat{\Psi}_\tau$, as $$\phi^{Acc}(\hat{\psi}_t) = \frac{DTP + DTN}{|S^+ \cup S^-|}.$$

3. Calculate classification accuracy of $\mathbb{R}^n$ as $\phi^{Acc}(\mathbb{R}^n) = \max_\tau [\phi^{Acc}(\hat{\Psi}_\tau)]$.

As classification has been done without considering label information, it should be evaluated which of the clusters so obtained shows the greatest overlap with $S^+$ (the class of interest). Therefore, the classification accuracy of the cluster showing the most overlap with $S^+$ is considered as an approximation of the embedding strength of $\mathbb{R}^n$, i.e., $\psi^{ES}(\mathbb{R}^n) \approx \phi^{Acc}(\mathbb{R}^n)$.

Unsupervised Evaluation of Embedding Strength:

A measure, known as the R-squared index (RSI) is used, which is based off cluster validity measures (Halkidi M et al., Journal of Intelligent Information Systems, 17(2-3):107-145, 2001) and can be calculated as follows:

1. Apply classification algorithm to C (embedded in Rn) to find T clusters (unordered, labeled set of objects), denoted via $\hat{\Psi}_\tau$, $t \in \{1, \ldots, T\}$.

2. $SST = \sum_{j=1}^{n}[\sum_{i=1}^{R}(X(c_i) - \overline{X(c_j)})^2]$ where $\overline{X(c_j)}$ is the mean of data values in the $j^{th}$ dimension).

3. Calculate $$SSB = \sum_{\substack{j=1 \ldots n \\ t=1 \ldots T}} \left[ \sum_{i=1}^{|\Psi_t|} (X(c_t) - \overline{X(c_j)})^2 \right].$$

4. Calculate R-squared index of $\mathbb{R}^n$ as $$\phi^{RS}(\mathbb{R}^n) = \frac{SST - SSB}{SST}$$

RSI may be considered both a measure of the degree of difference between clusters found in a dataset as well as measurement of the degree of homogeneity between them. The values of $\phi^{RS}$ ranges between 0 and 1, where if $\phi^{RS}=1$, no difference exists among clusters. Conversely, a value close to $\phi^{RS}=1$ suggests well-defined, separable clusters in the embedding space. Note that when using RSI to evaluate embedding strength, it will be difficult to ensure that all selected embeddings are strong with no a priori information. In such a case, it can be attempted to ensure that a significant majority of the embeddings selected are strong, which will also ensure that the ensemble embedding $\hat{\mathbb{R}}^n$ is strong (based off Proposition 1).

Constructing the Ensemble Embedding

Given K selected embeddings $\mathfrak{R}_k^n$, $k \in \{1, \ldots, K\}$, pairwise relationships are quantified between all the objects in each $\mathfrak{R}_k^n$ via Euclidean pairwise distances. Euclidean distances were chosen for our implementation as they are well understood, satisfy the metric assumption of the pairwise relationship, as well as being directly usable within the other methods used in this work. $\Omega_k$ denotes the ML estimator used for calculating $\tilde{\delta}_{cd}$ from K observations $\delta_k^{cd}$ for all objects c, d$\in$C.

---
Algorithm CalcEnsembleEmbed
---

Input: $X_k(c) \in \mathbb{R}_k^n$ for all objects $c \in C$, $k \in \{1, \ldots, k\}$
Output: $\tilde{X}(c) \in \hat{\mathbb{R}}^n$
Data Structures: Confusion matrix W, ML estimator, $\Omega$, projection method $\gamma$
begin
  0. for k = 1 to K do
    1. Calculate $W_k(i, j) = \|X_k(c) - X_k(d)\|_2$ for all objects c, d $\in$ C with indices i, j;
  2. endfor
  3. Apply normalization to all $W_k$, $k \in \{1, \ldots, K\}$;
  4. Obtain $\tilde{W}(i, j) = \Omega[W_k(i, j)] \forall c, d \in C$;
  5. Apply projection method $\gamma$ to $\tilde{W}$ to obtain final ensemble embedding $\hat{\mathbb{R}}^n$;
end Corresponding entries across all $W_k$ (after any necessary normalization) are used to estimate $\tilde{\delta}^{cd}$ (and stored in $\tilde{W}$). In the implementation of the present invention, the median was used as the ML estimator (1) because the median is less corruptible to outliers, and (2) because the median and the expectation are interchangeable if one assumes a normal distribution (Patel J K, Read C B: Handbook of the normal distribution. New York: Marcel Dekker, 2nd edition 1996). In Section 3, classification results are compared using both the mean and median individually as the ML estimator. A projection method $\gamma$ (Venna J and Kaski S, Neural Networks 19(6):889-899, 2006) is applied to the resulting $\tilde{W}$ to embed the objects in $\hat{\mathbb{R}}^n$ while preserving the pairwise distances between all objects c$\in$C.

The underlying intuition for this final step is based on a similar approach adopted in Fred et al., (IEEE Transactions on Pattern Analysis and Machine Intelligence 27(6):835-850, 2005) where multi-dimensional scaling was applied to the co-association matrix (obtained by accumulating multiple weak clusterings of the data) in order to visualize the clustering results. As $\tilde{W}$ is analogous to the co-association matrix, the projection method $\gamma$ will allow construction of the ensemble embedding space $\hat{\mathbb{R}}^n$.

One can hypothesize that $\tilde{W}$ is an approximation of distances calculated in the original feature space. Distances in the original feature space can be denoted as $\hat{W}(i,j) = \|F(c) - F(d)\|_2$ $\forall c, d \in C$ with indices i, j. An alternative approach could therefore be to calculate $\hat{W}$ in the original feature space and apply $\gamma$ to it instead. However, noise artifacts in the original feature space may prevent it from being truly optimal for analysis (Quinlan J: The effect of noise on concept learning. In Machine learning: An artificial intelligence approach. Edited by Michalski R S, Carbonell J G, Mitchell T M, Morgan Kaufmann 149-166, 1986). As shown in Section 3, simple DR, as well as ensemble DR, provide superior representations of the data (by accounting for noise artifacts) as compared to using the original feature space directly.

Computational Efficiency of Ensemble Embedding

The most computationally expensive operations in ensemble embedding are (1) calculation of multiple uncorrelated embeddings (solved as an eigenvalue problem in $O(n^3)$ time for n objects), and (2) computation of pairwise distances between all the objects in each strong embedding space (computed in time $O(n^2)$ for n objects). A slight reduction in both time and memory complexity can be achieved based on the fact that distance matrices will be symmetric (hence only the upper triangular need be calculated). Additionally, multiple embeddings and distance matrices can be computed via code parallelization. However, these operations still scale polynomially based on the number of objects n. To further reduce the computational burden the ensemble embedding paradigm is embedded within an intelligent sub-sampling framework. A fast implementation (Yang C et al., Improved fast gauss transform and efficient kernel density estimation. In Proc. 9th IEEE Int'l Conf. Computer Vision (ICCV), 664-671, 2003) of the popular mean shift (MS) algorithm (Comaniciu D and Meer P, Transactions on Pattern Analysis and Machine Intelligence 24(5):603-619, 2002) is used to iteratively represent data objects via their most representative cluster centers. As a result, the space retains its original dimensionality, but now comprises only some fractional number (n/t) of the original objects. These n/t objects are used in the calculations of ensemble embedding as well as for any additional analysis. A mapping (Map) is retained from all n original objects to the final n/t representative objects. Therefore, back results and analyses from the lowest resolution (n/t objects) to the highest resolution (n objects) can be mapped easily. The fewer number of objects (n/t<<n) ensures that ensemble embedding is computationally feasible. In the implementation of the present invention, t is determined automatically based on the number of stable cluster centers detected by MS.

---
Algorithm EnsembleEmbedMS
---

Input: $F(c) \in \mathbb{R}^N$ for all objects $c \in C$, n
Output: $\tilde{X}(c) \in \tilde{\mathbb{R}}^n$
Data Structures: Reduced set of objects $\bar{c} \in \bar{C}$
begin
  0. Apply MS (Yang C et al., Improved fast gauss transform and efficient kernel density estimation. In Proc. 9th IEEE Int'l Conf. Computer Vision (ICCV), 664-671, 2003) to $\mathbb{R}^N$ resulting in $\tilde{\mathbb{R}}^N$ for sub-sampled set of objects $\bar{c} \in \bar{C}$;
  1. Save Map from sub-sampled set of objects $\bar{c} \in \bar{C}$ to original set of objects $c \in C$;
  2. $X_m(\bar{c}) = \text{CreatEmbed}(F(\bar{c})|\eta_m, \Phi, M, V), \forall m \in \{1, \ldots, M\}$;
  3. $X_k(\bar{c}) = \text{SelEmbed}(X_m(\bar{c})|Q, \psi, \theta), \forall k \in \{1, \ldots K\}, \forall m \in \{1, \ldots, M\}$;
  4. $\tilde{X}_k(\bar{c}) = \text{CalcConsEmbed}(X_k(\bar{c})|W, \Omega, \gamma), \forall k \in \{1, \ldots, K\}$;
  5. Use MS and Map to calculate $\tilde{X}(\bar{c}) \in \tilde{\mathbb{R}}^n$ for all objects $c \in C$;
end For an MRI image comprising 5589 pixels (objects) for analysis, the individual algorithms CreateEmbed, SelEmbed and CalcEnsembleEmbed took 121.33, 12.22; and 35.75 seconds respectively to complete (on average). By implementing the mean-shift optimization, it took only 119 seconds (on average) for EnsembleEmbedMS to complete analysis of an MRI image comprising between 15,000 and 40,000 pixels (objects); a calculation that would have been computationally intractable otherwise. Table 2 summarizes computation times for each of the datasets considered in the described invention. All experiments were conducted using MATLAB 7.10 (Mathworks, Inc.) on a 72 GB RAM, 2 quad core 2.33 GHz 64-bit Intel Core 2 processor machine.

TABLE 2

Datasets

| Datasets | Description | Features |
|---|---|---|
| Synthetic brain MRI images | 10 slices (109 x 131 comprising 5589 pixels). 6 noise levels (0%. 1%. 3%. 5%. 7%. 9%) 3 RF inhomogeneity levels (0%. 20%, 40%) | Haralick (14) |
| Prostate MRI images | 16 slices. 2 datasets (256 x 256 comprising 15.000-40.000 pixels) | Haralick. 1st order statistical (38) |
| Gene-Expression data: | | |
| Prostate Tumor | 102 training, 34 testing, 12,600 genes | 300 most class-informative genes |
| Breast Cancer Relapse | 78 training, 19 testing, 24,481 genes | |
| Lymphoma | 38 training, 34 testing, 7130 genes | |
| Lung Cancer | 32 training, 149 testing, 12,533 genes | |

Image and gene-expression datasets used in our experiments.

DR methods utilized to reduce $\mathbb{R}^N$ to $\mathbb{R}^{n'}$ were graph embedding (GE) (Shi J and Malik J, IEEE Transactions on Pattern Analysis and Machine Intelligence 22(8):888-905, 2000) and PCA (Jollife I: Principal Component Analysis. Springer, 2002). These methods were chosen in order to demonstrate instantiations of ensemble embedding using representative linear and non-linear DR schemes. Additionally, these methods have been leveraged both for segmentation as well as classification of similar biomedical image and bioinformatics datasets in previous work (Dai, J. et al., Dimension reduction for classification with gene expression microarray data. Statistical Applications in Genetics and Molecular Biology 2006, 5:Article 6; Carballido-Gamio J, et al., IEEE Transactions on Medical Imaging 2004, 23:36-44).

The dimensionality of the embedding space, n, is calculated as the intrinsic dimensionality of $\mathbb{R}^N$ via the method of (Levina E and Bickel P: Maximum Likelihood Estimation of Intrinsic Dimension. In Proc. Adv. Neural Information Processing Systems (NIPS), Volume 17, MIT Press 2005:777-784). To remain consistent with notation defined previously, the result of DR on $F(c) \in \mathbb{R}^N$ is denoted $X_\Phi(c) \in \hat{\mathbb{R}}^n$, while the result of consensus DR will be denoted $\hat{X}_\Phi(c) \in \hat{\mathbb{R}}^n$. The subscript $\Phi$ corresponds to the DR method used, $\Phi \in \{GE, PCA\}$. For ease of description, the corresponding classification results are denoted $\Psi(F), \Psi(X_\Phi), \Psi(\hat{X}_\Phi)$, respectively.

Correspondence Between Equation 1 and Definition 2

In order to calculate the probability $p(\Delta|c, d, e, \mathbb{R}^n)$ the traditional formulation of a prior probability, $$p = \frac{\text{total number of observed instances}}{\text{total number of instances}}. \quad \text{Equation [3]}$$

was utilized.

With reference to Equation 1, "instances" are triplets. Therefore, Equation 3 becomes, $$p(\Delta) = \frac{\text{total number of preserved triplets (i.e. } \Delta = 1)}{\text{total number possible triplets}} \quad \text{Equation [4]}$$

$$= \frac{\sum_C \Delta(c, d, e)}{Z}.$$

Independent of the above, the present invention arrived at a mathematical formulation for embedding strength. The strength of any embedding $\mathbb{R}^n$ will depend on how well pairwise relationships are preserved from $\mathbb{R}^N$.

This in turn can written in terms of the triplet relationship as well, $$\psi^{EM}(\mathbb{R}^n) = \frac{\text{total number of preserved triplets}}{\text{total number possible triplets}} \quad \text{Equation [5]}$$

$$= \frac{\sum_C \Delta(c, d, e)}{Z}.$$

Properties of Ensemble Embedding

The following proposition shows that $\hat{\mathbb{R}}^n$ will have a lower inherent error in its pairwise relationships compared to the strong embeddings $\mathbb{R}_k^n$, $k \in \{1, \ldots, K\}$ used in its construction. Note that relevant notation and definitions have been carried over from Section 2.

The mean squared error (MSE) is defined in the pairwise relationship between every pair of objects c, d∈C in any embedding $\mathbb{R}^n$ with respect to the true pairwise relationships in $\hat{\mathbb{R}}^n$ as, $$\epsilon_X = E_{cd}(\hat{\delta}^{cd} - \delta^{cd})^2 \quad \text{Equation [6]}$$

where $E_{cd}$ is the expectation of the squared error in the pairwise relationships in $\mathbb{R}^n$ calculated over all pairs of objects c, d∈C. The expected MSE can be calculated over all K base embeddings specified above as, $$\epsilon_{K,X} = E_K[\epsilon_X] = E_K[E_{cd}(\delta^{cd} - \delta_k^{cd})^2] \quad \text{Equation [7]}$$

Given K observations $\delta_k^{cd}$, $k \in \{1, \ldots, K\}$ (derived from selected base embeddings $\mathbb{R}_k^n$), the pairwise relationship in the ensemble embedding $\hat{\mathbb{R}}^n$ is defined as $\tilde{\delta}^{cd} = E_K(\delta_k^{cd})$, where $E_K$ is the expectation of $\delta_k^{cd}$ over K observations. The MSE in $\tilde{\delta}^{cd}$ with respect to the true pairwise relationships in $\hat{\mathbb{R}}^n$ can be defined as (similar to Equation 6), $$\epsilon_{\tilde{X}} = E_{cd}(\tilde{\delta}^{cd} - \hat{\delta}^{cd})^2 \quad \text{Equation [8]}$$

where $E_{cd}$ is the expectation of the squared error in the pairwise relationships in $\hat{\mathbb{R}}^n$ calculated over all pairs of objects c, d∈C. It is clear that if for all c, d∈C that $\tilde{\delta}^{cd} = \hat{\delta}^{cd}$, then $\hat{\mathbb{R}}^n$ is also a true embedding.

Proposition 2

Given K independent, strong embeddings, $\mathbb{R}_k^n$, $k \in \{1, \ldots, K\}$, which are used to construct $\hat{\mathbb{R}}^n$, $\epsilon_{K,X} \geq \epsilon_{\tilde{X}}$.

Proof.

Expanding Equation 7

$$\epsilon_{K,X} = E_{cd}(\hat{\delta}^{cd})^2 - 2E_{cd}(\hat{\delta}^{cd})E_K(\delta_k^{cd}) + E_{cd}E_K(\delta_k^{cd})^2$$

Now, $E_K(\delta_k^{cd})^2 \geq (E_K \delta_k^{cd})^2$, $$\geq E_{cd}(\hat{\delta}^{cd})^2 - 2E_{cd}(\hat{\delta}^{cd})(\tilde{\delta}^{cd}) + E_{cd}(\tilde{\delta}^{cd})^2 \geq \epsilon_{\tilde{X}}$$

Proposition 2 implies that $\hat{\mathbb{R}}^n$ will never have a higher error than the maximum error associated with any individual strong embedding $\mathbb{R}_k^n$, $k \in \{1, \ldots, K\}$, involved in its construction. However if $\epsilon_{K,X}$ is low, $\epsilon_{\tilde{X}}$ may not significantly improve on it. Similar to Bagging (Breiman L: Bagging predictors. Machine Learning, 24(2):123-140, 1996) where correlated errors across weak classifiers are preserved in the ensemble result, if the pairwise relationship $\delta_k^{cd}$ is incorrect across all K embeddings, $\tilde{\delta}^{cd}$ will be incorrect as well. However Proposition 2 guarantees that $\epsilon_{\tilde{X}}$ will never be worse than $\epsilon_{K,X}$.

Practical Implementation of Embedding Strength

While embedding strength can be seen as a generalized concept for evaluating embeddings, the described invention examined applications of DR and ensemble embedding to classifying biomedical data (Section 3). The direct relationship between embedding strength and classification accuracy is presented in Theorem 1 below. All objects c, d∈C are considered to be associated with class labels l(c), l(d), l(e)∈{$\omega_1, \omega_2$} respectively, such that if l(c)=l(d)=$\omega_l$ and l(e)=$\omega_2$ then $\Lambda^{cd} < \Lambda^{ce}$ and $\Lambda^{cd} < \Lambda^{de}$. Note that ω1, ω2 are binary class labels that can be assigned to all objects c∈C.

An unique triplet (c, d, e)∈C with l(c), l(d), l(e)∈{$\omega_1, \omega_2$} is called a class triplet, (c, d, e)$_l$ if either l(c)≠l(d), or l(d)≠l(e), or l(c)≠l(e)

Thus, in a class triplet of objects, two out of three objects have the same class label but the third has a different class label, e.g., l(c)=l(d)=$\omega_1$ and l(e)=$\omega_2$. Further, in the specific case that $\Delta(c, d, e) = 1$ for a class triplet (c, d, e)$_l$, it will be denoted as $\Delta^l(c, d, e)$. For the above example of a class triplet, it is known that $\Lambda^{cd} < \Lambda^{ce}$ and $\Lambda^{cd} < \Lambda^{de}$ (see above). If $\Delta(c, d, e) = 1$, $\delta^{cd} < \delta^{ce}$ and $\delta^{cd} < \delta^{de}$. This implies that even after projection from $\Re^N$ to $\Re^n$, the class-based pairwise relationships within the data are accurately preserved (a classifier can be constructed which will correctly classify objects c, d, e in $\Re^n$). Consider that if $$\frac{R}{S}$$

objects have class label $\omega_1$, then $$\frac{(S-1)R}{S}$$

objects will have class label $\omega_2$. Based on the total number of unique triplets Z, the total number of triplets which are not class triplets is, $$Y = \frac{\frac{R}{S}!}{3!\left(\frac{R}{S} - 3\right)!} + \frac{\frac{(S-1)R}{S}!}{3!\left(\frac{(S-1)R}{S} - 3\right)!} \quad \text{Equation [9]}$$

Y will be a constant for a given set of objects C, and is based on forming unique triplets (c, d, e) where l(c)=l(d)=l(e) (triplets which are not class triplets). U=(Z−Y) will correspond to the number of class triplets that may be formed for set C. If all U class triplets have $\Delta^l(c, d, e)$, then it is possible to construct U classifiers which correctly classify the corresponding objects in these class triplets.

Given U unique class triplets (c, d, e)$_l$∈C and an embedding $\mathbb{R}^n$ of all objects c, d, e∈C, the associated classification accuracy $\phi^{Acc}(\mathbb{R}^n)$ may simply be defined as the fraction of class triplets for which (c, d, e)$_l$∈C for which $\Delta^l(c, d, e) = 1$.

Theorem 1. For any $\mathbb{R}^n$, the corresponding $\psi^{ES}(\mathbb{R}^n)$ increases monotonically as a function of $\phi^{Acc}(\mathbb{R}^n)$.

Proof.

By definition, $$\sum_C \Delta(c, d, e) \geq \sum_C \Delta^l(c, d, e)$$

Dividing by Z=U+Y on either side, $$\psi^{ES}(\mathbb{R}^n) \geq \frac{\sum_C \Delta^l(c, d, e)}{U + Y}$$

Inverting, $$\frac{1}{\psi^{ES}(\mathbb{R}^n)} \leq \frac{1}{\phi^{Acc}(\mathbb{R}^n)} + \frac{Y}{\sum_C \Delta^l(c, d, e)}$$

As $$\frac{Y}{\sum_C \Delta^l(c, d, e)}$$

is a constant, $\psi^{ES}(\mathbb{R}^n)$ increases monotonically with $\phi^{Acc}(\mathbb{R}^n)$. Thus an embedding $\mathbb{R}^n$ with a high embedding strength will have a high classification accuracy. Practically, this implies that $\psi^{ES}(\mathbb{R}^n)$ can be estimated via any measure of object-class discrimination such as classification accuracy or cluster-validity measures. This relationship has been exploited in the algorithmic implementation of the present invention.

II. Systems and Methods for Analyzing Multi-Modal Data Derived From a Biological Sample (EMPrAvISE)

According to another aspect, the described invention provides a method for analyzing multimodal data derived from a biological sample by a multi-protocol analysis using an intelligent supervised embedding (EMPrAvISE) scheme, comprising:

(a) inputting, via a computing device, the multimodal data, wherein the multimodal data comprises a plurality of data;

(b) generating, via the computing device, a plurality of voxels in the multimodal data;

(c) assigning, via the computing device, an intensity value to each voxel in the multimodal data;

(d) registering, via the computing device, the plurality of data to create a plurality of registered data, such that the plurality of registered data have the same spatial frame as a reference datum, and computing a ground truth extent of disease for each voxel of the plurality of voxels;

(e) extracting from the plurality of registered data, via the computing device, a plurality of features and computing a plurality of quantitative descriptors corresponding to the plurality of features; and (f) fusing, via the computing device, the plurality of quantitative descriptors to create a plurality of ensemble embeddings by:

(i) constructing, via the computing device, a higher dimensional multi-parametric feature space using the plurality of quantitative descriptors;

(ii) computing, via the computing device, a plurality of pair-wise relationships for all quantitative descriptors of the plurality of quantitative descriptors in the higher dimensional multi-parametric feature space via a Euclidean pairwise distance method and storing the plurality of pair-wise relationships in a confusion matrix;

(iii) generating, via the computing device, a plurality of independent embeddings comprising weak embeddings and strong embeddings derived from the higher dimensional multi-parametric feature space by a feature space perturbation method;

(iv) computing, via the computing device, an embedding strength for each independent embedding;

(v) selecting, via the computing device, a plurality of strong embeddings from the plurality of independent embeddings, wherein the embedding strength of each strong embedding is more than a pre-specified threshold value, and wherein a pair-wise relationship between two quantitative descriptors in the higher dimensional multi-parametric feature space is preserved in each strong embedding;

(vi) computing, via the computing device, a maximum likelihood estimate (MLE) of a probability distribution of each pair-wise relationship in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix; and (vii) computing, via the computing device, the plurality of ensemble embeddings by a multi-dimensional scaling method, wherein each pair-wise relationship in each ensemble embedding equals the corresponding maximum likelihood estimate (MLE) of the pair-wise relationship in the ensemble matrix;

(g) classifying, via the computing device, the biological sample into a disease class; and (h) outputting, via the computing device, the disease class.

Figure 8:
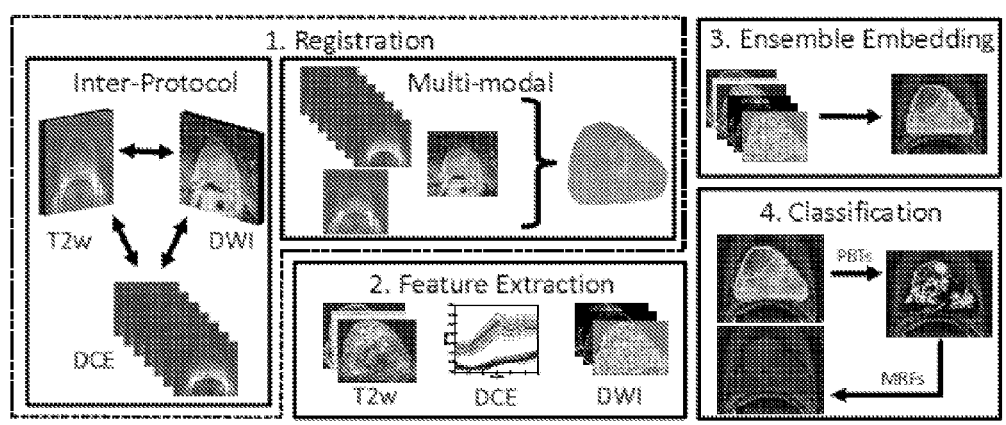
FIG. 8 shows a flowchart showing different system components/method steps of the present invention, a system or method of classifying a digital image derived from a biological sample into a disease class by a multi-protocol analysis using an intelligent supervised embedding (EMPrAvISE) scheme.

The multi-protocol analysis using an intelligent supervised embedding (EMPrAvISE) scheme is illustrated in FIG. 8.

(a) Inputting, Via a Computing Device, the Multimodal Data Step

According to some embodiments, the method for analyzing multimodal data derived from a biological sample by a multi-protocol analysis using an intelligent supervised embedding (EMPrAvISE) scheme, comprising step (a) the multimodal data, wherein the multimodal data comprises a plurality of data obtained from a plurality of protocols.

According to some such embodiments, the multimodal data is a digital image. According to some such embodiments, multimodal data a spectrum.

According to some such embodiments, the plurality of data in the multimodal data comprises a digital image. According to some such embodiments, the plurality of data comprises a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some embodiments, the digital image is a microscopic image. According to some embodiments, the digital image is a magnetic resonance imaging (MRI) image. According to some embodiments, the digital image is a positron emission tomography (PET) image. According to some embodiments, the digital image is a single-photon emission computed tomography (SPECT) image. According to some embodiments, the digital image is an ultrasound image. According to some embodiments, the digital image is an x-ray image. According to some embodiments, the digital image is a computed tomography (CT) image. According to some embodiments, the digital image is a micro-array image. In some embodiments, the digital image is a histopathology image of a diseased tissue. According to some embodiments, the digital image is derived from a biological sample. According to some such embodiments, the biological sample is a diseased tissue sample. Exemplary diseased tissue samples includes, but is not limited to, a tissue sample obtained from a patient with a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) a T2-weighted (T2w) MRI image, (2) a Dynamic Contrast Enhanced (DCE) MRI image, (3) a Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) image is a Diffusion Weighted (DWI) MRI image. According to one embodiment, the magnetic resonance imaging (MRI) image is a proton density (PD) MRI image.

Exemplary protocols include, but are not limited to, a magnetic resonance imaging (MRI) protocol, a positron emission tomography (PET) protocol, a single-photon emission computed tomography (SPECT) protocol, an ultrasound protocol, an x-ray protocol, a computed tomography (CT) protocol, a micro-array protocol, a spectroscopy protocol, a spectrometry protocol, etc.

According to some such embodiments, the protocol is a magnetic resonance imaging (MRI) protocol. According to some such embodiments, the magnetic resonance imaging (MRI) protocol is selected from the group consisting of (1) T2-weighted (T2w) MRI, (2) Dynamic Contrast Enhanced (DCE) MRI, (3) Diffusion Weighted (DWI) MRI, or a combination thereof. According to one embodiment, the magnetic resonance imaging (MRI) protocol is a T2-weighted (T2w) MRI protocol. According to one embodiment, the magnetic resonance imaging (MRI) protocol is a Dynamic Contrast Enhanced (DCE) MRI protocol. According to one embodiment, the magnetic resonance imaging (MRI) protocol is a Diffusion Weighted (DWI) MRI protocol. The T2-weighted (T2w) MRI protocol captures high resolution anatomical information from a histopathology image. The Dynamic Contrast Enhanced (DCE) MRI protocol characterizes microvascular function via uptake and washout of a paramagnetic contrast agent. The Diffusion Weighted (DWI) MRI protocol captures water diffusion restriction via an Apparent Diffusion Coefficient (ADC) map. According to one embodiment, the magnetic resonance imaging (MRI) protocol is a proton density (PD) MRI protocol.

(b) Generating, Via the Computing Device, a Plurality of Voxels

According to some embodiments, the method for analyzing multimodal data derived from a biological sample by a multi-protocol analysis using an intelligent supervised embedding (EMPrAvISE) scheme, comprises step (b) generating, via the computing device, a plurality of voxels in the multimodal data.

According to some such embodiments, the multimodal data is two-dimensional. According to some such embodiments, the multimodal data is three-dimensional. According to some such embodiments, the multimodal data is multi-dimensional. According to some such embodiments, the multimodal data has a resolution ranging from 256×256 voxels and 512×512 voxels. According to one embodiment, the multimodal data has a resolution of 256×256 voxels. According to one embodiment, the multimodal data has a resolution of 512×512 voxels. In other embodiments, the multimodal data has a resolution of 100×100 voxels ranging through 5000×5000 voxels, all permutations inclusive. According to some such embodiments, the multimodal data has a resolution of at least 100×100 voxels. According to another embodiment, the multimodal data has a resolution of at least 200×200 voxels. According to another embodiment, the multimodal data has a resolution of at least 300×300 voxels. According to another embodiment, the multimodal data has a resolution of at least 400×400 voxels. According to another embodiment, the multimodal data has a resolution of at least 500×500 voxels. According to another embodiment, the multimodal data has a resolution of at least 600×600 voxels. According to another embodiment, the multimodal data has a resolution of at least 700×700 voxels. According to another embodiment, the multimodal data has a resolution of at least 800×800 voxels. According to another embodiment, the multimodal data has a resolution of at least 900×900 voxels. According to another embodiment, the multimodal data has a resolution of at least 1000×1000 voxels. According to another embodiment, the multimodal data has a resolution of at least 2000×2000 voxels. According to another embodiment, the multimodal data has a resolution of at last 3000×3000 voxels. According to another embodiment, the multimodal data has a resolution of at least 4000×4000 voxels. According to another embodiment, the multimodal data has a resolution of at least 5000×5000 voxels.

(c) Assigning, Via the Computing Device, an Intensity Value to Each Voxel Step

According to some embodiments, the method for analyzing multimodal data derived from a biological sample by a multi-protocol analysis using an intelligent supervised embedding (EMPrAvISE) scheme, comprises step (c) assigning, via the computing device, an intensity value to each voxel in the multimodal data.

(d) Registering, Via the Computing Device, the Plurality of Data to Create a Plurality of Registered Data, Such that the Plurality of Registered Data have the Same Spatial Frame as a Reference Datum, and Computing a Ground Truth Extent of Disease for Each Voxel Step According to some embodiments, the method for analyzing multimodal data derived from a biological sample by a multi-protocol analysis using an intelligent supervised embedding (EMPrAvISE) scheme, comprises step (d) registering, via the computing device, the plurality of data to create a plurality of registered data, such that the plurality of registered data have the same spatial frame as a reference datum, and computing a ground truth extent of disease for each voxel of the plurality of voxels.

According to some such embodiments, registering step (d) comprises a multi-attribute, higher order mutual information (MI)-based elastic registration (MACMI) scheme by a volumetric affine registration method that corrects for inter-acquisition movement and resolution differences between the plurality of protocols. The multi-attribute, higher order mutual information (MI)-based elastic registration (MACMI) scheme by a volumetric affine registration method is described by Chappelow et al., (Chappelow, J. et al., "Elastic Registration of Multimodal Prostate MRI and Histology via Multi-Attribute Combined Mutual Information," *Medical Physics*, 2011, 38(4): 2005-2018).

According to some such embodiments, the multi-attribute, higher order mutual information (MI)-based elastic registration (MACMI) scheme is implemented within an elastic registration framework, whereby the similarity measure is used to drive a set of free form deformations (FFDs) defined with a hierarchical grid size. This allows for local image transformations across multiple image resolutions. The multi-attribute, higher order mutual information (MI)-based elastic registration (MACMI) scheme by a volumetric affine registration method uses mutual information between scalar-valued multimodal data, such as images according to the following method. Equation (10) below is a common formulation of MI for a pair of images (or random variables representing multimodal data) $A_1$, $A_2$ in terms of Shannon entropy:

$$I_2(A_1,A_2)=S(A_1)+S(A_2)-S(A_1,A_2) \qquad (10)$$

where $I_2(A_1, A_2)$ describes the interdependence of two variables or intensity values of a pair of multimodal data, such as images. As $I_2(A_1, A_2)$ increases, the uncertainty about $A_1$ given $A_2$ decreases.

Thus, it is assumed that the global MI maximum will occur at the point of precise alignment, when maximal uncertainty about intensities of $A_1$ can be explained by $A_2$.

The conventional MI formulation can be extended to high dimensional observations by combining the multiple dimensions or attributes via high order joint entropy calculations. This application of MI is referred as MACMI to distinguish it from conventional applications of MI and higher order MI and denote it as $I_2^*$. Unlike the more familiar higher order MI ($I_n$, $n \geq 2$), the goal of MACMI is not to measure only the intersecting information between multiple sources $A_1, \ldots, A_n$, but to quantify the combined predictive value of one multivariate source (e.g., $[A_1, \ldots, A_n]$) with respect to another (e.g., $[B_1, \ldots, B_n]$). An image ensemble is described as a concatenation of n intensity-valued images $(I_1, \ldots, I_n)$ into an n-dimensional (multiattribute or multimodal or multiparametric) image, denoted as $[I_1, \ldots, I_n]$. In the simplest case, the MI ($I_2^*$) that a single image $A_1$ shares with an ensemble of two other images, $B_1$ and $B_2$, is described as shown in Equation (11):

$$I_2^*(A_1,[B_1,B_2])=S(A_1)+S(B_1,B_2)-S(A_1,B_1,B_2) \qquad (11)$$

By considering $B_1$ and $B_2$ as simultaneously measured semi-independent variables in the multidimensional ensemble $[B_1, B_2]$, any dependence that exists between $B_1$ and $B_2$ can be discounted and $I_2^*$ remains bounded by the smaller of $S(A_1)$ and $S(B_1, B_2)$. The generalized form of MI between the n-dimensional ensemble $\epsilon_n^A = [A_1, \ldots, A_n]$ with the m-dimensional ensemble $\epsilon_n^B = [B_1, \ldots, B_m]$ is described as in Equation (12) below:

$$I_2^*(\epsilon_n^A,\epsilon_m^B)=S(\epsilon_n^A)+S(\epsilon_m^B)-S(\epsilon_n^A,\epsilon_m^B) \qquad (12)$$

Thus, MACMI accomplishes fusion of the multiple dimensions of a multi-attribute image, allowing only intersecting information between two such images (e.g., $\epsilon_n^A$ and $\epsilon_n^B$) to be quantified.

Algorithm 1 below is a generalized algorithm (MACMIreg) for performing registration of m images $Z_1, \ldots, Z_m$ in a specific order. The order is specified using a hierarchical organization of the images within a family of sets Z and by progressively aligning and accumulating the registered images into a single ensemble $\epsilon$.

Algorithm 1 (MACMIreg)

Consider a family of sets Z that contains $m \geq 2$ images $Z_1, \ldots, Z_m$ distributed throughout $n \leq m$ ordered subsets $Z_j(j \in I)$, where $I=\{1, \ldots, n\}$, (i.e., $\cup_{j \geq 1} Z_j = \{Z_1, \ldots, Z_m\}$ and $\cup_{j \in 1} Z_j \neq \Phi$). Each subset $Z_j(j \in \{1, \ldots, n\})$ may also be a family (i.e., have subsets of its own) or simply an ordered set of registered images. For example, if $Z_j = n\{\{Z_1^{(j)}, Z_2^{(j)}\}, \{Z_3^{(j)}\}, \{Z_4^{(j)}\}\}$, $Z_j$ is defined as a family of $|Z_j|=3$ subsets, containing a total of $k = \|Z_j\| = 4$ images. The ensemble of all k images in $Z_j$ can be denoted as $\epsilon = <Z_j> = [Z_1^{(j)}, \ldots, Z_k^{(j)}]$. By organizing the m images into a hierarchy of subsets within the family Z, the order in which the images are registered and combined into multi-attribute images is determined. The procedure for alignment of all images (within and between each $Z_j$) into a single ensemble e of registered images is described in the following recursive Algorithm 1 (MACMIreg). The notation $\epsilon \leftarrow \epsilon_d$ as the expansion of an n-dimensional multi-attribute image (ensemble) $\epsilon$ into a (d+n)-dimensional ensemble by concatenation with a d-dimensional ensemble $\epsilon_d$. The notation $Z_j \Leftarrow \epsilon$ is denoted as the assignment of each of the m dimensions (intensity images) in c to the existing m total members of $Z_j$ (independent of the organization of images within the family structure), thus replacing or updating $Z_j$ with the contents of $\epsilon$.

---

Algorithm MACMIreg

Input: $Z = \{Z_1, \ldots, Z_n\}$, $n \geq 1$.
Output: $\epsilon$.
Auxiliary Data Structures: Index k, j, $\alpha$; Image ensemble $\epsilon_0$.
begin
  0. for j = 1 to n do
  1.     k = $|Z_j|$;
  2.     if k > 1 then
  3.         Obtain ensemble $\epsilon_0$ = MACMIreg($Z_j$);
  4.         Update $Z_j \Leftarrow \epsilon_0$;
  5.     endif;
  6. endfor;
  7. Initialize $\epsilon$ as an empty ensemble;
  8. $\epsilon \leftarrow [Z_1, \ldots, Z_k]$, k = $\|Z_1\|$;
  9. $\alpha$ = k + 1;
  10. for j = 2 to n do
  11.    k = $\|Z_j\|$;
  12.    $\epsilon_0 = [Z_a, \ldots, Z_{a+k}]$;
  13.    Obtain T = argmax$_T$[$I_2^*(\epsilon, T(\epsilon_0))$];
  14.    Obtain $\tilde{\epsilon}_0 = T(\epsilon_0) = [\tilde{Z}_a, \ldots, \tilde{Z}_{a+k}]$;
  15.    $\epsilon \leftarrow \tilde{\epsilon}_0$;
  16.    $\alpha = \alpha + k + 1$;
  17. endfor;
end

---

Lines 1-6 of MACMIreg use recursive calls to MACMIreg to register the images within each $Z_j$ containing more than one image. When MACMIreg($Z_j$) is executed on line 3, the algorithm is recursively instantiated in order to co-register the images within the subset $Z_j$ and any of its subsets, returning the registered images within ensemble $\epsilon$. Line 4 then updates each $Z_j$ by replacing its constituent elements with the co-registered member images contained within $\epsilon$. Lines 7-17 of MACMIreg perform the registration between the multi-attribute images generated from each $Z_j$, each of which now comprise only co-registered images (or a single image) following lines 1-6 of the algorithm. A spatial transformation T of the current moving image ensemble $\epsilon_0$ into alignment with the stationary growing ensemble e is determined on line 13. The registered ensemble $\tilde{\epsilon}_0$, obtained via T on line 14, is then combined with $\epsilon$ on line 15. The algorithm continues to align each subsequent $Z_j$ with the expanding reference ensemble $\epsilon$.

The operation of MACMIreg(Z) for $Z=\{\{Z_1\}, \{Z_2\}, \{Z_3\}, \{Z_4\}\}$ begins by registration of images within each $Z_j$ ($j \in \{1, 2, 3\}$), where only $Z_3=\{\{Z_3\}, \{Z_4\}\}$ contains more than one image. Thus, MACMIreg($Z_3$) is called to register $Z_3$ to $Z_4$ and update $Z_3$ with ensemble (lines 3-4 of MACMIreg). Having registered the images within each 4 (lines 1-6 of MACMIreg), all images in Z are registered in two steps (lines 7-17 of MACMIreg). At each registration step, an optimal spatial transformation T of $\epsilon_0$ to $\epsilon$ is determined by argmax$_T$[$I_2^*(\epsilon, T(\epsilon_0))$] (line 13 of MACMIreg) and $\epsilon$ is then expanded by $\epsilon \leftarrow \epsilon_0 T(\epsilon_0)$ (lines 14 and 15 of MACMIreg). Thus, $Z_2$ is first registered to $Z_1$, where $\epsilon=[Z_1]$ and $\epsilon_0=[Z_2]$, and $\epsilon \leftarrow \epsilon_0 = \tilde{Z}_2:T=[Z_2]$. Next $Z_3$ is registered to $Z_1$ (and implicitly $Z_2$), where $\epsilon=[Z_1, \tilde{Z}_2]$ and $\epsilon_0=[Z_3, \hat{Z}_4]$ [the output of MACMIreg($Z_3$)], and $\epsilon \leftarrow \epsilon_0 = [\tilde{Z}_3, \tilde{Z}_4]:[T(Z_3), T(Z_4)]$. The final output is $\epsilon = [Z_1, \tilde{Z}_2, \tilde{Z}_3, \tilde{Z}_4]$, comprising all of the co-registered images in Z.

The use of both $Z_3$ and $Z_4$ (and both $Z_1$ and $Z_2$) in the final registration step has the following benefits: (1) avoids potential ambiguity in choosing between $Z_3$ and $Z_4$ (between $Z_1$ and $Z_2$) and (2) potentially provides improved alignment versus use of just $Z_3$ or $Z_4$ ($Z_1$ or $Z_2$) individually. The advantage of MACMI is that it yields cumulative incorporation of all images, while allowing flexibility to choose the order of multiattribute image construction.

Implementation of MACMI within a complete registration framework is described below. MACMI can be utilized to leverage multiple image sources in nearly any registration application by selecting the following components based on domain requirements:

(1) MI estimation for high dimensional data: The most straightforward approach to estimating $I_2^*(\epsilon_n^A, \epsilon_m^B)$ is to formulate the density estimates from high dimensional histograms. While histogram-based techniques are feasible and effective for up to four-dimensional observations with appropriate bin size, as demonstrated by Studholme et al. (Studholme, C. et al., "Incorporating connected region labeling into automatic image registration using mutual information," in *Mathematical Methods in Biomedical Image Analysis*, 1996, 3979: 23-31) and by Rueckert et al. (Rueckert, D. et al., "Non-rigid registration using higher-order mutual information," *Proc. SPIE*, 2000, 3979: 438-447), higher dimensionality necessitates an alternate estimate of entropy or MI, such as those based on entropic spanning graphs or related quantities such as α-MI, as described by Neemuchwala et al. (Neemuchwala, H. et al., "Image matching using alphaentropy measures and entropic graphs," *Signal Process*, 2005, 85: 277-296).

(2) Image transformation model(s): Since MACMI only dictates the construction of the objective function, MACMI is agnostic to the deformation model. Further, different deformation models may be used for each image since the individual image transformations are performed in independent steps.

(3) Optimization scheme to find a maximum of $I_2^*(\epsilon_n^A, \epsilon_n^B)$: If the analytical gradient can be derived, as demonstrated for a-MI as described by Staring et al. (Staring, M. et al., "Registration of cervical MRI using multi-feature mutual information," *IEEE Trans. Med. Imaging*, 2009, 28: 1412-1421), an efficient stochastic gradient descent method can be used. In the absence of analytical gradients of $I_2^*(\epsilon_n^A, \epsilon_m^B)$, methods including direct search (e.g., downhill simplex), quasi-Newton (e.g., Broyden-Fletcher-Goldfarb-Shanno), and other finite difference-based schemes can be employed.

Registering step (d) could correct for intensity homogeneity and non-standardness, according to the method described in Madabhushi, A. et al., "New methods of MR image intensity standardization via generalized scale," Medical Physics 33(9), 3426-34 (2006).

According to one embodiment, registering 1 (MACMIreg), as described below:

| Algorithm MACMIreg |
|---|
| Input: $Z = \{Z_1, \ldots, Z_n\}$, $n \geq 1$. |
| Output: $\epsilon$. |
| Auxillary Data Structures: Index k, j, α; Image ensemble $\epsilon_0$. |
| begin |
|   0. for j = 1 to n do |
|   1. k = $|Z_j|$; |
|   2. if k > 1 then |
|   3.     Obtain ensemble $\epsilon_0$ = MACMIreg($Z_j$); |
|   4.     Update $Z_j \Leftarrow \epsilon_0$; |

| Algorithm MACMIreg (continued) |
|---|
|   5.     endif; |
|   6. endfor; |
|   7. Initialize $\epsilon$ as an empty ensemble; |
|   8. $\epsilon \leftarrow [Z_1, \ldots, Z_k]$, k = $|Z_1|$; |
|   9. a = k + 1 |
|   10. for j = 2 to n do |
|   11.     k = $|Z_j|$; |
|   12.     $\epsilon_0 = [Z_a, \ldots, Z_{a+k}]$; |
|   13.     Obtain T = arg max$_T$ [$I_2^*(\epsilon, T(\epsilon_0))$]; |
|   14.     Obtain $\tilde{\epsilon} = T(\epsilon_0) = [\tilde{Z}_a, \ldots, \tilde{Z}_{a+k}]$; |
|   15.     $\epsilon \leftarrow \tilde{\epsilon}_0$; |
|   16.     a = a + k + 1; |
|   17. endfor; |
| end |

(e) Extracting from the Plurality of Registered Data, Via the Computing Device, a Plurality of Features and Computing a Plurality of Quantitative Descriptors Corresponding to the Plurality of Features Step According to some embodiments, the method for analyzing multimodal data derived from a biological sample by a multi-protocol analysis using an intelligent supervised embedding (EMPrAvISE) scheme, comprises step (e) extracting from the plurality of registered data, via the computing device, a plurality of features and computing a plurality of quantitative descriptors corresponding to the plurality of features.

According to some such embodiments, the registered data is a digital image. According to some such embodiments, the registered data is a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array (gene expression) image. According to some embodiments, the digital image is a histopathology image of a diseased tissue. According to some such embodiments, the digital image is derived from a biological sample. According to some such embodiments, the biological sample is a diseased tissue sample. Exemplary diseased tissue samples includes, but is not limited to, a tissue sample obtained from a patient with a cancer, an inflammatory disease, Crohn's disease, rheumatoid arthritis, microbial infections, etc. Exemplary cancers include, but are not limited to, brain cancer, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1)

T2-weighted (T2w) MRI image, (2) Dynamic Contrast Enhanced (DCE) MRI image, (3) Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) protocol is a Diffusion Weighted (DWI) MRI image. According to one embodiment, the magnetic resonance imaging (MRI) image is a proton density (PD) MRI image. According to one embodiment, the magnetic resonance imaging (MRI) image is a T2-weighted (T2w) MRI image and a DCE MRI image. According to one embodiment, the magnetic resonance imaging (MRI) image is a T2-weighted (T2w) MRI image, and a DWI MRI image. According to one embodiment, the magnetic resonance imaging (MRI) image is a DCE, and a DcWI MRI image. According to one embodiment, the magnetic resonance imaging (MRI) image is a T2w MRI image, DCE MRI image and DWI MRI image.

Exemplary features of a T2-weighted (T2w) image include, but are not limited to, $1^{st}$ order statistics, Kirsch/Sobel (gradients), and $2^{nd}$ order co-occurrence (Haralick) features. Exemplary features of a Dynamic Contrast Enhanced (DCE) image include, but are not limited to, multi-point intensity information, pharmacokinetic modeling parameters, and textural kinetic descriptors. Exemplary features of a Diffusion Weighted (DWI) image include, but are not limited to, ADC values, gradients, $1^{st}$ and $2^{nd}$ order statistics.

According to some embodiments, the quantitative descriptors are vectors, scalars, or any feature extracted from the original data being quantified in order to represent it. According to one embodiment, the quantitative descriptor is a vector.

(f) Fusing, Via the Computing Device, the Plurality of Quantitative Descriptors to Create a Plurality of Ensemble Embeddings Step According to some embodiments, the method for analyzing multimodal data derived from a biological sample by a multi-protocol analysis using an intelligent supervised embedding (EMPrAvISE) scheme, comprises step (f) fusing, via the computing device, the plurality of quantitative descriptors to create a plurality of ensemble embeddings by:

(i) constructing, via the computing device, a higher dimensional multi-parametric feature space using the plurality of quantitative descriptors;

(ii) computing, via the computing device, a plurality of pair-wise relationships for all quantitative descriptors of the plurality of quantitative descriptors in the higher dimensional multi-parametric feature space and storing the plurality of pair-wise relationships in a confusion matrix;

(iii) generating, via the computing device, a plurality of independent embeddings comprising weak embeddings and strong embeddings derived from the higher dimensional multi-parametric feature space by a feature space perturbation method;

(iv) computing, via the computing device, an embedding strength for each independent embedding;

(v) selecting, via the computing device, a plurality of strong embeddings from the plurality of independent embeddings, wherein the embedding strength of each strong embedding is greater than a pre-specified threshold value and wherein a pair-wise relationship between two quantitative descriptors in the higher dimensional multi-parametric feature space is preserved in each strong embedding;

(vi) computing, via the computing device, a maximum likelihood estimate (MLE) of a probability distribution of each pair-wise relationship of the plurality of pairwise relationships in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix; and (vii) computing, via the computing device, the plurality of ensemble embeddings by a multi-dimensional scaling method, wherein each pair-wise relationship in each embedding equals the corresponding maximum likelihood estimate (MLE) of the pair-wise relationship in the ensemble matrix.

(i) Constructing, Via the Computing Device, a Higher Dimensional Multi-Parametric Feature Space Step According to some such embodiments, fusing step (f) comprises (i) constructing, via the computing device, a higher dimensional multi-parametric feature space using the plurality of quantitative descriptors.

(ii) Computing, Via the Computing Device, a Plurality of Pair-Wise Relationships for all Quantitative Descriptors Step According to some such embodiments, fusing step (f) comprises (ii) computing, via the computing device, a plurality of pair-wise relationships for all quantitative descriptors of the plurality of quantitative descriptors in the higher dimensional multi-parametric feature space and storing the plurality of pair-wise relationships in a confusion matrix.

According to one embodiment, computing step (ii) uses a Euclidean pairwise distance method.

(iii) Generating, Via the Computing Device, a Plurality of Independent Embeddings According to some such embodiments, fusing step (f) comprises (iii) generating, via the computing device, a plurality of independent embeddings derived from the higher dimensional multi-parametric feature space by a feature space perturbation method;

According to some such embodiments, the feature space perturbation method comprises:

(1) generating, via the computing device, a plurality of boostrapped feature sub-sets from each quantitative descriptor of the plurality of quantitative descriptors contained within the higher dimensional multi-parametric feature space; and (2) embedding, via the computing device, a feature space associated with each bootstrapped feature subset of the plurality of boostrapped feature sub-sets into the higher dimensional multi-parametric feature space by a graph embedding method to create the plurality of independent embeddings.

According to some such embodiments, embedding step (2) is implemented by a graph embedding method. According to some such embodiments, the graph embedding method comprises eigenvalue decomposition of the confusion matrix representing adjacencies for the plurality of pair-wise relationships for all quantitative descriptors in the higher dimensional multi-parametric feature space.

Graph Embedding according to Shi et al. can be used. (Shi, J. et al., "Normalized Cuts and Image Segmentation," Pattern Analysis and Machine Intelligence, IEEE Transactions on 22(8), 888-905, 2000). The graph embedding method involves eigenvalue decomposition of a confusion matrix W∈

$\mathfrak{R}^{|C|\times|C|}$, representing the adjacencies between all objects $c\epsilon C$ in high-dimensional feature space. The result of GE, X(c), is obtained from the maximization of the function $$S(X) = 2\gamma \times tr\left[\frac{X(D-W)X^T}{XDX^T}\right],$$

where tr is the trace operator, $X=[X(c_1), X(c_2), \ldots, X(c_q)]$, $q=|C|$ and $\gamma=q-1$. D is a diagonal matrix where the diagonal element is defined as $$D(i, i) = \sum_j W(i, j).$$

Eigenvectors corresponding to the smallest n Eigenvalues of $(D-W)X=\lambda DX$ are calculated. The matrix X of the first n Eigenvectors is constructed, and $\forall_c \epsilon C$, X(c) is defined as row i of X, such that $X(c)=[e_v(c)|v\epsilon\{1, \ldots, n\}]\epsilon R^n$.

According to one embodiment, the plurality of independent embeddings is generated by implementing Algorithm 2 (CreateWeakEmbed) as follows:

---
Algorithm 2 CreateWeakEmbed
---
Input: $F(c) \in R^N$ for all objects $c \in C$, n
Output: $X_m(c) \in R_m{}^n$, $m \in \{1, \ldots, M\}$
Data Structures: Feature subsets $F_m$, total number of subsets M, number of features in each subset V begin
  0. for m = 1 to M do
    1.    Select $V < N$ features from $R^N$, forming subset $F_m$;
    2.    Calculate $X_m(c) \in R_m{}^n$, for all $c \in C$ via GE of the feature space associated with each $F_m$;
    3.    endfor
End.
---

(iv) Computing, Via the Computing Device, an Embedding Strength for Each Embedding Step According to some embodiments, fusing step (f) comprises (iv) computing, via the computing device, an embedding strength for each independent embedding.

(v) Selecting, Via the Computing Device, a Plurality of Strong Embeddings Step

According to some embodiments, fusing step (f) comprises (v) selecting, via the computing device, a plurality of strong embeddings from the plurality of independent embeddings, wherein the embedding strength of each strong embedding is more than a pre-specified threshold value and wherein a pair-wise relationship between two quantitative descriptors in the higher dimensional multi-parametric feature space is preserved in each strong embeddings.

(vi) Computing, Via the Computing Device, a Maximum Likelihood Estimate (MLE) of a Probability Distribution of Each Pair-Wise Relationship Step According to some embodiments, fusing step (f) comprises (vi) computing, via the computing device, a maximum likelihood estimate (MLE) of a probability distribution of each pair-wise relationship of the plurality of pairwise relationships in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix.

(vii) Computing, Via the Computing Device, the Plurality of Ensemble Embeddings Step According to some embodiments, fusing step (f) comprises (vii) computing, via the computing device, the plurality of ensemble embeddings by a multi-dimensional scaling method, wherein each pair-wise relationship in each ensemble embeddings equals the corresponding maximum likelihood estimate (MLE) of the pair-wise relationship in the ensemble matrix.

According to some embodiments, the maximum likelihood estimate is selected from the group consisting of mean, median, mode, variance, or a combination thereof. According to one embodiment, the maximum likelihood estimate is a mean. According to another embodiment, the maximum likelihood estimate is a mode. According to another embodiment, the maximum likelihood estimate is a median. According to another embodiment, the maximum likelihood estimate is a variance.

According to one embodiment, the plurality of ensemble embeddings is computed by implementing Algorithm 3 (EMPrAvISE), as described below:

---
Algorithm 3 (EMPrAvISE)
---
Input: $F(c) \in R^N$ for all objects c, n, M, V, $\theta$
Output: $\tilde{X}(c) \in \tilde{R}^n$
begin
  0. Construct feature space $F(c) \in R^N$, $\forall \epsilon C$ (via feature extraction);
  1. for m = 1 to M do
    2. Calculate $X_m(c)$ = CreateWeakEmbed(F(c)|$F_m$, M, V), $\forall c \in C$, hence yielding $R_M{}^n$;
    3.    k=0;
    4.    Calculate $\Psi^{Acc}(R_m{}^n)$ (based on classification accuracy);
    5.    if $\psi^{Acc}(R_m{}^n) > \theta$
    6.    k++;
    7.    $W_K(i,j) = \|X_m(c) - X_m(d)\|_2$ $\forall_{c,d}$ with indices i, j;
    8.    endif
  9. endfor
  10. $\tilde{W}(i,j) = MEDIAN_k[W_k(i,j)]\forall_{c,d}$;
  11. Apply MDS to $\tilde{W}$ to obtain $\tilde{R}^n$;
  12. Train a classifier on $\tilde{X}(c) \in \tilde{R}^n$, $\forall c \in C$ to distinguish object-class categories;
end
---

According to one embodiment, the probability of a triangle relationship among three quantitative descriptors of the plurality of quantitative descriptors is unity, wherein the pair-wise relationship between two quantitative descriptors in the higher dimensional feature space is preserved in each embedding of the plurality of strong embeddings.

(g) Classifying, Via the Computing Device, the Biological Sample into a Disease Class Step According to some embodiments, the method for analyzing multimodal data derived from a biological sample by a multi-protocol analysis using an intelligent supervised embedding (EMPrAvISE) scheme, further comprises (g) classifying, via the computing device, the biological sample into a disease class.

According to some such embodiments, the multimodal data is a digital image. According to some such embodiments, the multimodal data is a spectrum. Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array (gene expression) image. In some embodiments, the digital image is a histopathology image of a diseased tissue. According to some embodiments, the digital image is derived from a biological sample. According to some such embodiments, the biological sample is a diseased tissue sample. Exemplary diseased tissue samples includes, but is not limited to, a tissue sample obtained from a patient with a cancer, an inflammatory disease, Crohn's disease, rheumatoid arthritis, microbial infections, etc. Exemplary cancers include, but are not limited to, brain cancer, prostate cancer, breast cancer, pancreatic cancer, colon cancer, leukemia, lymphoma, myeloma, ovarian cancer, melanoma, lung cancer, glioma, renal-cell cancer, etc.

According to some embodiments, classifying step (g) is implemented by a replicated k-means clustering method. A replicated k-means clustering method described in (Fred A, Jain A: Combining Multiple Clusterings Using Evidence Accumulation. IEEE Transactions on Pattern Analysis and Machine Intelligence 2005, 27(6):835-850) can be used.

According to some embodiments, classifying step (g) is implemented by a hierarchical clustering method. A hierarchical clustering method described in (Eisen M. et al., "Cluster analysis and display of genome-wide expression patterns," Proceedings of the National Academy of Sciences of the United States of America 1998, 95(25):14863-14868) can be used.

According to some embodiments, classifying, step (g) comprises:
(i) training, via the computing device, a probabilistic boosting tree (PBT) classifier to detect presence of disease in each voxel using the plurality of ensemble embeddings;
(ii) computing, via the computing device, a weighted probabilistic decision for each voxel;
(iii) computing, via the computing device, a posterior conditional probability belonging to the disease class, by propagating the weighted probabilistic decision for each voxel to a plurality of nodes using a discriminative model;
(iv) applying, via the computing device, spatial constraints on the probabilistic boosting tree (PBT) classifier to identify the disease class for each voxel; and
(v) identifying, via the computing device, the disease class corresponding to the biological sample.

(i) Training, Via the Computing Device, a Probabilistic Boosting Tree (PBT) Classifier Step According to some such embodiments, classifying step (g) comprises (i) training, via the computing device, a probabilistic boosting tree (PBT) classifier to detect presence of disease in each voxel using the plurality of ensemble embeddings.

(ii) Computing, Via the Computing Device, a Weighted Probabilistic Decision for Each Voxel Step According to some such embodiments, classifying step (g) comprises (ii) computing, via the computing device, a weighted probabilistic decision for each voxel xels.

(iii) Computing, Via the Computing Device, a Posterior Conditional Probability Belonging to the Disease Class Step According to some such embodiments, classifying step (g) comprises (iii) computing, via the computing device, a posterior conditional probability belonging to the disease class, by propagating the weighted probabilistic decision for each voxel to a plurality of nodes using a discriminative model.

(iv) Computing, Via the Computing Device, a Posterior Conditional Probability Belonging to the Disease Class Step According to some such embodiments, classifying step (g) comprises (iv) applying, via the computing device, spatial constraints on the probabilistic boosting tree (PBT) classifier to identify the disease class for each voxel.

A probabilistic boosting tree (PBT) classifier using a probabilistic pairwise Markov random field algorithm, as described by Monaco et al. (Monaco, J. et al., "High-throughput detection of prostate cancer in histologicalsections using probabilistic pairwise Markov models," Medical Image Analysis 14(4), 617 629 (2010)) can be used.

(v) Identifying, Via the Computing Device, the Disease Class Step

According to some such embodiments, classifying step (g) comprises (v) identifying, via the computing device, the disease class corresponding to the biological sample.

(h) Outputting, Via the Computing Device, the Disease Class Step

According to some embodiments, the method for analyzing multimodal data derived from a biological sample by a multi-protocol analysis using an intelligent supervised embedding (EMPrAvISE) scheme, further comprises (h) outputting, via the computing device, the disease class.

IIb. System for Analyzing Multi-Modal Data Derived from a Biological Sample

According to another aspect, the described invention provides a system for analyzing multimodal data derived from a biological sample by a multi-protocol analysis using an intelligent supervised embedding (EMPrAvISE) scheme, comprising:
(a) a computing device configured to input the multimodal data, wherein the multimodal data comprises a plurality of data;
(b) the computing device configured to generate a plurality of voxels in the multimodal data;
(c) the computing device configured to assign an intensity value to each voxel in the multimodal data;
(d) the computing device configured to register the plurality of data to create a plurality of registered data, such that the plurality of registered data have the same spatial frame as a reference datum, and computing a ground truth extent of disease for each voxel of the plurality of voxels;
(e) the computing device configured to extract from the plurality of registered data a plurality of features and computing a plurality of quantitative descriptors corresponding to the plurality of features; and
(f) the computing device configured to fuse the plurality of quantitative descriptors to create a plurality of ensemble embeddings, wherein the computing device is further configured:
(i) to construct a higher dimensional multi-parametric feature space using the plurality of quantitative descriptors;
(ii) to compute a plurality of pair-wise relationships for all quantitative descriptors of the plurality of quantitative descriptors in the higher dimensional multi-parametric feature space via a Euclidean pairwise distance method and storing the plurality of pair-wise relationships in a confusion matrix;

(iii) to generate a plurality of independent embeddings comprising weak embeddings and strong embeddings derived from the higher dimensional multi-parametric feature space by a feature space perturbation method;

(iv) to compute an embedding strength for each independent embedding;

(v) to select a plurality of strong embeddings from the plurality of independent embeddings, wherein the embedding strength of each strong embedding is more than a pre-specified threshold value, and wherein a pair-wise relationship between two quantitative descriptors in the higher dimensional multi-parametric feature space is preserved in each strong embedding;

(vi) to compute a maximum likelihood estimate (MLE) of a probability distribution of each pair-wise relationship in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix; and (vii) to compute the plurality of ensemble embeddings by a multi-dimensional scaling method, wherein each pair-wise relationship in each ensemble embedding equals the corresponding maximum likelihood estimate (MLE) of the pair-wise relationship in the ensemble matrix;

(g) the computing device configured to classify the biological sample into a disease class; and (h) the computing device configured to output the disease class.

The multi-protocol analysis using an intelligent supervised embedding (EMPrAvISE) scheme is illustrated in FIG. 8.

(a) A Computing Device Configured to Input the Multimodal Data

According to some embodiments, the system for analyzing multimodal data derived from a biological sample by a multi-protocol analysis using an intelligent supervised embedding (EMPrAvISE) scheme, comprising (a) a computing device configured to input the multimodal data.

According to some such embodiments, the multimodal data is a digital image. According to some such embodiments, multimodal data a spectrum.

According to some such embodiments, the plurality of data in the multimodal data comprises a digital image. According to some such embodiments, the plurality of data comprises a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some embodiments, the digital image is a microscopic image. According to some embodiments, the digital image is a magnetic resonance imaging (MRI) image. According to some embodiments, the digital image is a positron emission tomography (PET) image. According to some embodiments, the digital image is a single-photon emission computed tomography (SPECT) image. According to some embodiments, the digital image is an ultrasound image. According to some embodiments, the digital image is an x-ray image. According to some embodiments, the digital image is a computed tomography (CT) image. According to some embodiments, the digital image is a micro-array image. In some embodiments, the digital image is a histopathology image of a diseased tissue. According to some embodiments, the digital image is derived from a biological sample. According to some such embodiments, the biological sample is a diseased tissue sample. Exemplary diseased tissue samples includes, but is not limited to, a tissue sample obtained from a patient with a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) a T2-weighted (T2w) MRI image, (2) a Dynamic Contrast Enhanced (DCE) MRI image, (3) a Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) image is a Diffusion Weighted (DWI) MRI image. According to one embodiment, the magnetic resonance imaging (MRI) image is a proton density (PD) MRI image.

Exemplary protocols include, but are not limited to, a magnetic resonance imaging (MRI) protocol, a positron emission tomography (PET) protocol, a single-photon emission computed tomography (SPECT) protocol, an ultrasound protocol, an x-ray protocol, a computed tomography (CT) protocol, a micro-array protocol, a spectroscopy protocol, a spectrometry protocol, etc.

According to some such embodiments, the protocol is a magnetic resonance imaging (MRI) protocol. According to some such embodiments, the magnetic resonance imaging (MRI) protocol is selected from the group consisting of (1) T2-weighted (T2w) MRI protocol, (2) Dynamic Contrast Enhanced (DCE) MRI protocol, (3) Diffusion Weighted (DWI) MRI protocol, or a combination thereof. According to one embodiment, the magnetic resonance imaging (MRI) protocol is a T2-weighted (T2w) MRI protocol. According to one embodiment, the magnetic resonance imaging (MRI) protocol is a Dynamic Contrast Enhanced (DCE) MRI protocol. According to one embodiment, the magnetic resonance imaging (MRI) protocol is a Diffusion Weighted (DWI) MRI protocol. The T2-weighted (T2w) MRI protocol captures high resolution anatomical information from a histopathology image. The Dynamic Contrast Enhanced (DCE) MRI protocol characterizes micro-vascular function via uptake and washout of a paramagnetic contrast agent. The Diffusion Weighted (DWI) MRI protocol captures water diffusion restriction via an Apparent Diffusion Coefficient (ADC) map. According to one embodiment, the magnetic resonance imaging (MRI) protocol is a proton density (PD) MRI protocol.

(b) The Computing Device Configured to Generate a Plurality of Voxels

According to some embodiments, the system for analyzing multimodal data derived from a biological sample by a multi-protocol analysis using an intelligent supervised embedding (EMPrAvISE) scheme, comprises (b) the computing device configured to generate a plurality of voxels in the multimodal data.

According to some such embodiments, the multimodal data is two-dimensional. According to some such embodiments, the multimodal data is three-dimensional. According to some such embodiments, the multimodal data is multi-dimensional. According to some such embodiments, the multimodal data has a resolution ranging from 256×256 voxels and 512×512 voxels. According to one embodiment, the multimodal data has a resolution of 256×256 voxels. According to one embodiment, the multimodal data has a resolution of 512×512 voxels. In other embodiments, the multimodal data has a resolution of 100×100 voxels ranging through 5000× 5000 voxels, all permutations inclusive. According to some such embodiments, the multimodal data has a resolution of at least 100×100 voxels. According to another embodiment, the multimodal data has a resolution of at least 200×200 voxels. According to another embodiment, the multimodal data has a resolution of at least 300×300 voxels. According to another embodiment, the multimodal data has a resolution of at least 400×400 voxels. According to another embodiment, the multimodal data has a resolution of at least 500×500 voxels. According to another embodiment, the multimodal data has a resolution of at least 600×600 voxels. According to another embodiment, the multimodal data has a resolution of at least 700×700 voxels. According to another embodiment, the multimodal data has a resolution of at least 800×800 voxels. According to another embodiment, the multimodal data has a resolution of at least 900×900 voxels. According to another embodiment, the multimodal data has a resolution of at least 1000×1000 voxels. According to another embodiment, the multimodal data has a resolution of at least 2000×2000 voxels. According to another embodiment, the multimodal data has a resolution of at last 3000×3000 voxels. According to another embodiment, the multimodal data has a resolution of at least 4000×4000 voxels. According to another embodiment, the multimodal data has a resolution of at least 5000× 5000 voxels.

(c) The Computing Device Configured to Assign an Intensity Value to Each Voxel in the Multimodal Data According to some embodiments, the system for analyzing multimodal data derived from a biological sample by a multi-protocol analysis using an intelligent supervised embedding (EMPrAvISE) scheme, comprises (c) the computing device configured to assign an intensity value to each voxel in the multimodal data.

(d) The Computing Device Configured to Register the Plurality of Data to Create a Plurality of Registered Data According to some embodiments, the system for analyzing multimodal data derived from a biological sample by a multi-protocol analysis using an intelligent supervised embedding (EMPrAvISE) scheme, comprises (d) the computing device configured to register the plurality of data to create a plurality of registered data, such that the plurality of registered data have the same spatial frame as a reference datum, and computing a ground truth extent of disease for each voxel of the plurality of voxels.

According to some embodiments, computing device (d) is further configured to implement a multi-attribute, higher order mutual information (MI)-based elastic registration (MACMI) scheme by a volumetric affine registration method that corrects for inter-acquisition movement and resolution differences between the plurality of protocols. The multi-attribute, higher order mutual information (MI)-based elastic registration (MACMI) scheme by a volumetric affine registration method is described by Chappelow et al., (Chappelow, J. et al., "Elastic Registration of Multimodal Prostate MRI and Histology via Multi-Attribute Combined Mutual Information," *Medical Physics*, 2011, 38(4): 2005-2018).

According to some embodiments, the multi-attribute, higher order mutual information (MI)-based elastic registration (MACMI) scheme is implemented within an elastic registration framework, whereby the similarity measure is used to drive a set of free form deformations (FFDs) defined with a hierarchical grid size. This allows for local image transformations across multiple image resolutions. The multi-attribute, higher order mutual information (MI)-based elastic registration (MACMI) scheme by a volumetric affine registration method uses mutual information between scalar-valued multimodal data, such as images according to the following method. Equation (10) below is a common formulation of MI for a pair of images (or random variables representing multimodal data) $A_1$, $A_2$ in terms of Shannon entropy:

$$I_2(A_1,A_2)=S(A_1)+S(A_2)-S(A_1,A_2) \qquad (10)$$

where $I_2(A_1, A_2)$ describes the interdependence of two variables or intensity values of a pair of multimodal data, such as images. As $I_2(A_1, A_2)$ increases, the uncertainty about $A_1$ given $A_2$ decreases.

Thus, it is assumed that the global MI maximum will occur at the point of precise alignment, when maximal uncertainty about intensities of $A_1$ can be explained by $A_2$.

The conventional MI formulation can be extended to high dimensional observations by combining the multiple dimensions or attributes via high order joint entropy calculations. This application of MI is referred as MACMI to distinguish it from conventional applications of MI and higher order MI and denote it as $I_2^*$. Unlike the more familiar higher order MI ($I_n$, $n\geq 2$), the goal of MACMI is not to measure only the intersecting information between multiple sources $A_1, \ldots, A_n$, but to quantify the combined predictive value of one multivariate source (e.g., $[A_1, \ldots, A_n]$) with respect to another (e.g., $[B_1, \ldots, B_n]$). An image ensemble is described as a concatenation of n intensity-valued images $(I_1, \ldots, I_n)$ into an n-dimensional (multiattribute or multimodal or multiparametric) image, denoted as $[I_1, \ldots, I_n]$. In the simplest case, the MI ($I_2^*$) that a single image $A_1$ shares with an ensemble of two other images, $B_1$ and $B_2$, is described as shown in Equation (11):

$$I_2^*(A_1,[B_1,B_2])=S(A_1)+S(A_1)+S(B_1,B_2)-S(A_1,B_1,B_2) \qquad (11)$$

By considering $B_1$ and $B_2$ as simultaneously measured semi-independent variables in the multidimensional ensemble $[B_1, B_2]$, any dependence that exists between $B_1$ and $B_2$ can be discounted and $I_2^*$ remains bounded by the smaller of $S(A_1)$ and $S(B_1, B_2)$. The generalized form of MI between the n-dimensional ensemble $\epsilon_n^A=[A_1, \ldots, A_n]$ with the m-dimensional ensemble $\epsilon_n^B=[B_1, \ldots, B_m]$ is described as in Equation (12) below:

$$I_2^*(\epsilon_n^A,\epsilon_m^B)=S(\epsilon_n^A)+S(\epsilon_m^B)-S(\epsilon_n^A,\epsilon_m^B) \qquad (12)$$

Thus, MACMI accomplishes fusion of the multiple dimensions of a multi-attribute image, allowing only intersecting information between two such images (e.g., $\epsilon_n^A$ and $\epsilon_n^B$) to be quantified.

Algorithm 1 below is a generalized algorithm (MACMIreg) for performing registration of m images $Z_1, \ldots, Z_m$ in a specific order. The order is specified using a hierarchical organization of the images within a family of sets Z and by progressively aligning and accumulating the registered images into a single ensemble $\epsilon$.

Algorithm 1 (MACMIreg)

Consider a family of sets Z that contains m≥2 images $Z_1, \ldots, Z_m$ distributed throughout n≤m ordered subsets $Z_j(j\in I)$, where $I=\{1, \ldots, n\}$, (i.e., $\cup_{j\in I} Z_j = \{Z_1, \ldots, Z_m\}$ and $\cup_{j\in I} Z_j \neq \Phi$). Each subset $Z_j(j\in\{1, \ldots, n\})$ may also be a family (i.e., have subsets of its own) or simply an ordered set of registered images. For example, if $Z_j=n\{\{Z_1^{(j)}, Z_2^{(j)}\}, \{Z_3^{(j)}\}, \{Z_4^{(j)}\}\}$, $Z_j$ is defined as a family of $|Z_j|=3$ subsets, containing a total of $k=\|Z_j\|=4$ images. The ensemble of all k images in $Z_j$ can be denoted as $\epsilon=<Z_j>=[Z_1^{(j)}, \ldots, Z_k^{(j)}]$. By organizing the m images into a hierarchy of subsets within the family Z, the order in which the images are registered and combined into multi-attribute images is determined. The procedure for alignment of all images (within and between each $Z_j$) into a single ensemble $\epsilon$ of registered images is described in the following recursive Algorithm 1 (MACMIreg). The notation $\epsilon \leftarrow \epsilon_d$ as the expansion of an n-dimensional multi-attribute image (ensemble) $\epsilon$ into a (d+n)-dimensional ensemble by concatenation with a d-dimensional ensemble $\epsilon_d$. The notation $Z_j \Leftarrow \epsilon$ is denoted as the assignment of each of the m dimensions (intensity images) in $\epsilon$ to the existing m total members of $Z_j$ (independent of the organization of images within the family structure), thus replacing or updating $Z_j$ with the contents of $\epsilon$.

---

Algorithm MACMIreg

Input: $Z = \{Z_1 ..., Z_n\}, n \geq 1$.
Output: $\epsilon$.
Auxillary Data Structures: Index k, j, $\alpha$; Image ensemble $\epsilon_0$.
begin
0. for j = 1 to n do
1.    k = $|Z_j|$;
2.    if k >1 then
3.      Obtain ensemble $\epsilon_0$ = MACMIreg($Z_j$);
4.        Update $Z_j \Leftarrow \epsilon_0$;
5.    endif;
6. endfor ;
7. Initialize $\epsilon$ as an empty ensemble;
8. $\epsilon \leftarrow [Z_1,...,Z_k], k = |Z_1|$
9. a = k + 1
10. for j = 2 to n do
11.    k = $|Z_j|$;
12.    $\epsilon_0 = [Z_a,...,Z_{a+k}]$;
13.    Obtain T = arg max$_T$ [$I_2^*(\epsilon, T(\epsilon_0))$];
14.    Obtain $\tilde{\epsilon}$ = T($\epsilon_0$) = [$\tilde{Z}_a,...,\tilde{Z}_{a+k}$];
15.    $\epsilon \leftarrow \tilde{\epsilon}_0$;
16.    a = a + k + 1;
17. endfor ;
end

---

Lines 1-6 of MACMIreg use recursive calls to MACMIreg to register the images within each $Z_j$ containing more than one image. When MACMIreg($Z_j$) is executed on line 3, the algorithm is recursively instantiated in order to co-register the images within the subset $Z_j$ and any of its subsets, returning the registered images within ensemble $\epsilon$. Line 4 then updates each $Z_j$ by replacing its constituent elements with the co-registered member images contained within $\epsilon$. Lines 7-17 of MACMIreg perform the registration between the multi-attribute images generated from each $Z_j$, each of which now comprise only co-registered images (or a single image) following lines 1-6 of the algorithm. A spatial transformation T of the current moving image ensemble $\epsilon_0$ into alignment with the stationary growing ensemble $\epsilon$ is determined on line 13. The registered ensemble $\tilde{\epsilon}_0$, obtained via T on line 14, is then combined with $\epsilon$ on line 15. The algorithm continues to align each subsequent $Z_j$ with the expanding reference ensemble $\epsilon$.

The operation of MACMIreg(Z) for Z={$\{Z_1\}, \{Z_2\}, \{Z_3\}, \{Z_4\}$} begins by registration of images within each $Z_j$(j∈{1, 2, 3}), where only $Z_3$={$\{Z_3\}, \{Z_4\}$} contains more than one image. Thus, MACMIreg($Z_3$) is called to register $Z_3$ to $Z_4$ and update $Z_3$ with ensemble (lines 3-4 of MACMIreg). Having registered the images within each $Z_j$ (lines 1-6 of MACMIreg), all images in Z are registered in two steps (lines 7-17 of MACMIreg). At each registration step, an optimal spatial transformation T of $\epsilon_0$ to $\epsilon$ is determined by argmax$_T$[$I_2^*(\epsilon, T(\epsilon_0))$] (line 13 of MACMIreg) and $\epsilon$ is then expanded by $\epsilon \leftarrow \tilde{\epsilon}_0 T(\epsilon_0)$ (lines 14 and 15 of MACMIreg). Thus, $Z_2$ is first registered to $Z_1$, where $\epsilon=[Z_1]$ and $\epsilon_0=[Z_2]$, and $\epsilon \leftarrow \tilde{\epsilon}_0 = \tilde{Z}_2 T = [Z_2]$. Next $Z_3$ is registered to $Z_1$ (and implicitly $Z_2$), where $\epsilon=[Z_1, \tilde{Z}_2]$ and $\epsilon_0=[Z_3, \hat{Z}_4]$ [the output of MACMIreg($Z_3$)], and $\epsilon \leftarrow \tilde{\epsilon}_0=[\tilde{Z}_3, \tilde{Z}_4]:[T(Z_3), T(Z_4)]$. The final output is $\epsilon=[Z_1, \tilde{Z}_2, \tilde{Z}_3, \tilde{Z}_4]$, comprising all of the co-registered images in Z.

The use of both $Z_3$ and $Z_4$ (and both $Z_1$ and $Z_2$) in the final registration step has the following benefits: (1) avoids potential ambiguity in choosing between $Z_3$ and $Z_4$ (between $Z_1$ and $Z_2$) and (2) potentially provides improved alignment versus use of just $Z_3$ or $Z_4$ ($Z_1$ or $Z_2$) individually. The advantage of MACMI is that it yields cumulative incorporation of all images, while allowing flexibility to choose the order of multiattribute image construction.

Implementation of MACMI within a complete registration framework is described below. MACMI can be utilized to leverage multiple image sources in nearly any registration application by selecting the following components based on domain requirements:

(1) MI estimation for high dimensional data: The most straightforward approach to estimating $I_2^*(\epsilon_n^A, \epsilon_m^B)$ is to formulate the density estimates from high dimensional histograms. While histogram-based techniques are feasible and effective for up to four-dimensional observations with appropriate bin size, as demonstrated by Studholme et al. (Studholme, C. et al., "Incorporating connected region labeling into automatic image registration using mutual information," in *Mathematical Methods in Biomedical Image Analysis*, 1996, 3979: 23-31) and by Rueckert et al. (Rueckert, D. et al., "Non-rigid registration using higher-order mutual information," *Proc. SPIE*, 2000, 3979: 438-447), higher dimensionality necessitates an alternate estimate of entropy or MI, such as those based on entropic spanning graphs or related quantities such as α-MI, as described by Neemuchwala et al. (Neemuchwala, H. et al., "Image matching using alphaentropy measures and entropic graphs," *Signal Process*, 2005, 85: 277-296).

(2) Image transformation model(s): Since MACMI only dictates the construction of the objective function, MACMI is agnostic to the deformation model. Further, different deformation models may be used for each image since the individual image transformations are performed in independent steps.

(3) Optimization scheme to find a maximum of $I_2^*(\epsilon_n^A, \epsilon_m^B)$: If the analytical gradient can be derived, as demonstrated for α-MI as described by Staring et al. (Staring, M. et al., "Registration of cervical MRI using multi-feature mutual information," *IEEE Trans. Med. Imaging*, 2009, 28: 1412-1421), an efficient stochastic gradient descent method can be used. In the absence of analytical gradients of $I_2^*(\epsilon_n^A, \epsilon_m^B)$, methods including direct search (e.g., downhill simplex), quasi-Newton (e.g., Broyden-Fletcher-Goldfarb-Shanno), and other finite difference-based schemes can be employed.

The computing device (d) could correct for intensity homogeneity and non-standardness, according to the method described in Madabhushi, A. et al., "New methods of MR image intensity standardization via generalized scale," *Medical Physics* 33(9), 3426-34 (2006).

According to one embodiment, computing device (d) is implemented by Algorithm 1 (MACMIreg), as described below:

---

Algorithm MACMIreg

Input: $Z = \{Z_1 ..., Z_n\}, n \geq 1$.
Output: $\epsilon$.
Auxillary Data Structures: Index k, j, $\alpha$; Image ensemble $\epsilon_0$.
begin -continued

```
Algorithm MACMIreg 0. for j = 1 to n do
1.   k = |Z_j|;
2.   if k > 1 then
3.      Obtain ensemble ε_0 = MACMIreg(Z_j);
4.         Update Z_j ⇐ ε_0;
5.      endif;
6. endfor ;
7. Initialize ε as an empty ensemble;
8. ε ← [Z1 ,..., Z_k], k = |Z_1|
9. a = k + 1
10. for j = 2 to n do
11.    k = |Z_j|;
12.    ε_0 = [Z_a,..., Z_{a+k}];
13.    Obtain T = arg max_T [I_2*(ε,T(ε_0))];
14.    Obtain ε̃ = T(ε_0) = [Z̃_a ,..., Z̃_{a+k}];
15.    ε ← ε̃_0;
16.      a = a + k + 1;
17. endfor;
end
```

(e) The Computing Device Configured to Extract from the Plurality of Registered Data a Plurality of Features and Computing a Plurality of Quantitative Descriptors Corresponding to the Plurality of Features According to some embodiments, the system for analyzing multimodal data derived from a biological sample by a multi-protocol analysis using an intelligent supervised embedding (EMPrAvISE) scheme, comprises (e) the computing device configured to extract from the plurality of registered data a plurality of features and computing a plurality of quantitative descriptors corresponding to the plurality of features.

According to some such embodiments, the registered data is a digital image. According to some such embodiments, the registered data is a spectrum.

Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array (gene expression) image. According to some embodiments, the digital image is a histopathology image of a diseased tissue. According to some such embodiments, the digital image is derived from a biological sample. According to some such embodiments, the biological sample is a diseased tissue sample. Exemplary diseased tissue samples includes, but is not limited to, a tissue sample obtained from a patient with a cancer, an inflammatory disease, Crohn's disease, rheumatoid arthritis, microbial infections, etc. Exemplary cancers include, but are not limited to, brain cancer, prostate cancer, breast cancer, pancreatic cancer, colon cancer, leukemia, lymphoma, myeloma, ovarian cancer, melanoma, lung cancer, glioma, renal-cell cancer, etc.

According to some such embodiments, the image is a magnetic resonance imaging (MRI) image. According to some such embodiments, the magnetic resonance imaging (MRI) image is selected from the group consisting of (1) T2-weighted (T2w) MRI image, (2) Dynamic Contrast Enhanced (DCE) MRI image, (3) Diffusion Weighted (DWI) MRI image, or a combination thereof. According to one embodiment, the magnetic resonance imaging (MRI) protocol is a T2-weighted (T2w) MRI image. According to one embodiment, the magnetic resonance imaging (MRI) protocol is a Dynamic Contrast Enhanced (DCE) MRI image. According to one embodiment, the magnetic resonance imaging (MRI) protocol is a Diffusion Weighted (DWI) MRI image. According to one embodiment, the magnetic resonance imaging (MRI) image is a proton density (PD) MRI image. According to one embodiment, the magnetic resonance imaging (MRI) image is a T2-weighted (T2w) MRI image and a DCE MRI image. According to one embodiment, the magnetic resonance imaging (MRI) image is a T2-weighted (T2w) MRI image, and a DWI MRI image. According to one embodiment, the magnetic resonance imaging (MRI) image is a DCE, and a DcWI MRI image. According to one embodiment, the magnetic resonance imaging (MRI) image is a T2w MRI image, DCE MRI image and DWI MRI image.

Exemplary features of a T2-weighted (T2w) image include, but are not limited to, $1^{st}$ order statistics, Kirsch/Sobel (gradients), and $2^{nd}$ order co-occurrence (Haralick) features. Exemplary features of a Dynamic Contrast Enhanced (DCE) image include, but are not limited to, multi-point intensity information, pharmacokinetic modeling parameters, and textural kinetic descriptors. Exemplary features of a Diffusion Weighted (DWI) image include, but are not limited to, ADC values, gradients, $1^{st}$ and $2^{nd}$ order statistics.

According to some embodiments, the quantitative descriptors are vectors, scalars, or any feature extracted from the original data being quantified in order to represent it. According to one embodiment, the quantitative descriptor is a vector.

(f) The Computing Device Configured to Fuse the Plurality of Quantitative Descriptors to Create a Plurality of Ensemble Embeddings According to some embodiments, the system for analyzing multimodal data derived from a biological sample by a multi-protocol analysis using an intelligent supervised embedding (EMPrAvISE) scheme, comprises (f) computing device configured to fuse the plurality of quantitative descriptors to create a plurality of ensemble embeddings, wherein the computing device is further configured:

(i) to construct a higher dimensional multi-parametric feature space using the plurality of quantitative descriptors;

(ii) to compute a plurality of pair-wise relationships for all quantitative descriptors of the plurality of quantitative descriptors in the higher dimensional multi-parametric feature space via a Euclidean pairwise distance method and storing the plurality of pair-wise relationships in a confusion matrix;

(iii) to generate a plurality of independent embeddings comprising weak embeddings and strong embeddings derived from the higher dimensional multi-parametric feature space by a feature space perturbation method;

(iv) to compute an embedding strength for each independent embedding;

(v) to select a plurality of strong embeddings from the plurality of independent embeddings, wherein the embedding strength of each strong embedding is more than a pre-specified threshold value, and wherein a pairwise relationship between two quantitative descriptors in the higher dimensional multi-parametric feature space is preserved in each strong embedding;

(vi) to compute a maximum likelihood estimate (MLE) of a probability distribution of each pair-wise relationship in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix; and (vii) to compute the plurality of ensemble embeddings by a multi-dimensional scaling method, wherein each pair-wise relationship in each ensemble embedding equals the corresponding maximum likelihood estimate (MLE) of the pair-wise relationship in the ensemble matrix;

(i) To Construct a Higher Dimensional Multi-Parametric Feature Space Using the Plurality Of Quantitative Descriptors According to some embodiments, computing device (f) is further configured (i) to construct a higher dimensional multi-parametric feature space using the plurality of quantitative descriptors.

(ii) To Compute a Plurality of Pair-Wise Relationships for all Quantitative Descriptors of the Plurality of Quantitative Descriptors in the Higher Dimensional Multi-Parametric Feature Space According to some embodiments, computing device (f) is further configured to (ii) to compute a plurality of pair-wise relationships for all quantitative descriptors of the plurality of quantitative descriptors in the higher dimensional multi-parametric feature space via a Euclidean pairwise distance method and storing the plurality of pair-wise relationships in a confusion matrix.

According to one embodiment, computing device (f) further configured to (ii) to compute a plurality of pair-wise relationships for all quantitative descriptors is further configured to implement a Euclidean pairwise distance method.

(iii) To Generate a Plurality of Independent Embeddings Comprising Weak Embeddings and Strong Embeddings Derived from the Higher Dimensional Multi Parametric Feature Space By a Feature Space Perturbation Method According to some such embodiments, computing device (f) further configured to (iii) to generate a plurality of independent embeddings comprising weak embeddings and strong embeddings derived from the higher dimensional multi-parametric feature space, wherein the computing device is further configured to implement a feature space perturbation method;

According to some such embodiments, computing device (f) further configured to (iii) to generate a plurality of independent embeddings is further configured to implement the feature space perturbation method, wherein the computing device is further configured:

(1) to generate a plurality of boostrapped feature sub-sets from each quantitative descriptor of the plurality of quantitative descriptors contained within the higher dimensional multi-parametric feature space; and (2) to embed a feature space associated with each bootstrapped feature subset of the plurality of boostrapped feature sub-sets into the higher dimensional multi-parametric feature space by a graph embedding method to create the plurality of independent embeddings.

According to some embodiments, computing device (f) further configured to (iii) to generate a plurality of independent embeddings further configured to implement the feature space perturbation method embedding step (2) is further configured to implement a graph embedding method. According to some such embodiments, the graph embedding method comprises eigenvalue decomposition of the confusion matrix representing adjacencies for the plurality of pair-wise relationships for all quantitative descriptors in the higher dimensional multi-parametric feature space.

Graph Embedding according to Shi et al. can be used. (Shi, J. et al., "Normalized Cuts and Image Segmentation," Pattern Analysis and Machine Intelligence, IEEE Transactions on 22(8), 888-905, 2000). The graph embedding method involves eigenvalue decomposition of a confusion matrix $W \in \mathfrak{R}^{|C| \times |C|}$, representing the adjacencies between all objects $c \in C$ in high-dimensional feature space. The result of GE, $X(c)$, is obtained from the maximization of the function $$S(X) = 2\gamma \times tr\left[\frac{X(D-W)X^T}{XDX^T}\right],$$

where tr is the trace operator, $X=[X(c_1), X(c_2), \ldots, X(c_q)]$, $q=|C|$ and $\gamma=q-1$. D is a diagonal matrix where the diagonal element is defined as $$D(i, i) = \sum_j W(i, j).$$

Eigenvectors corresponding to the smallest n Eigenvalues of $(D-W)X=\lambda DX$ are calculated. The matrix X of the first n Eigenvectors is constructed, and $\forall_c \in C$, $X(c)$ is defined as row i of X, such that $X(c)=[e_v(c)|v\in\{1,\ldots,n\}]\in R^n$.

According to one embodiment, computing device (f) further configured to (iii) to generate a plurality of independent embeddings further configured to implement Algorithm 2 (CreateWeakEmbed) as follows:

---

Algorithm 2 CreateWeakEmbed

---

Input: $F(c) \in R^N$ for all objects $c \in C$, n
Output: $X_m(c) \in R_m{}^n$, $m \in \{1,\ldots, M\}$
Data Structures: Feature subsets $F_m$, total number of subsets M, number of features in each subset V begin
    0. for m = 1 to M do
    1.    Select V < N features from $R^N$, forming subset $F_m$;
    2.    Calculate $X_m(c) \in R_m{}^n$, for all $c \in C$ via GE of the feature space associated with each $F_m$;
    3.    endfor
End.

(iv) To Compute an Embedding Strength for Each Independent Embedding

According to some embodiments, computing device (f) is further configured (iv) to compute an embedding strength for each independent embedding.

(v) To Select a Plurality of Strong Embeddings from the Plurality of Independent Embeddings According to some embodiments, computing device (f) is further configured (v) to select a plurality of strong embeddings from the plurality of independent embeddings, wherein the embedding strength of each strong embedding is more than a pre-specified threshold value, and wherein a pair-wise relationship between two quantitative descriptors in the higher dimensional multi-parametric feature space is preserved in each strong embedding.

(vi) To Compute a Maximum Likelihood Estimate (MLE) of a Probability Distribution of Each Pair-Wise Relationship According to some embodiments, computing device (f) is further configured (vi) to compute a maximum likelihood estimate (MLE) of a probability distribution of each pair-wise relationship in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix.

(vii) To Compute the Plurality of Ensemble Embeddings by a Multi-Dimensional Scaling Method According to some embodiments, computing device (f) is further configured (vii) to compute the plurality of ensemble embeddings by a multi-dimensional scaling method, wherein each pair-wise relationship in each ensemble embedding equals the corresponding maximum likelihood estimate (MLE) of the pair-wise relationship in the ensemble matrix.

According to some embodiments, the maximum likelihood estimate is selected from the group consisting of mean, median, mode, variance, or a combination thereof. According to one embodiment, the maximum likelihood estimate is a mean. According to another embodiment, the maximum likelihood estimate is a mode. According to another embodiment, the maximum likelihood estimate is a median. According to another embodiment, the maximum likelihood estimate is a variance.

According to one embodiment, computing device (f) is further configured to implement Algorithm 3 (EMPrAvISE), as described below:

---
Algorithm 3 (EMPrAvISE)
---

Input: $F(c) \in R^N$ for all objects c, n, M, V, θ
Output: $X(c) \in \tilde{R}^n$
begin
    0. Construct feature space $F(c) \in R^N$, $\forall \in C$ (via feature extraction);
    1. for m = 1 to M do
    2. Calculate $X_m(c)$ = CreateWeakEmbed($F(c)|F_m$, M, V), $\forall c \in C$, hence yielding $R_M^n$;
    3.    k=0;
    4.    Calculate $\psi^{Acc}(R_m^n)$ (based on classification accuracy);
    5.    if $\psi^{Acc}(R_m^n) > \theta$
    6.    k++;
    7.    $W_K(i, j) = \|X_m(c) - X_m(d)\|_2$ $\forall_{c,d}$ with indices i, j;
    8.    endif
    9. endfor
    10. $\tilde{W}(i,j)$ = $MEDIAN_k[W_k(i,j)]\forall_{c,d}$;
    11. Apply MDS to $\tilde{W}$ to obtain $\tilde{R}^n$;
    12. Train a classifier on $\tilde{X}(c) \in \tilde{R}^n$, $\forall c \in C$ to distinguish object-class categories;
end According to one embodiment, the probability of a triangle relationship among three quantitative descriptors of the plurality of quantitative descriptors is unity, wherein the pair-wise relationship between two quantitative descriptors in the higher dimensional feature space is preserved in each embedding of the plurality of strong embeddings.

(g) The Computing Device Configured to Classify the Biological Sample into a Disease Class According to some embodiments, the system for analyzing multimodal data derived from a biological sample by a multi-protocol analysis using an intelligent, supervised embedding (EMPrAvISE) scheme, comprises (g) the computing device configured to classify the biological sample into a disease class.

According to some such embodiments, the multimodal data is a digital image. According to some such embodiments, the multimodal data is a spectrum. Exemplary digital images include, but are not limited to, a magnetic resonance imaging (MRI) image, a positron emission tomography (PET) image, a single-photon emission computed tomography (SPECT) image, an ultrasound image, an x-ray image, a computed tomography (CT) image, a micro-array image, etc. According to some such embodiments, the digital image is a microscopic image. According to some such embodiments, the digital image is a magnetic resonance imaging (MRI) image. According to some such embodiments, the digital image is a positron emission tomography (PET) image. According to some such embodiments, the digital image is a single-photon emission computed tomography (SPECT) image. According to some such embodiments, the digital image is an ultrasound image. According to some such embodiments, the digital image is an x-ray image. According to some such embodiments, the digital image is a computed tomography (CT) image. According to some such embodiments, the digital image is a micro-array (gene expression) image. In some embodiments, the digital image is a histopathology image of a diseased tissue. According to some embodiments, the digital image is derived from a biological sample. According to some such embodiments, the biological sample is a diseased tissue sample. Exemplary diseased tissue samples includes, but is not limited to, a tissue sample obtained from a patient with a cancer, an inflammatory disease, Crohn's disease, rheumatoid arthritis, microbial infections, etc. Exemplary cancers include, but are not limited to, brain cancer, prostate cancer, breast cancer, pancreatic cancer, colon cancer, leukemia, lymphoma, myeloma, ovarian cancer, melanoma, lung cancer, glioma, renal-cell cancer, etc.

According to some embodiments, computing device (g) is further configured to implement a replicated k-means clustering method. A replicated k-means clustering method described in (Fred A, Jain A: Combining Multiple Clusterings Using Evidence Accumulation. IEEE Transactions on Pattern Analysis and Machine Intelligence 2005, 27(6):835-850) can be used.

According to some embodiments, computing device (g) is further configured to implement a hierarchical clustering method. A hierarchical clustering method described in (Eisen M. et al., "Cluster analysis and display of genome-wide expression patterns," Proceedings of the National Academy of Sciences of the United States of America 1998, 95(25): 14863-14868) can be used.

According to some embodiments, computing device (g) is further configured:

(i) to train a probabilistic boosting tree (PBT) classifier to detect presence of disease in each voxel using the plurality of ensemble embeddings;

(ii) to compute a weighted probabilistic decision for each voxel;

(iii) to compute a posterior conditional probability belonging to the disease class, by propagating the weighted probabilistic decision for each voxel to a plurality of nodes using a discriminative model;

(iv) to apply spatial constraints on the probabilistic boosting tree (PBT) classifier to identify the disease class for each voxel; and (v) to identify the disease class corresponding to the biological sample.

(i) To Train a Probabilistic Boosting Tree (PBT) Classifier Step

According to some such embodiments, computing device (g) is further configured (i) to train a probabilistic boosting tree (PBT) classifier to detect presence of disease in each voxel using the plurality of ensemble embeddings.

(ii) To Compute a Weighted Probabilistic Decision for Each Voxel

According to some embodiments, computing device (g) is further configured (ii) to compute a weighted probabilistic decision for each voxel.

(iii) To Compute a Posterior Conditional Probability Belonging to the Disease Class According to some embodiments, computing device (g) is further configured (iii) to compute a posterior conditional probability belonging to the disease class, wherein the computing device is further configured to propagate the weighted probabilistic decision for each voxel to a plurality of nodes using a discriminative model.

(iv) To Apply Spatial Constraints on the Probabilistic Boosting Tree (PBT) Classifier According to some embodiments, computing device (g) is further configured (iv) to apply spatial constraints on the probabilistic boosting tree (PBT) classifier to identify the disease class for each voxel.

A probabilistic boosting tree (PBT) classifier using a probabilistic pairwise Markov random field algorithm, as described by Monaco et al. (Monaco, J. et al., "High-throughput detection of prostate cancer in histologicalsections using probabilistic pairwise Markov models," Medical Image Analysis 14(4), 617 629 (2010)) can be used.

(v) To Identify the Disease Class Corresponding to the Biological Sample

According to some embodiments, computing device (g) is further configured (v) to identify the disease class corresponding to the biological sample.

(h) The Computing Device Configured to Output the Disease Class

According to some embodiments, the system for analyzing multimodal data derived from a biological sample by a multi-protocol analysis using an intelligent supervised embedding (EMPrAvISE) scheme, comprises (h) the computing device configured to output the disease class.

1. Algorithms and Exemplary Method Steps for EMPrAvISE Framework

This example provides algorithms for EMPrAvISE, a multi-parametric data representation and integration framework. EMPrAvISE that makes use of dimensionality reduction and a supervised ensemble of embeddings to (1) accurately capture the maximum available class information from the data, and (2) account for differing dimensionalities and scales in the data. The framework exploits variance among multiple uncorrelated embeddings in a manner similar to ensemble classifier schemes.

2. Preliminary Notation and Definitions

Preliminary notation and definitions are described in Table 1. An object shall be referred to by its label c and is defined as a point in an N-dimensional space $R^N$. It is represented by an N-tuple F(c) comprising its unique N-dimensional co-ordinates. In a sub-space $R^n \subset R^N$ such that n<<N, this object c in a set C is represented by an n-tuple of its unique n-dimensional coordinates X(c). $R^n$ is also known as the embedding of objects and is always calculated via some projection of c∈C and is always calculated via some projection of $R^N$.

TABLE 1

Summary of Preliminary Notation and Definitions:

| | | | |
|---|---|---|---|
| $R^N$ | High-dimensional space | $R^n$ | Embedding space |
| c, d, e | Label of object in set C | R | Number of objects in C |
| F(c) | High-dimensional feature vector | X(c) | Embedding vector |
| $\Lambda^{cd}$ | Pairwise relationship in $R^N$ | $\delta^{cd}$ | Pairwise relationship in $R^n$ |
| $\Delta$(c, d, e) | Triangle relationship | $\phi(R^n)$ | Embedding strength |
| $\hat{R}^n$ | True embedding | $\hat{\delta}^{cd}$ | Pairwise relationship in $\hat{R}^n$ |
| $\check{R}^n$ | Strong embedding | $\tilde{R}^n$ | Weak embedding |
| $\bar{R}^n$ | Ensemble embedding | $\bar{\delta}^{cd}$ | Pairwise relationship in $\bar{R}^n$ |

The notation $\Lambda^{cd}$, henceforth referred to as the pairwise relationship, will represent the relationship between two objects c, d, e∈C with corresponding vectors F(c), F(d)∈$R^N$. Similarly, the notation $\delta^{cd}$ will be used to represent the pairwise relationship between two objects c, d∈C with embedding vectors X(c), X(d)∈$R^n$. It is assumed that this relationship satisfies the three properties of a metric (e.g. Euclidean distance). Finally, a triplet of objects c, d, e∈C is referred to as a unique triplet if c≠d, d≠e, and c≠e. Unique triplets will be denoted simply as (c, d, e).

DEFINITIONS

Definition 1

The function $\Delta$ defined on a unique triplet (c, d, e) is called a triangle relationship, $\Delta$(c, d, e) if when $\Lambda^{cd} < \Lambda^{ce}$ and $\Lambda^{cd} < \Lambda^{de}$, then $\delta^{cd} < \delta_{ce}$ and $\delta^{cd} < \delta^{de}$.

For objects c, d, e∈C whose relative pairwise relationships in $R^N$ are preserved in $R^n$, the triangle relationship $\Delta$(c, d, e)=1. For ease of notation, the triangle relationship $\Delta$(c, d, e) is referred as $\Delta$ for the rest of this application. Note that a set of R unique objects (R=|C|, |.| is cardinality of a set), $$Z = \frac{R!}{3!(R-3)!}$$

unique triples may be formed.

Definition 2

Given Z unique triplets c, d, e∈C and an embedding $R^n$ of all objects c, d, e∈C, the associated embedding strength $$\psi^{ES}(R^n) = \frac{\sum_C \Delta(c, d, e)}{Z}.$$

The embedding strength $\psi^{ES}(R^n)$ embedding strength $\psi^{ES}(R^n)$ is hence the fraction of unique triplets c, d, e∈C for which $\Delta(c, d, e)=1$. A true embedding $\psi^{ES}(\hat{R}^n)$ is referred to herein as $\hat{R}^2$ s one for which $\Delta(c, d, e)=1$, for all unique triplets c, d, e∈C. $\hat{R}^n$ hence perfectly preserves all pairwise relationships (denoted as $\hat{\delta}^{cd}$ for all objects c, d, e∈C) from $R^N$. It is noted that there may be multiple $\hat{R}^n$ that can be calculated from a single $R^N$; one may choose any one of them to calculate $\hat{\delta}^{cd}$.

The most optimal true embedding will be the original $R^N$ itself, i.e., $\hat{\delta}^{cd}=\Lambda^{cd}$ However, as $R^N$ may not be ideal for classification (due to the curse of dimensionality), a true embedding is approximated as best possible in n-D space. Most any $\hat{R}^n$ will be associated with some degree error compared to the original $R^N$. The mean squared error (MSE) is defined in the pairwise relationship between every pair of objects c, d, e∈C in any $R^n$ with respect to the true pairwise relationships in $\hat{R}^n$ as Equation (4) below:

$$\epsilon_X = E_{cd}(\hat{\delta}^{cd} - \delta^{cd})^2 \quad (4)$$

where $E_{cd}$ is the expectation of the squared error in the pairwise relationships in $R^n$, calculated over all pairs of objects c, d, e∈C.

Assuming a uniform distribution, the probability of $\Delta(c, d, e)=1$ can be calculated for any unique triplet c, d, e∈C in any $R^n$ described as Equation (5) as:

$$p(\Delta \mid c, d, e, R^n) = \frac{\sum_C \Delta(c, d, e)}{Z}. \quad (5)$$

Definition 3

A strong embedding, $\ddot{R}^n$ is an $R^n$ for which $\psi^{ES}(R^n) \rangle \theta$.

A strong embedding $\ddot{R}^n$ will accurately preserve the triangle relationship for more than some fraction θ of the unique triplets c, d, e∈C that exist. An embedding $R^n$, which is not a strong embedding is referred to as a weak embedding, denoted as $\ddot{R}^n$. In the described invention, classification accuracy is utilized to approximate embedding strength. It is shown that the embedding strength of any $R^n$ increases monotonically with its classification accuracy (not shown for the sake of brevity). Therefore, strong embedding will have a higher classification accuracy compared to a weak embedding.

Multiple uncorrelated (i.e. independent) embeddings is calculated from a single $R^N$, which may be denoted as $R_m^n$, m∈{1, ..., M}, where M is total number of possible uncorrelated embeddings. It is noted that both strong and weak embeddings will be present among all of the M possible embeddings. All objects c, d, e∈C then can be characterized by corresponding embedding vectors $X_m(c), X_m(d) \in R_m^n$ with corresponding pairwise relationship $\delta_m^{cd}$. Given multiple $\delta_m^{cd}$, a distribution $p(X=\delta_m^{cd})$ can be formed over all M embeddings. It is hypothesized that the maximum likelihood estimate (MLE) of $p(X=\delta_m^{cd})$, denoted as $\tilde{\delta}^{cd}$, will approximate the true pairwise relationship $\hat{\delta}^{cd}$ for objects c, d∈C.

Definition 4

An embedding $R^n$ s called an ensemble embedding, $\tilde{R}^n$, if for all objects c, d∈C, $\hat{\delta}^{cd} = \tilde{\delta}^{cd}$. It is denoted that the ensemble embedding vectors for all objects c∈C by $\tilde{X}(c) \in \tilde{R}^n$. Additionally, from Equation [2] $p(\Delta \mid c, d, e, \tilde{R}^n)$ represents the probability that the triangle relationship $\Delta(c, d, e)$ will be satisfied for $\tilde{R}^n$. Proposition 1 below aims to demonstrate that for $\tilde{R}_n$ to be a strong embedding, it must be constructed from a combination of multiple strong embeddings $\ddot{R}_m^n$.

Proposition 1

Given M identical, independent embeddings $R_m^n$, m∈{1, ..., M}, with a constant $p(\Delta \mid c, d, e, R_m^n)$ that $\Delta(c, d, e)=1$ for all c, d, e∈C, $\lim_{m \to \infty} \psi^{ES}(\tilde{R}^n) \to 1$.

The proof may be derived using the Binomial theorem (omitted for the sake of brevity). Proposition 1 reflects two important, necessary properties of ensemble embedding: (1) that some minimum number of strong embeddings $\ddot{R}^n$ must be considered for $\tilde{R}^n$ to become a strong embedding, (2) the strength of the ensemble embedding $\psi(\tilde{R}^n)$ will increase significantly as more strong embeddings $\ddot{R}^n$ are included in calculating $\tilde{R}^n$.

While Proposition 1 can be demonstrated for the combination of identical strong embeddings, it can be extended further to combining uncorrelated, independent embeddings which are strong (but are not necessarily identical), in a manner similar to classifier ensemble schemes. Proposition 2 aims to show that $\tilde{R}^n$ will have a lower inherent error in its pairwise relationships compared to the uncorrelated, independent strong constituent embeddings $R_k^n$, k∈{1, ..., K}.

Given K observations $\epsilon_k^{cd}$, k∈{1, ..., K}, the pairwise relationship is defined first in $\tilde{R}^n$ as $\tilde{\delta}^{cd} = E_K(\delta_k^{cd})$, where $E_K$ is the expectation of $\delta_k^{cd}$ over K observations. The MSE in $\tilde{\delta}^{cd}$ with respect to the true pairwise relationships in $\hat{R}^n$ can be defined as (similar to Equation 4), described as Equation (6):

$$-\delta_{\tilde{X}} = E_{cd}(\hat{\delta}^{cd} - \tilde{\delta}^{cd})^2 \quad (6)$$

where $E_{cd}$ is the expectation of the squared error in the pairwise relationships in $\tilde{R}^n$ calculated over all pairs of objects c, d∈C.

It is clear that if for all c, d∈C that $\tilde{\delta}^{cd} = \hat{\delta}^{cd}$, then $\tilde{R}^n$ is also a true embedding. From Equation (3), the expected MSE can be calculated over all K embeddings as described in Equation (7):

$$\epsilon_{K,X} = E_K[\epsilon_X] = E_K[E_{cd}(\hat{\delta}^{cd} - \delta_k^{cd})^2] \quad (7)$$

Proposition 2.

Given K uncorrelated, independent strong embeddings, $R_k^n$, k∈{1, ..., K}, $\epsilon_{K,X} \geq \epsilon_X$.

The proof can be demonstrated in a manner similar to that shown in [19], where Breiman showed that this result was true in the context of weak classifiers (omitted for the sake of brevity). Proposition 2 implies that will never have a higher error than the maximum error associated with any individual strong constituent embedding $R_k^n$, k∈{1, ..., K}.

Creating n-Dimensional Data Embeddings

One of the requirements for an ensemble embedding is the calculation of multiple uncorrelated embeddings $R^n$ from the high-dimensional feature space $R^N$. This is also true of ensemble classifiers such as Boosting (Freund, Y. and Schapire, R., "A decision-theoretic generalization of on-line learning and an application to boosting," in [Proc. 2nd European Conf. Computational Learning Theory], 23-37, Springer-Verlag, 1995) and Bagging (Breiman, L., "Bagging predictors," Machine Learning 24(2), 123-140, 1996), which require multiple uncorrelated, weak classifications of the data to be generated prior to combination. Similar to Bagging, a feature space perturbation technique is used to generate uncorrelated embeddings. This is implemented (as shown in the algorithm below) by first creating M bootstrapped feature subsets of V features each from $R^N$ (each subset $F_m$, $m \in \{1, \ldots, M\}$ containing $$\binom{N}{V}$$

features) The feature space associated with each subset $F_m$ then is embedded into an n-D space via Graph Embedding. The rationale for this approach is that the resulting $R_m^n$, $m \in \{1, \ldots, M\}$, obtained in this manner will be independent, uncorrelated embeddings.

Graph Embedding (Shi, J. et al., "Normalized Cuts and Image Segmentation," Pattern Analysis and Machine Intelligence, IEEE Transactions on 22(8), 888-905, 2000) involves eigenvalue decomposition of a confusion matrix $W \in \mathfrak{R}^{|C| \times |C|}$, representing the adjacencies between all objects $c \in C$ in high-dimensional feature space. The result of GE, X(c), is obtained from the maximization of the function $$S(X) = 2\gamma \times tr\left[\frac{X(D-W)X^T}{XDX^T}\right],$$

where tr is the trace operator, $X=[X(c_1), X(c_2), \ldots, X(c_q)]$, $q=|C|$ and $\gamma=q-1$. D is a diagonal matrix where the diagonal element is defined as $$D(i, i) = \sum_j W(i, j).$$

Eigenvectors corresponding to the smallest n Eigenvalues of $(D-W)X=\lambda DX$ are calculated. The matrix X of the first n Eigenvectors is constructed, and $\forall_c \in C$, X(c) is defined as row i of X, such that $X(c)=[e_v(c)|v \in \{1, \ldots, n\}] \in R^n$.

---
Algorithm 2 CreateWeakEmbed
---

Input: F(c) ∈ $R^N$ for all objects c ∈ C, n
Output: $X_m(c) \in R_m^n$, m ∈ {1,..., M}
Data Structures: Feature subsets $F_m$, total number of subsets M, number of features in each subset V begin
  0. for m = 1 to M do
    1.    Select V < N features from $R^N$, forming subset $F_m$;
    2.    Calculate $X_m(c) \in R_m^n$, for all c ∈ C via GE of the feature space associated with each $F_m$;
    3.    endfor
End Selection of Strong Embeddings Following generation of M uncorrelated embeddings, their corresponding embedding strengths $\psi(R_m^n)$, $m \in \{1, \ldots, M\}$. are calculated. Embedding strength was approximated by supervised classification accuracy, denoted as $\psi^{Acc}$. Embeddings for which $\psi^{Acc}(R_m^n) > \theta$ are then selected as strong embeddings, where $\theta$ is a pre-specified threshold.

Constructing the Ensemble Embedding

Given K selected embeddings $R_k^n$, $k \in \{1, \ldots, K\}$, pairwise relationships between all the objects is quantified in each $R_k^n$ via Euclidean pairwise distances. This yields $\delta_k^{cd}$ for all objects $c,d \in C$, $k \in \{1, \ldots, K\}$, stored in a confusion matrix $W_k$ for each $R_k^n$. Corresponding entries across all $W_k$ (after any necessary normalization) are used to estimate $\tilde{\delta}^{cd}$ (via maximum likelihood estimation), and stored in $\tilde{W}$. For implementation, the median is used as the maximum likelihood estimator because (1) the median is less corruptible to outliers, (2) the median and the expectation are interchangeable if one assumes a normal distribution. Multi-dimensional scaling (MDS) (Venna, J. and Kaski, S., "Local multidimensional scaling," Neural Networks 19(6), 889-899, 2006) is applied to construct $\tilde{R}^n$ while preserving the pairwise distances in $\tilde{W}$, for all objects $c \in C$. It is noted that once the ensemble embedding representation $\tilde{R}^n$ has been constructed, a classifier can be constructed to distinguish the different object classes within $\tilde{R}^n$.

---
Algorithm 3 EMPrAvISE:
---

Input: F(c) ∈ $R^N$ for all objects c, n, M, V, θ
Output: X (c) ∈ $\tilde{R}^n$
begin
  0. Construct feature space F(c) ∈ $R^N$, ∀ ∈ C (via feature extraction);
    1. for m = 1 to M do
    2. Calculate $X_m(c)$ = CreateWeakEmbed(F(c)|$F_m$, M, V), ∀c ∈ C, hence yielding $R_M^n$;
    3.    k=0;
    4.    Calculate $\psi^{Acc}(R_m^n)$ (based on classification accuracy);
    5.    if $\psi^{Acc}(R_m^n) > \theta$
    6.       k++;
    7.       $W_K(i,j) = \|X_m(c) - X_m(d)\|_2$ $\forall_{c,d}$ with indices i, j;
    8.    endif
    9. endfor
    10. $\tilde{W}(i,j) = MEDIAN_k[W_k(i,j)]\forall_{c,d}$;
    11. Apply MDS to $\tilde{W}$ to obtain $\tilde{R}^n$;
    12. Train a classifier on $\tilde{X}(c) \in \tilde{R}^n$, $\forall c \in C$ to distinguish object-class categories;
end.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

Each of the publications discussed herein, the contents of which are incorporated herein by reference in their entirety, are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/ or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as a in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter is described with reference to block diagrams and operational illustrations of methods and devices to provide a system and methods according to the disclosed subject matter. It is understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, which executed by the computing device, e.g., on a processor within the computing device or other data processing apparatus, such that, when so executed, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented therein. Alternative embodiments are contemplated in which the order of the various functions, functionalities and operations may be altered and in which sub-operations described as being part of a larger operation may be performed independently or performed differently than illustrated or not performed at all.

Although some of the drawings illustrate a number of operations in a particular order, functions, functionalities and/or operations which are not now known to be order dependent or become understood to not be order dependent may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

I. Ensemble Embedding

1. Synthetic MNI Brain Data

Synthetic brain data (Kwan R et al, IEEE Transactions on Medical Imaging 18(11):1085-1097, 1999) was acquired from BrainWeb1, consisting of simulated proton density (PD) MRI brain volumes at various noise and bias field inhomogeneity levels. Gaussian noise artifacts have been added to each pixel in the image, while inhomogeneity artifacts were added via pixel-wise multiplication of the image with an intensity non-uniformity field. Corresponding labels for each of the separate regions within the brain, including white matter (WM) and grey matter (GM), were also available. Images comprising WM and GM alone were obtained from 10 sample slices (ignoring other brain tissue classes). The objective was to successfully partition GM and WM regions on these images across all 18 combinations of noise and inhomogeneity, via pixel-level classification (an application similar to FIG. 1). Classification is done for all pixels c∈C based on each of, (i) the high-dimensional feature space, $F(c) \in \mathbb{R}^N$, N=14,
(ii) simple GE on F(c), denoted $X_{GE}(c) \in \mathbb{R}^n$, n=3,
(iii) multi-dimensional scaling (MDS) on distances calculated directly in $\mathbb{R}^N$, denoted as $X_{MDS}(c) \in \mathbb{R}^n$, n=3 (alternative to ensemble embedding, explained in Section 2),
(iv) ensemble embedding, denoted $\tilde{X}_{GE}(c) \in \hat{\mathbb{R}}^n$, n=3

The final slice classification results obtained for each of these spaces are denoted as $\Psi(F)$, $\Psi(X_{GE})$, $\Psi(X_{MDS})$, $\Psi(\tilde{X}_{GE})$, respectively.

2. Comparison of ML Estimators in Ensemble Embedding

For the synthetic brain data (Kwan R et al, IEEE Transactions on Medical Imaging 18(10:1085-1097, 1999), over all 18 combinations of noise and inhomogeneity and over all 10 images, the use of mean and median was compared as ML estimators in CalcConsEmbed. This is done by preserving outputs from SelEmbed and only changing the ML estimator in the CalcEnsembleEmbed. Classification accuracies for detection of white matter were compared in each of the resulting ensemble embedding representations, $\tilde{X}_{GE}^{Med}$ and $\tilde{X}_{GE}^{Mean}$ (superscript denotes choice of ML estimator).

3. Clinical Prostate Magnetic Resonance Imaging (MRI) Data

Two different prostates were imaged ex vivo using a 4 Tesla MRI scanner following surgical resection. The excised glands were then sectioned into 2D histological slices, which were digitized using a whole slide scanner. Regions of cancer were determined via Haemotoxylin and Eosin (H&E) staining of the histology sections. The cancer areas were then mapped onto corresponding MRI sections via a deformable registration scheme (Chappelow J et al., Med Phys 38(4):2005-2018, 2011). Additional details of data acquisition are described in Madabhushi, A. et al. (IEEE Transactions on Medical Imaging 24(12):1611-1625, 2005).

For this experiment, a total of 16 4 Tesla ex vivo T2-weighted MRI and corresponding digitized histology images were considered. The purpose of this experiment was to accurately identify cancerous regions on prostate MRI data via pixel-level classification, based on exploiting textural differences between diseased and normal regions on T2-weighted MRI (Madabhushi, A. et al., IEEE Transactions on Medical Imaging 24(12):1611-1625, 2005). For each MRI image, Membeddings, $\mathbb{R}_m^n$, m∈{1,...,M}, were computed (via CreateEmbed) along with their corresponding embedding strengths $\psi(\mathbb{R}_m^n)$ (described in Section 2). A cross-validation framework was then implemented for constructing the ensemble embedding by modifying the method of selection for strong embeddings (SelEmbed) as follows, (a) Training ($S^{tr}$) and testing ($S^{te}$) sets of the data (MRI images) were created.
(b) For each element (image) of $S^{tr}$, strong embeddings were identified based on $\theta=0.15 \times \max_M[\psi(\mathbb{R}_m^n)]$
(c) Those embeddings voted as being strong across all the elements (images) in Str were then identified and selected.
(d) For the data (images) in $S^{te}$, corresponding embeddings were then combined (via CalcEnsembleEmbed) to yield the final ensemble embedding result.

A leave-one-out cross-validation strategy was employed in this experiment. A comparison is made between the pixel-level classifications for (1) simple GE denoted as $\Psi(X_{GE})$, and (2) consensus GE denoted as $\Psi(\tilde{X}_{GE})$ 4. Gene-Expression Data Four publicly available binary class gene-expression datasets were obtained (Jolli.e I: Principal Component Analysis. Springer, 2002) with corresponding class labels for each sample (Lee, G. et al., IEEE/ACM Transactions on Computational Biology and Bioinformatics, 5(3):1-17, 2008); the purpose of the experiment being to differentiate the two classes in each dataset. This data comprises the gene-expression vectorial data profiles of normal and cancerous samples for each disease listed in Table 2, where the total number of samples range from 72 to 181 patients and the number of corresponding features range from 7130 to 24,481 genes or peptides. All 4 data sets comprise distinct independent training ($S^{tr}$) and testing ($S^{te}$) subsets, as acquired originally.

Prior to analysis, each dataset was first pruned to the 300 most class-informative features based on t-statistics as described in Liu H et al. (Genome Informatics, 13:51-60, 2002). The methodology to construct the ensemble embedding using independent training and testing sets was as follows, (a) First, CreateEmbed is run concurrently on data in $S^{tr}$ and $S^{te}$, such that the same subsets of features are utilized when generating base embeddings for each of $S^{tr}$ and $S^{te}$.
(b) SelEmbed is executed then on base embeddings generated from $S^{tr}$ alone, thus selecting strong embeddings from amongst those generated. Strong embeddings were defined based on $\theta=0.15 \times \max_M[\psi(\mathbb{R}_m^n)]$.
(c) Corresponding (selected) embeddings for data in $S^{te}$ then are combined within CalcEnsembleEmbed to obtain the final ensemble embedding vectors denoted as $$\tilde{X}_\Phi(c) \in \hat{\mathbb{R}}^n, \Phi \in \{GE, PCA\}, n=4.$$

For this dataset, both supervised (via classification accuracy, superscript S) and unsupervised (via RSI, superscript US) measures of embedding strength were evaluated in terms of the classification accuracy of the corresponding ensemble embedding representations. In lieu of comparative DR strategies, a semi-supervised variant of GE (termed SSAGE) (Zhao H, Neurocomputing, 69(16-18):2385 2389, 2006) was implemented, which utilizes label information when constructing the embedding. Within this scheme, higher weights are given to within-class points and lower weights to points from different classes. When running SSAGE, both $S^{tr}$ and $S^{te}$ were combined into a single cohort of data, and labels corresponding to $S^{tr}$ alone were revealed to the SSAGE algorithm.

An additional comparison was conducted against a supervised random forest-based kNN classifier operating in the original feature space to determine whether DR provided any advantages in the context of high-dimensional biomedical data. This was implemented by training a kNN classifier on each of the feature subsets for $S^{tr}$ (that were utilized in CreateEmbed), but without performing DR on the data.

Each kNN classifier then was used to classify corresponding data in $S^{te}$. The final classification result for each sample in $S^{te}$ is based on ensemble averaging to calculate a probability of a sample belonging to the target class. Classifications compared in this experiment were $\Psi(F)$, $\Psi(X_{SSGE})$, $\Psi(\tilde{X}_{GE}^S)$, $\Psi(\tilde{X}_{PCA}^S)$, $\Psi(\tilde{X}_{GE}^{US})$, $\Psi(\tilde{X}_{PCA}^{US})$, respectively.

5. Classification

For image data (brain, prostate MRI), classification was done via replicated k-means clustering (Fred A and Jain A, IEEE Transactions on Pattern Analysis and Machine Intelligence 27(6):835-850, 2005), while for gene-expression data, classification was done via hierarchical clustering (Eisen M et al, Proceedings of the National Academy of Sciences of the United States of America, 95(25):14863-14868, 1998)

The choice of clustering algorithm was made based on the type of data being considered in each of the different experiments, as well as previous work in the field. Note that both these clustering techniques do not consider class label information while classifying the data, and have been demonstrated as being deterministic in nature (hence ensuring reproducible results). The motivation in using such techniques for classification was to ensure that no classifier bias or fitting optimization was introduced during evaluation. As the intent of the described invention was to examine improvements in class separation offered by the different data representations, all improvements in corresponding classification accuracies can be attributed directly to improved class discriminability in the corresponding space being evaluated (without being dependent on optimizing the technique used for classification).

6. Evaluating and Visualizing Results

To visualize classification results as region partitions on the images (brain, prostate MRI), all the pixels were plotted back onto the image and assigned colors based on their classification label membership. Similar to the partitioning results shown in FIG. 1, pixels of the same color were considered to form specific regions. For example, in FIG. 1(h), pixels colored green were considered to form the foreground region, while pixels colored red were considered to form the background.

Classification accuracy of clustering results for images as well as gene-expression data can be evaluated quantitatively as described previously (Section 2). Image region partitioning results as well as corresponding classification accuracies of the different methods (GE, PCA, ensemble embedding) were used to determine what improvements are offered by ensemble embedding.

Example 1

Synthetic Montreal Neurological Institute (MINI) Brain Data

Figure 2:
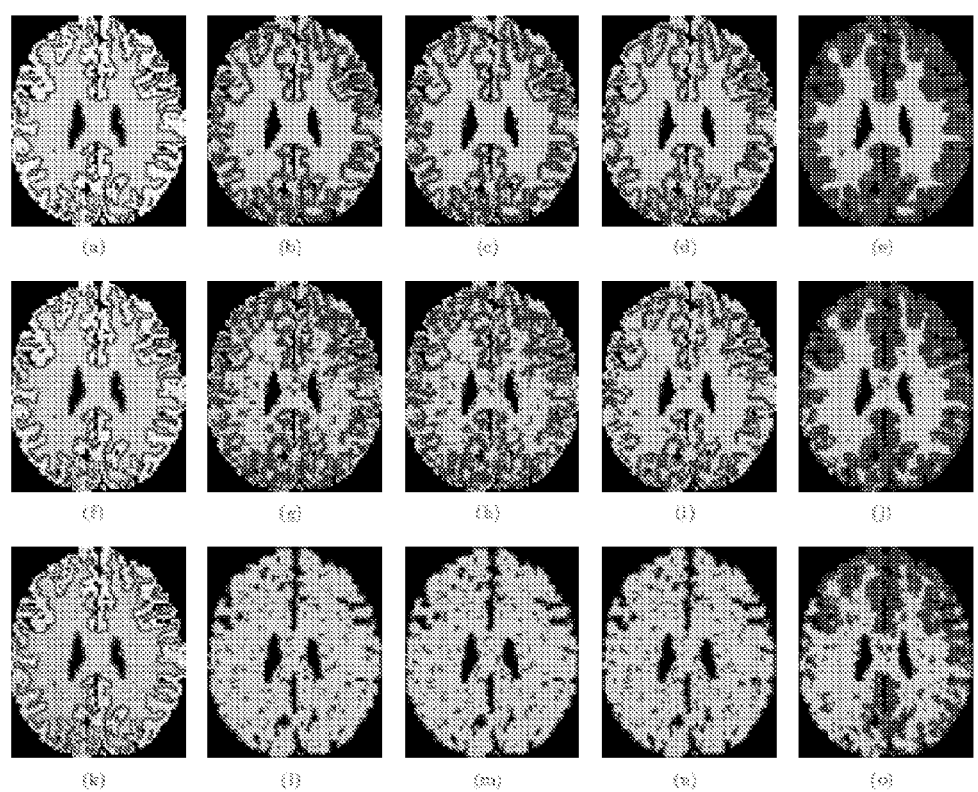
FIG. 2 shows qualitative pixel-level white matter (WM) detection results on Montreal Neurological Institute (MNI) brain data for comparisons to be made across 3 different noise and inhomogeneity combinations (out of 18 possible combinations).

FIG. 2 shows qualitative pixel-level white matter (WM) detection results on MNI brain data for comparisons to be made across 3 different noise and inhomogeneity combinations (out of 18 possible combinations). The original PD MRI image for selected combinations of noise and inhomogeneity with the ground truth for WM superposed as a red contour is shown in FIGS. 2(a), (f), (k). Note that this is a 2 class problem, and grey matter (GM) and white matter (WM) region partitions are visualized together in all the result images, as presented previously. Other brain tissue classes were ignored. Comparing the different methods used, when only noise (1%) is added to the data, all three of $\Psi(F)$(FIG. 2(b)), $\Psi(X_{MDS})$(FIG. 2(c)), $\Psi(X_{GE})$(FIG. 2(d)) are only able to identify the outer boundary of the WM region. However, $\Psi(\tilde{X}_{GE})$(FIG. 2(e)) shows more accurate detail of the WM region in the image (compared to the ground truth WM region outlined in red in FIG. 2(a)). When RF inhomogeneity (20%) is added to the data for intermediate levels of noise (3%), note the poor WM detection results for $\Psi(F)$ (FIG. 2(g)), $\Psi(X_{MDS})$ (FIG. 2(h)), and $\Psi(X_{GE})$ (FIG. 2(i)), $\Psi(\hat{X}_{GE})$(FIG. 2(j)), however, yields a more accurate WM detection result (compared to the ground truth WM region in FIG. 2(f)). Increasing the levels of noise (7%) and inhomogeneity (40%) results in further degradation of WM detection performance for $\Psi(F)$ (FIG. 2(l)), $\Psi(X_{MDS})$(FIG. 2(m)), and $\Psi(X_{GE})$ (FIG. 2(n)). Note from FIG. 2(o) that $\Psi(\tilde{X}_{GE})$ appears to fare far better than $\Psi(F)$, $\Psi(X_{MDS})$, and $\Psi(X_{GE})$.

For each of the 18 combinations of noise and inhomogeneity, the WM detection accuracies $\phi^{Acc}(F)$, $\phi^{Acc}(X_{MDS})$, $\phi^{Acc}(X_{GE})$, $\phi^{Acc}(\tilde{X}_{GE})$(calculated as described in Section 2) are averaged over all 10 images considered (a total of 180 experiments). These results are summarized in Table 3 (corresponding trend visualization in FIG. 3) with accompanying standard deviations in accuracy. Note that $\phi^{Acc}(\tilde{X}_{GE})$ shows a consistently better performance than the remaining methods ($\phi^{Acc}(F)$, $\phi^{Acc}(X_{MDS})$, $\phi^{Acc}(X_{GE})$) in 17 out of 18 combinations of noise and inhomogeneity. This trend is also visible in FIG. 3.

TABLE 3

White matter (WM) detection results for synthetic Brain Web data

| Noise | Inhomogeneity | $\phi^{ACC}(F)$ | $\phi^{ACC}(X_{MDS})$ | $\phi^{ACC}(X_{GE})$ | $\phi^{ACC}(\tilde{X}_{GE})$ |
|---|---|---|---|---|---|
| 0% | 0% | 65.55 ± 1.84 | 65.55 ± 1.84 | 65.55 ± 1.84 | 66.8 ± 2.89 |
|  | 20% | 55.75 ± 1.65 | 55.75 ± 1.65 | 55.75 ± 1.65 | 61.65 ± 4.58 |
|  | 40% | 70.03 ± 2.79 | 70.08 ± 2.82 | 51.84 ± 0.99 | 64.28 ± 5.93 |
| 1% | 0% | 59.78 ± 1.31 | 59.74 ± 1.29 | 74.71 ± 9.06 | 80.62 ± 1.03 |
|  | 20% | 59.36 ± 1.30 | 59.32 ± 1.33 | 60.95 ± 8.67 | 73.07 ± 8.97 |
|  | 40% | 59.20 ± 1.12 | 59.12 ± 1.15 | 56.38 ± 1.53 | 66.46 ± 9.80 |
| 3% | 0% | 53.35 ± 1.31 | 53.39 ± 1.27 | 59.94 ± 7.00 | 85.38 ± 0.75 |
|  | 20% | 55.01 ± 2.92 | 54.91 ± 3.11 | 63.88 ± 10.85 | 84.61 ± 0.81 |
|  | 40% | 57.63 ± 1.78 | 57.71 ± 1.67 | 57.33 ± 1.38 | 79.19 ± 7.56 |

TABLE 3-continued

White matter (WM) detection results for synthetic Brain Web data

| Noise | Inhomogeneity | $\phi^{ACC}(F)$ | $\phi^{ACC}(X_{MDS})$ | $\phi^{ACC}(X_{GE})$ | $\phi^{ACC}(\tilde{X}_{GE})$ |
|---|---|---|---|---|---|
| 5% | 0% | 62.90 ± 0.72 | 62.84 ± 0.66 | 66.67 ± 10.22 | 89.68 ± 1.36 |
| | 20% | 61.49 ± 1.38 | 61.49 ± 1.42 | 82.61 ± 7.39 | 86.81 ± 1.38 |
| | 40% | 61.02 ± 0.99 | 61.03 ± 1.09 | 74.91 ± 9.09 | 81.67 ± 1.51 |
| 7% | 0% | 64.28 ± 0.71 | 64.26 ± 0.76 | 66.95 ± 6.25 | 87.81 ± 0.73 |
| | 20% | 64.07 ± 1.03 | 64.01 ± 0.96 | 74.22 ± 10.59 | 86.07 ± 1.05 |
| | 40% | 64.05 ± 1.19 | 64.04 ± 1.14 | 64.44 ± 1.25 | 81.53 ± 1.57 |
| 9% | 0% | 64.96 ± 0.90 | 64.94 ± 0.88 | 66.36 ± 1.66 | 75.51 ± 14.35 |
| | 20% | 64.85 ± 0.97 | 64.79 ± 0.95 | 65.68 ± 1.32 | 78.18 ± 9.86 |
| | 40% | 64.65 ± 0.83 | 64.63 ± 0.84 | 65.30 ± 0.74 | 77.83 ± 5.00 |

For each combination of noise and inhomogeneity, a paired Students' t-test was conducted between, $\phi^{Acc}(\tilde{X}_{GE})$ and each of $\phi^{Acc}(F)$, $\phi^{Acc}(X_{MDS})$, and $\phi^{Acc}(X_{GE})$ with the null hypothesis being that there was no improvement via $\Psi/(\tilde{X}_{GE})$ over all 10 brain images considered. $\Psi(\tilde{X}_{GE})$ was found to perform significantly better (p 0.05) than all of $\Psi(F)$, $\Psi(X_{MDS})$ and $\Psi(X_{GE})$ in 16 out of 18 combinations of noise and inhomogeneity.

Figure 3:
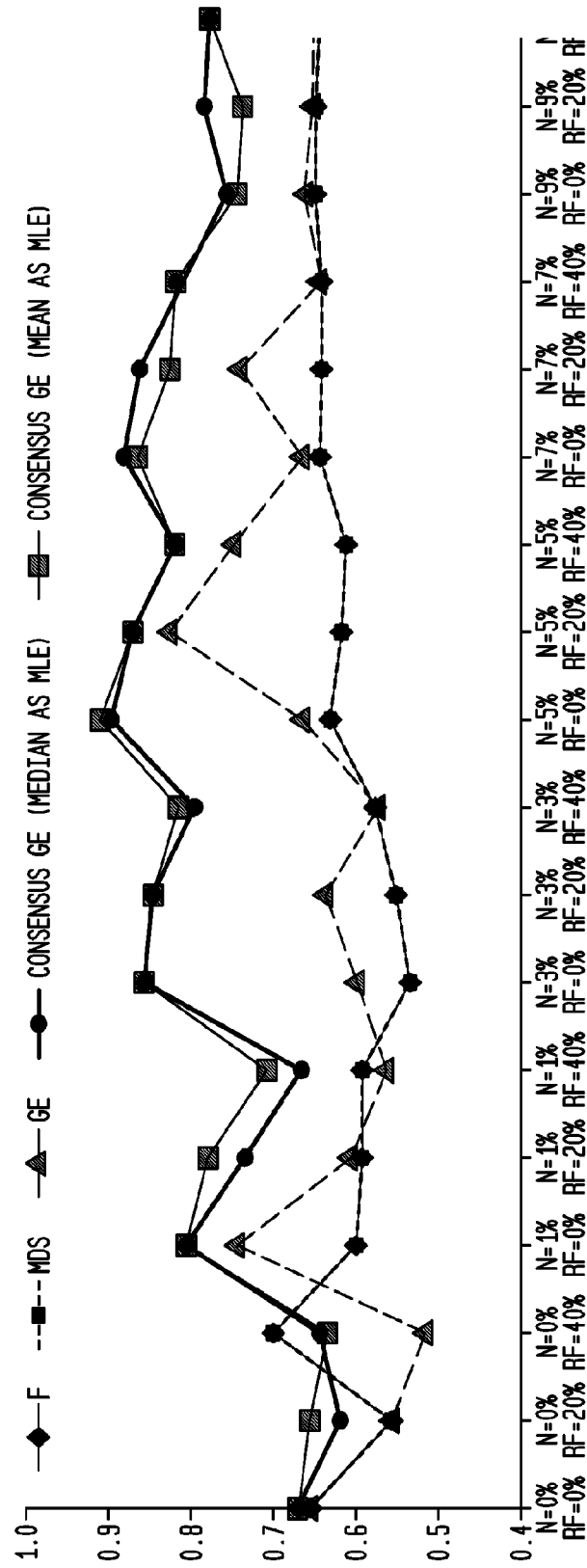
FIG. 3 shows the trend of averaged white matter (WM) detection accuracies with accompanying standard deviations in accuracy.

Comparing $\phi^{Acc}(F)$, $\phi^{Acc}(X_{MDS})$, $\phi^{Acc}(X_{GE})$, it can be observed that $\Psi(F)$ and $\Psi(X_{MDS})$ perform similarly for all combinations of noise and inhomogeneity (note that the corresponding red and blue trend-lines completely overlap in FIG. 3). In contrast, $\Psi(X_{GE})$ shows improved performance at every combination of noise and inhomogeneity as compared to either of $\Psi(F)$, $\Psi(X_{MDS})$. $\Psi(\tilde{X}_{GE})$ was seen to significantly improve over all of $\Psi(F)$, $\Psi(X_{MDS})$ and $\Psi(X_{GE})$, reflecting the advantages of ensemble embedding.

Example 2

Comparison of ML Estimators

White matter (WM) pixel-level detection accuracy results for ensemble embedding using two different ML estimators (median and mean) were averaged over all 10 MNI brain images considered and summarized in Table 4, for each of the 18 combinations of noise and inhomogeneity (total of 180 experiments). The accuracy values were generally consistent across all the experiments conducted. No statistically significant difference in classifier performance was observed when using $\Psi(\tilde{X}_{GE}^{Med})$ and $\Psi(\tilde{X}_{GE}^{Mean})$. It would appear that $\Psi(\tilde{X}_{GE}^{Mean})$ is less susceptible to higher noise and bias field levels compared to $\Psi(\tilde{X}_{GE}^{Mean})$ (trends in FIG. 3).

TABLE 4

Comparing the mean and median as ML estimators within CalcConsEmbed.

| Noise | Inhomogeneity | $\phi^{ACC}(\tilde{X}_{GE}^{MED})$ | $\phi^{ACC}(\tilde{X}_{GE}^{Mean})$ |
|---|---|---|---|
| 0% | 0% | 66.86 ± 2.89 | 66.89 ± 2.91 |
| | 20% | 61.65 ± 4.58 | 65.34 ± 4.12 |
| | 40% | 64.28 ± 5.93 | 63.39 ± 6.51 |
| 1% | 0% | 80.62 ± 1.03 | 80.45 ± 1.07 |
| | 20% | 73.07 ± 8.97 | 77.81 ± 0.96 |
| | 40% | 66.46 ± 9.80 | 70.56 ± 7.15 |
| 3% | 0% | 85.38 ± 0.75 | 85.53 ± 0.84 |
| | 20% | 84.61 ± 0.81 | 84.49 ± 0.76 |
| | 40% | 79.19 ± 7.56 | 81.37 ± 1.39 |
| 5% | 0% | 89.68 ± 1.36 | 90.85 ± 1.32 |
| | 20% | 86.81 ± 1.38 | 87.01 ± 1.83 |
| | 40% | 81.67 ± 1.51 | 81.82 ± 1.32 |
| 7% | 0% | 87.81 ± 0.73 | 86.17 ± 6.11 |
| | 20% | 86.07 ± 1.05 | 82.73 ± 8.23 |
| | 40% | 81.53 ± 1.57 | 81.72 ± 1.47 |
| 9% | 0% | 75.51 ± 14.35 | 74.32 ± 16.11 |
| | 20% | 78.18 ± 9.86 | 73.63 ± 12.75 |
| | 40% | 78.18 ± 9.86 | 73.63 ± 12.75 |

Example 3

Clinical Prostate Mill Data

Figure 4:
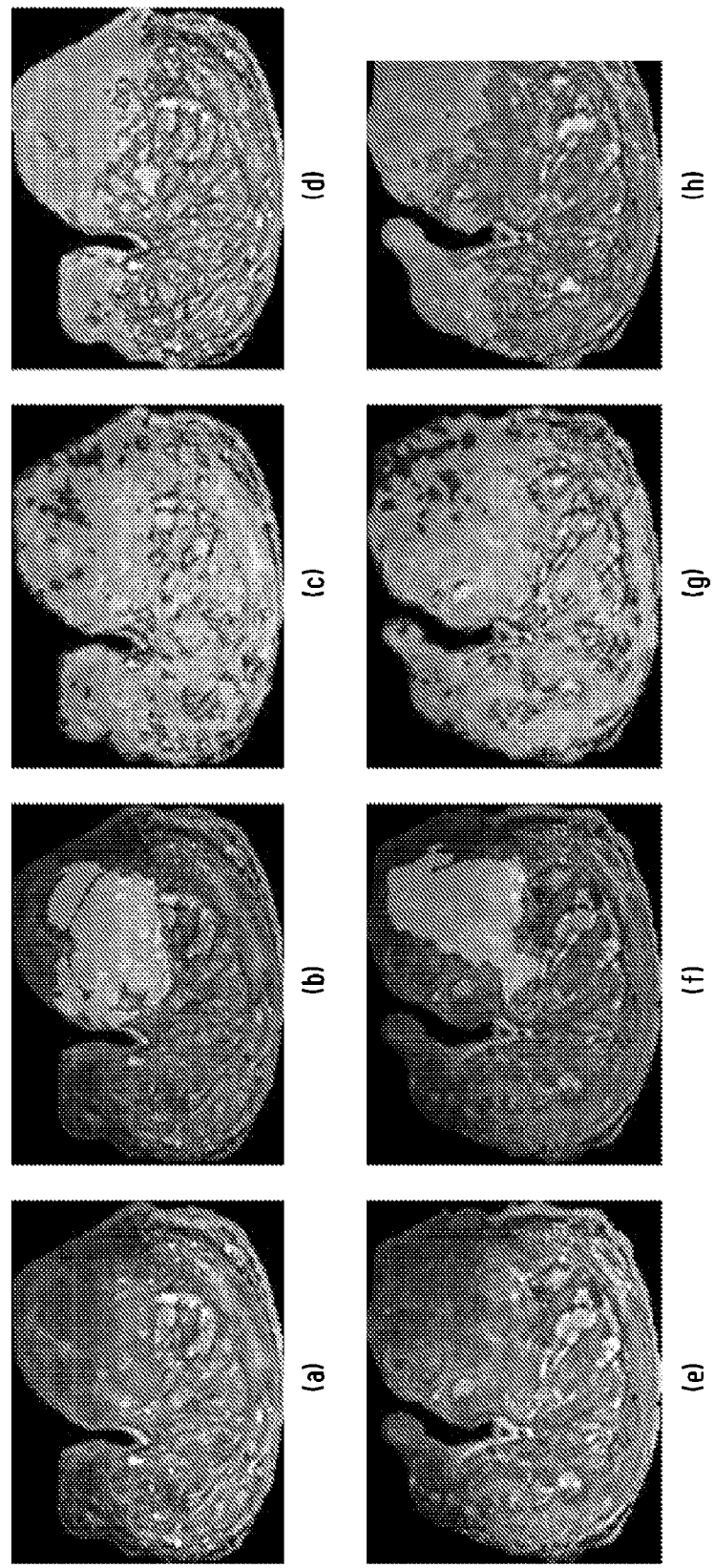
FIG. 4 shows qualitative results of the EnsembleEmbedMS algorithm in detecting prostate cancer (CaP) on T2-weighted magnetic resonance imaging (MRI), each row corresponding to a different 2D MRI image.
Figure 5:
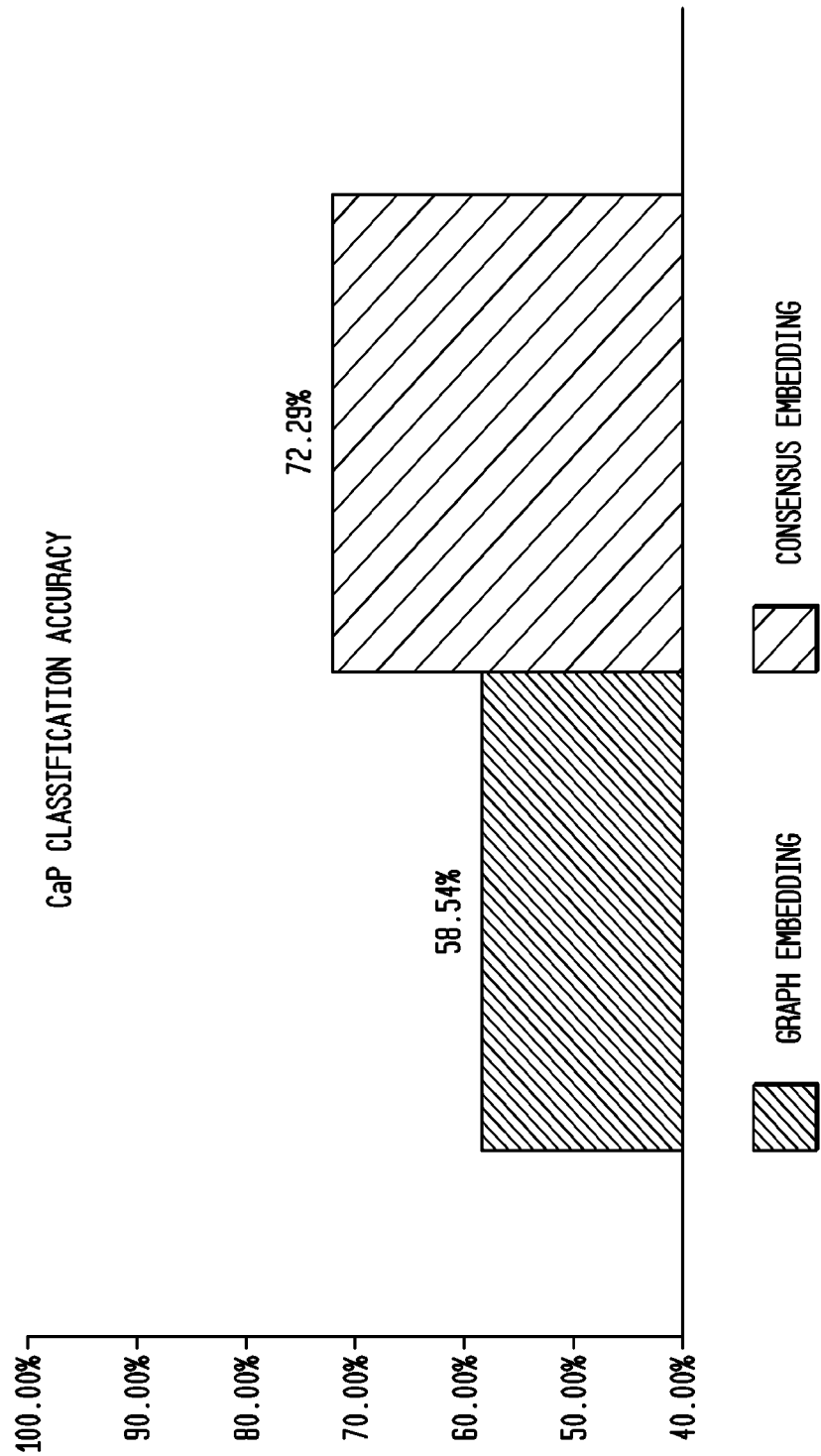
FIG. 5 shows the relative pixel-level prostate cancer detection accuracies averaged across 16 MRI slices for the two methods compared.

FIG. 4 shows qualitative results of the ConsEmbedMS algorithm in detecting prostate cancer (CaP) on T2-weighted MRI, each row corresponding to a different 2D MRI image. Comparing the pixel-level CaP detection results (visualized in light grey) in FIGS. 4(c) and 4(g) to the CaP masks (light grey) in FIGS. 4(b) and 4(f), obtained by registering the MRI images with corresponding histology images (Chappelow J et al., Med Phys, 38(4):2005-2018, 2011) (not shown), reveals that $\Psi(X_{GE})$ results in a large false positive error. In contrast, $\Psi(\tilde{X}_{GE})$ (FIGS. 4(d) and 4(h)) appears to better identify the CaP region when compared to the ground truth for CaP extent in FIGS. 4(b) and 4(f). FIG. 5 illustrates the relative pixel-level prostate cancer detection accuracies averaged across 16 MRI slices for the 2 methods compared. $\Psi(\tilde{X}_{GE})$ was found to significantly (p 0.05) outperform $\Psi(X_{GE})$ in terms of accuracy and specificity of CaP segmentation over all 16 slices considered.

Example 4

Classification of Gene-Expression Data

Table 5 summarizes classification accuracies for each of the strategies compared: supervised consensus-GE and consensus-PCA (..$(\tilde{X}_{PCA}^S)$, $\Psi(\tilde{X}_{GE}^S)$, respectively), unsupervised consensus-GE and consensus-PCA ($\Psi(\tilde{X}_{PCA}^{US})$, $\Psi(\tilde{X}_{GE}^{US})$, respectively), SSAGE ($\Psi(X_{SSGE})$, as well as supervised classification of the original feature space ($\Psi(F)$). These results suggest that ensemble embedding yields a superior classification accuracy compared to alternative strategies. It is speculated that this improved performance is due to the more accurate representation of the data obtained via ensemble embedding.

TABLE 5

Classification accuracies for different representation strategies for gene-expression data

| Dataset | $\phi^{Acc}(F)$ | $\phi^{Acc}(X_{SSGE})$ | $\phi^{Acc}(\tilde{X}_{PCA}^{S})$ | $\phi^{Acc}(\tilde{X}_{PCA}^{US})$ | $\phi^{Acc}(\tilde{X}_{GE}^{S})$ | $\phi^{Acc}(\tilde{X}_{GE}^{US})$ |
|---|---|---|---|---|---|---|
| Prostate Tumor | 73.53 | 73.53 | 97.06 | 1.0 | 1.00 | 76.47 |
| Breast Cancer Relapse | 68.42 | 63.16 | 63.16 | 57.89 | 63.16 | 57.89 |
| Lung Cancer | 89.93 | 10.07 | 99.33 | 96.64 | 98.66 | 1.00 |
| Lymphoma | 58.82 | 61.76 | 97.06 | 76.47 | 97.06 | 67.65 |

Classification accuracies for testing cohorts of 4 different binary class gene-expression datasets, comparing (1) supervised random forest classification of original feature space (F), (2) unsupervised hierarchical clustering of semi-supervised DR space ($X_{SSGE}$), and (3) unsupervised hierarchical clustering of consensus embedding space ($\tilde{X}_{GE}$, $\tilde{X}_{PCA}$)

The presence of a large noisy, high-dimensional space was seen to adversely affect supervised classification performance of F, which yielded a worse classification accuracy than unsupervised classification (of consensus-GE and consensus-PCA) in 3 out of the 4 datasets. Moreover, semi-supervised DR, which utilized label information to construct XSSGE, was also seen to perform worse than ensemble embedding (both supervised and unsupervised variants). Further, comparing the performance of supervised ($\Psi(\tilde{X}_{PCA}^{S})$, $\Psi(\tilde{X}_{GE}^{S})$) and unsupervised ($\Psi(\tilde{X}_{PCA}^{US})$, $\Psi(\tilde{X}_{GE}^{US})$) variants of ensemble embedding demonstrated comparable performance between them, though a supervised measure of embedding strength shows a trend towards being more consistent. The relatively high performance of $\Psi(\tilde{X}_{PCA}^{US})$, $\Psi(\tilde{X}_{GE}^{US})$ shows the feasibility of a completely unsupervised framework for ensemble embedding.

For both consensus PCA and consensus GE, the parameter sensitivity of the scheme was tested by varying the number of feature subsets generated (M∈{200, 500, 1000} in the CreateEmbed algorithm (Tables 6 &7). The relatively low variance in classification accuracy as a function of M reflects the invariance to parameters of ensemble embedding. No consistent trend was seen in terms of either of consensus-GE or consensus-PCA outperforming the other.

TABLE 6

Variation in classification accu consensus-PCA on gene-expression data
Variation in classification accuracy as a function of parameters for consensus- PCA on gene-expression data

| | $\phi^{Acc}(\tilde{X}_{PCA}^{S})$ | | | $\phi^{Acc}(\tilde{X}_{PCA}^{US})$ | | |
|---|---|---|---|---|---|---|
| Dataset | M = 200 | M = 500 | M = 1000 | M = 200 | M = 500 | M = 1000 |
| Prostate Tumor | 97.06 | 97.06 | 97.06 | 100 | 100 | 100 |
| Breast Cancer Relapse | 57.89 | 63.16 | 57.89 | 57.89 | 57.89 | 52.63 |
| Lung Cancer | 99.33 | 99.33 | 99.33 | 96.64 | 95.97 | 96.64 |
| Lymphoma | 94.12 | 97.06 | 97.06 | 76.47 | 67.65 | 61.76 |

Classification accuracies for testing cohorts of 4 different binary class gene-expression datasets for $\tilde{X}_{PCS}^{S}$ and $\tilde{X}_{PCA}^{US}$, while varying the number of subsets M generated within CreateEmbed.

TABLE 7

Variation in classification accuracy as a function of parameters for consensus-GE on gene-expression data.

| | $\phi^{Acc}(\tilde{X}_{GE}^{S})$ | | | $\phi^{Acc}(\tilde{X}_{GE}^{US})$ | | |
|---|---|---|---|---|---|---|
| Dataset | M = 200 | M = 500 | M = 1000 | M = 200 | M = 500 | M = 1000 |
| Prostate Tumor | 100 | 100 | 97.06 | 76.47 | 76.47 | 76.47 |
| Breast Cancer Relapse | 57.89 | 57.89 | 57.89 | 57.89 | 57.89 | 57.89 |
| Lung Cancer | 98.66 | 98.66 | 97.99 | 100 | 100 | 90.60 |
| Lymphoma | 61.76 | 97.06 | 55.88 | 67.65 | 67.65 | 67.65 |

Classification accuracies fro testing cohorts of 4 different binary class gene-expression datasets for $\phi^{Acc}(\tilde{X}_{GE}^{S})$ and ($\tilde{X}_{GE}^{US}$), while varying the number of subsets M generated within CreateEmbed.

Figure 6:
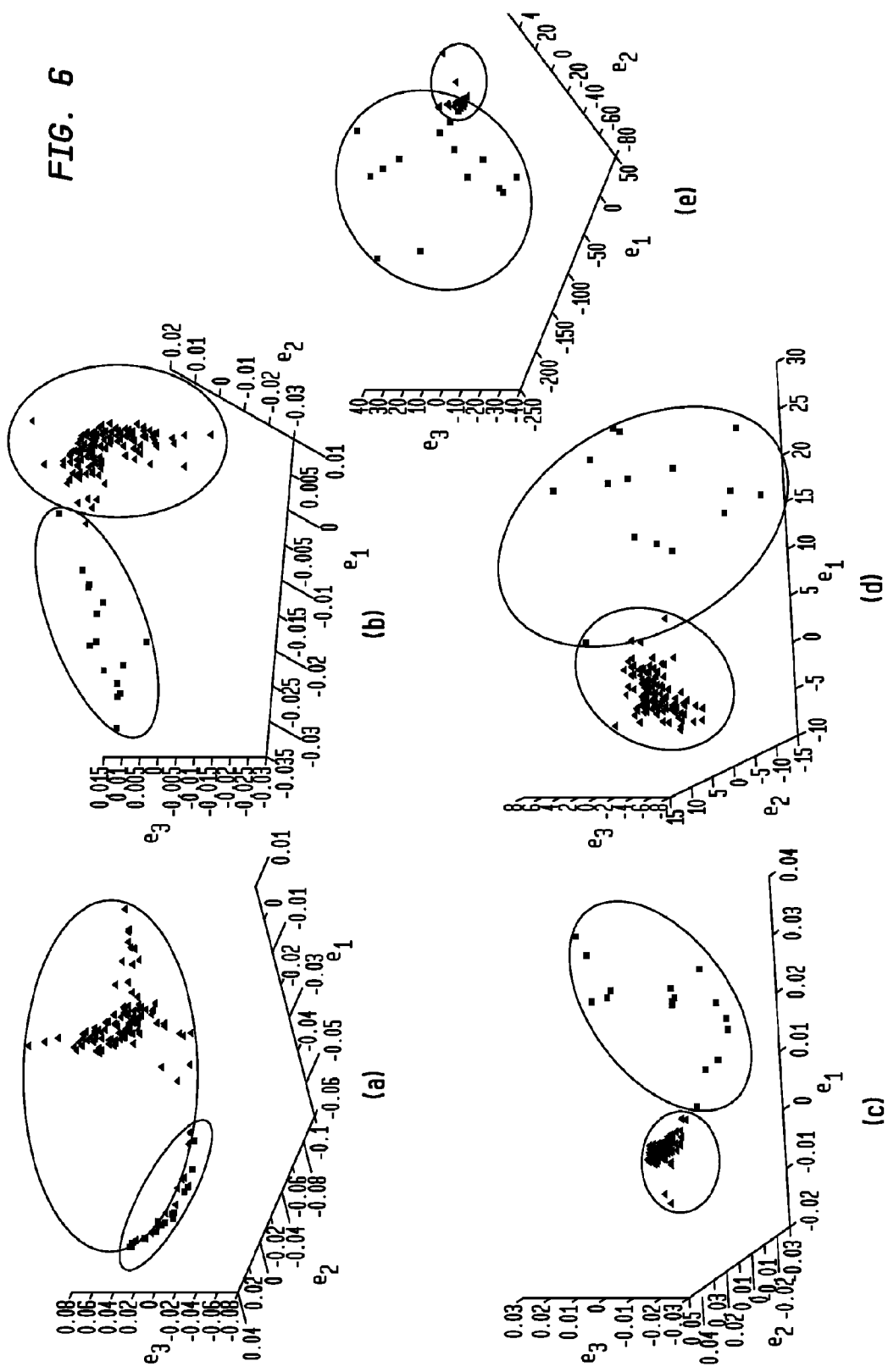
FIG. 6 shows 3D visualization of the embedding results obtained by plotting all the samples in the lung cancer gene-expression dataset in 3D Eigen space. Note that the ensemble embedding Dimensionality Reduction (DR) method (FIGS. 6(b)-(d)) shows significantly better separation between the classes with more distinct, tighter clusters as well as fewer false positives when compared to a semi-supervised variant of GE (SSAGE) (semi-supervised DR, FIG. 6(a)).
Figure 7:
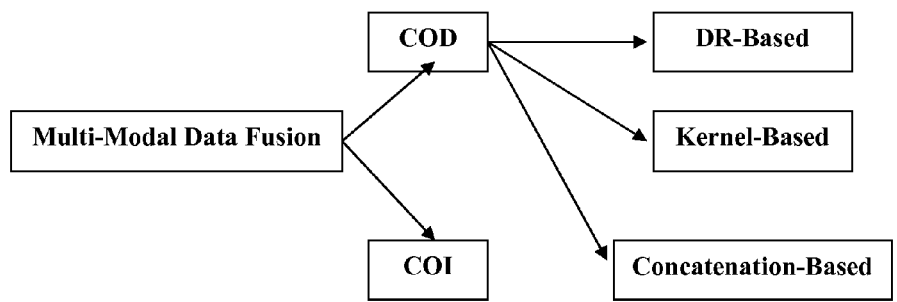
FIG. 7 shows a summary of multi-modal data fusion approaches.

3D visualization of the embedding results is shown in FIG. 6, obtained by plotting all the samples in the lung cancer gene-expression dataset in 3D Eigen space. Note that consensus DR (FIGS. 6(b)-(d)) shows significantly better separation between the classes with more distinct, tighter clusters as well as fewer false positives compared to SSAGE (semi-supervised dimensionality reduction (DR), FIG. 6(a)).

II. Ehanced Multi-Protocol Analysis via Intelligent Supervised Embedding (EMPrAvISE)

Example 1

Prostate Cancer Detection Using Multi-Parametric MRI

This Example provides application of EMPrAvISE to the detection of prostate cancer on 3 Tesla in vivo multi-parametric (T2w, DCE, DWI) MRI. The low-dimensional data representation via EMPrAvISE is found to be superior for classification as compared to (1) the individual protocols, and (2) concatenation of multi-parametric features. The present invention also utilizes a probabilistic pairwise Markov Random Field algorithm to complement the result of EMPrAvISE (AUC=0.77) via the incorporation of spatial constraints.

1. Data Acquisition

A total of 12 pre-operative in vivo patient studies were obtained using a 3 Tesla Genesis Signa MRI machine at the Beth Israel Deaconess Medical Center. Each of the patients was diagnosed with CaP via examination of needle core biopsies, and scheduled for a radical prostatectomy. Prior to surgery, MR imaging was performed using an endo-rectal coil in the axial plane and included T2w, DCE, and DWI protocols. The DCE-MR images were acquired during and after a bolus injection of 0.1 mmol/kg of body weight of gadopentetate dimeglumine using a 3-dimensional gradient echo sequence with a temporal resolution of 1 min 35 sec. Two pre-contrast and 5 post-contrast sequential acquisitions were obtained. DWI imaging had B-values of 0 and 1000, with the number of directions imaged being 25, based on which an ADC map was calculated.

Prostatectomy specimens were subsequently sectioned and stained with Haematoxylin and Eosin (H & E) and examined by a trained pathologist to accurately delineate presence and extent of CaP. 39 corresponding whole mount histological sections (WMHS) and T2w MRI slices were automatically identified from these 12 studies, via a recently developed group-wise matching scheme (Xiao, G. et al, "Determining histology-MRI slice correspondences for defining MRI-based disease signatures of prostate cancer, "Computerized Medical Imaging and Graphics, 2011, 35(7): 568-578). The slice correspondences were then validated by a pathologist and radiologist working together.

2. Inter-Protocol Alignment of T2w, DCE, DWI MRI

T2w and ADC (from DWI) must be brought into spatial alignment with DCE MRI (denoted $C^{T1,t}=(C, f^{T1,t})$, where $f^{T1,t}(C)$ assigns an intensity value to every voxel $c \in C$ at time point t, $t \in \{1, \ldots, 6\}$), in order to facilitate analysis of all the data within the same frame of reference. This is done via volumetric affine registration (Chappelow, J. et al., "Elastic Registration of Multimodal Prostate MRI and Histology via Multi-Attribute Combined Mutual Information," Medical Physics, 2011, 38(4): 2005-2018) hence correcting for inter-acquisition movement and resolution differences between the MRI protocols. Stored DICOM image header information was used to determine relative voxel locations and sizes as well as slice correspondences between T2w, DCE, and ADC imagery.

Figure 9:
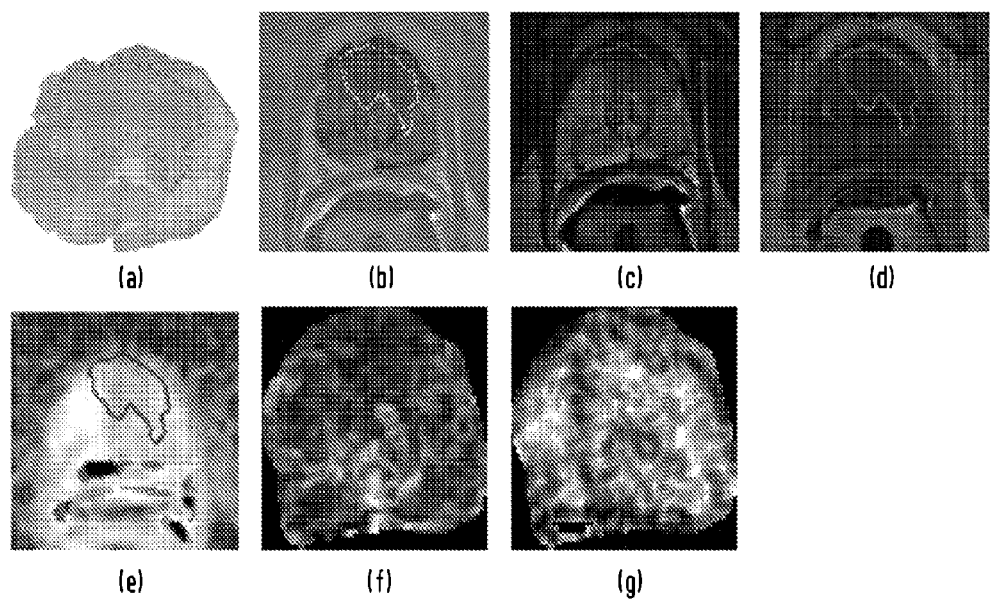
FIG. 9 shows MRI images chosen as being in slice correspondence for (a) original whole mount histological section (WMHS), showing CaP as dotted black outline, as determined by a pathologist; (b) overlay of deformed WMHS image $C^H$ (via MACMI) onto $C^{T2}$, allowing mapping of CaP extent (outlined as dotted curve in white); the corresponding T2w MR images shorn as corresponding co-registered multi-parametric MR images shown in (c) $C^{T2}$, (d) $C^{T1.5}$, and (e) $C^{ADC}$, with mapped CaP extent from (b) outlined in grey. Representative texture features (derived within the prostate ROI alone) are also shown in (f) $C^{T2}$ and (g) $C^{ADC}$. Note the improvement in image characterization of CaP compared to original intensity information in (c) and (e), respectively. (h) shows corresponding time (in seconds) vs. intensity (in intensity arbitrary units) curves for CaP (top curves) and benign (bottom curves) regions based on DCE MRI data. Note the differences in the uptake and wash-out characteristics between the top and bottom curves.
Figure 9:
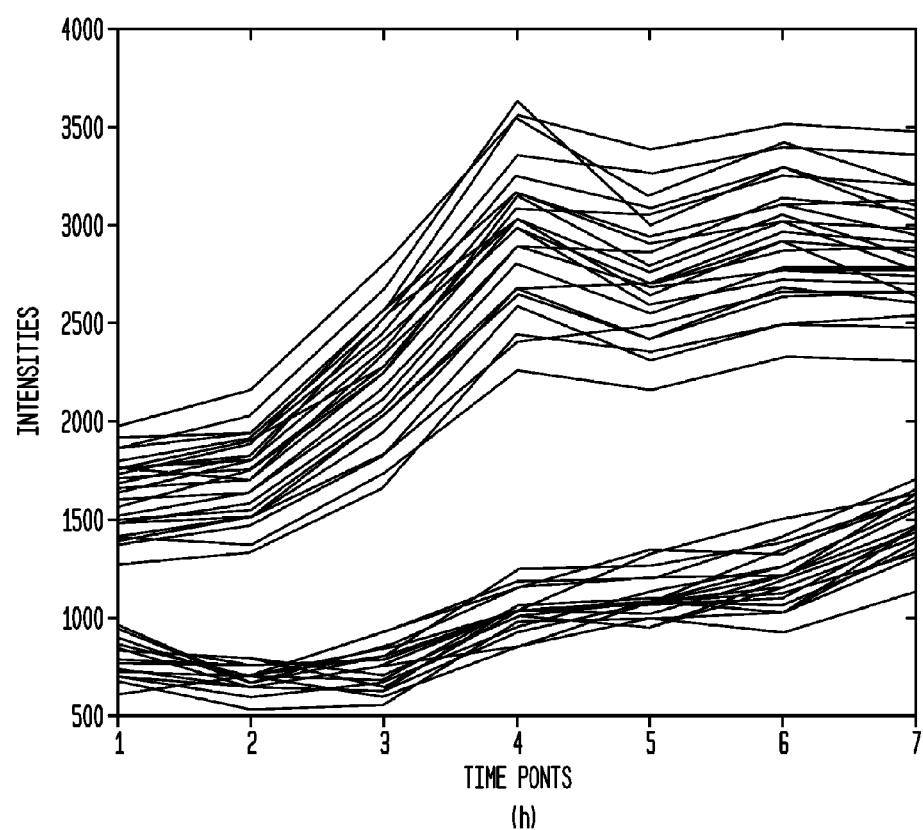

Post inter-protocol registration, the T2w MR image $C^{T2}=(C, f^{T2})$ and the corresponding ADC map $C^{ADC}=(C, f^{ADC})$ in alignment with images in $C^{T1,t}$ is obtained. Therefore, for every voxel $c \in C$, $f^{T2}(c)$ is the T2w MR image intensity value and $f^{ADC}(c)$ is the corresponding ADC value. All MRI data is analyzed at the DCE-MRI resolution (256×256 voxels). Known MRI intensity artifacts such as MR intensity inhomogeneity and non-standardness were then corrected for (Madabhushi, A. and Udupa, J., Medical Physics 33(9), 3426-34, 2006). FIG. 9 shows representative results of inter-protocol registration. The similarity in spatial alignment and resolution is presented in FIGS. 10(c)-(e).

3. Multi-Modal Registration of WMHS and MRI to Obtain "Ground Truth" CaP Extent

Registration of images from different modalities such as WMHS and MRI is complicated on account of the vastly different image characteristics of the individual modalities (Chappelow, J. et al., "Elastic Registration of Multimodal Prostate MRI and Histology via Multi-Attribute Combined Mutual Information," Medical Physics Accepted, 2010). For example, the appearance of tissue and anatomical structures (e.g. hyperplasia, urethra, ducts) on MRI and histology are significantly different (Bartolozzi, C. et al., European Radiology 6, 339-345, 1996).

These differences are further exacerbated due to histological processing on WMHS (uneven tissue fixation, gland slicing and sectioning result in duct dilation and tissue loss) and the use of an endo-rectal coil on MRI (causing gland deformation). This may cause registration based on traditional intensity-based similarity measures, such as MI, to fail (Chappelow, J. et al., "Elastic Registration of Multimodal Prostate MRI and Histology via Multi-Attribute Combined Mutual Information," Medical Physics, 2011, 38(4): 2005-2018).

Intensity information has been complemented previously with features derived by transformations of these intensities to drive multi-modal registration (Chappelow, J. et al, "COLLINARUS: Collection of Image-derived Non-linear Attributes for Registration Using Splines," in [Proc. SPIE], 7259, 2009; Anant Madabhushi, Jonathan Chappelow, Michael Feldman, John E. Tomaszewski, Combined Feature Ensemble Mutual Information Image Registration, application Ser. No. 12/593,651, Publication number: US 2010/0177944 A1).

Chappelow et al (Elastic Registration of Multimodal Prostate MRI and Histology via Multi-Attribute Combined Mutual Information," Medical Physics, 2011, 38(4): 2005-2018; Anant Madabhushi, Jonathan Chappelow, Michael Feldman, John E. Tomaszewski, Combined Feature Ensemble Mutual Information Image Registration, application Ser. No. 12/593,651, Publication number: US 2010/0177944 A1) leveraged the availability of multiple imaging protocols (T2w, DCE, DWI) to introduce complementary sources of information for registration via a novel image similarity measure, Multi-Attribute Combined MI (MACMI). MACMI was found to be capable of simultaneously encoding the information from multiple protocols within a multivariate MI formulation. It therefore has the ability to handle images that significantly vary in terms of intensities and deformation characteristics, such as for in vivo MRI and ex vivo WMHS. Additionally, it involves a simple optimization procedure whereby a sequence of individual image transformations is determined.

MACMI was implemented within an elastic registration framework, whereby the similarity measure is used to drive a set of free form deformations (FFDs) defined with a hierarchical grid size. This allows for local image transformations across multiple image resolutions. It is denoted that the transformed WMHS $C^H=(C, f^H)$, in alignment with $C^{T1,t}$, $C^{T2}$, $C^{ADC}$. CaP extent on $C^H$ then is mapped onto the DCE coordinate frame C, yielding the set of CaP voxels G(C) (surrogate ground truth CaP extent). A label to each voxel $c \in G(C)$, $Y(c)=1$ is assigned with $Y(c)=0$ otherwise.

FIG. 9(a) shows the original WMHS image (identified as being in correspondence with the T2w image FIG. 9(c), while FIGS. 10(c)-(e) show the corresponding results of spatially registering the WMH in (a) with the corresponding MRI protocols (T2w, DCE, DWI) via MACMI. As a result of image registration (FIG. 9(b)), the CaP extent (outlined in white on FIG. 9(b)) can be mapped from WMHS onto the corresponding multi-parametric MRI (CaP extent outlined in red on FIGS. 10(c)-(e).

4. Multi-Parametric Feature Extraction

The visual appearance of CaP on the different MRI protocols is summarized in Table 2 (based on radiologist and quantitative CAD-derived descriptors). A total of 5 image texture features were calculated from each of $C^{T2}$ as well as $C^{ADC}$. These include first and second order statistical features, as well as non-steerable gradient features. The extracted texture features and the corresponding intensity values were concatenated to form the feature vectors $F^{T2}(c)=[f^{T2}(c), f^{T2}_\phi(c)|\phi \in \{1, \ldots, 5\}]$ (from $C^{T2}$) and $F^{ADC}(c)=[f^{ADC}(c), f^{ADC}_\phi(c)|\phi \in \{1, \ldots, 5\}]$ (from $C^{ADC}$), associated with every voxel $c \in C$. Representative feature images derived from $C^{T2}$ and $C^{ADC}$ are shown in FIGS. 10(f) and (g).

The wash-in and wash-out of the contrast agent within the gland is characterized by varying intensity values across the time-point images $C^{T1,t}$, $t \in \{1, \ldots, 7\}$ (FIG. 9(h)). This time-point information is directly concatenated $F^{T1}(C)=[f^{T1,t}(C)|t \in \{1, \ldots, 6\}]$ associated with every voxel $c \in C$.

TABLE 2

Qualitative CaP appearance on multi-parametric MRI and corresponding quantitative features

| Qualitative appearance of CaP | Quantitative features extracted |
|---|---|
| T2w | distinctly quicker contrast enhancement of CaP compared to benign | 1st order statistics, Kirsch/Sobel (gradients) 2nd order co-occurrence (Haralick) |
| DCE | significantly low ADC compared to benign | Multi-time point intensity information |
| DWI | significantly low ADC compared to benign | ADC values, gradients 1st and 2nd order statistics |

TABLE 3

Different feature datasets and corresponding classifier strategies considered in this work for multi-parametric data analysis

| | Description | Data vectors | Classifier |
|---|---|---|---|
| Single Protocol | T2w | $F^{T2}(c) = [f^{T2}(c), f_\phi^{T2}(c)|\phi \in \{1, \ldots, 5\}]$ | $h^{T2}(c)$ |
| | DCE | $F^{T1}(c) = [f^{T1,t}(c), t \in \{1, \ldots, 6\}]$ | $h^{T1}(c)$ |
| | ADC | $F^{ADC}(c) = [f^{ADC}(c), f_\phi^{ADC}(c)|\phi \in \{1, \ldots 5\}]$ | $h^{ADC}(c)$ |
| Multi-parametric | Features | $F^{Feat}(c) = [F^{T2}(c), F^{T1}(c), F^{ADC}]$ | $h^{Feat}(c)$ |
| | EMPrAvISE | $F^{Em}(c) = [\tilde{e}_v(c)|v \in \{1, \ldots, n\}]$ | $h^{Em}(c), h_{MRF}^{Em}$ |

Every voxel c∈C was thus characterized by a number of different multi-parametric feature vectors (summarized in Table 3). For the purposes of comparing EMPrAvISE with an alternative data representation scheme, a multi-attribute vector $F^{Feats}(c)$ is also constructed by directly concatenating the individual T2w, DCE, and ADC attributes.

5. Constructing the Ensemble Embedding Representation of Multi-Parametric MRI Data The algorithm EMPrAvISE was applied to the feature vector $F^{Feats}(c) \in R^N$, N=18, $|R^N|=|C|$, i.e., for all voxels c∈C. F is denoted as the superset of all multi-parametric features, such that $|F|=N \cdot F = F_{T2} \cup F_{T1} \cup F_{ADC}$ where $F_{T2}, F_{T1}, F_{ADC}$ are feature sets associated with the individual T2w, DCE, ADC protocols respectively. Feature space perturbation was implemented by first forming M bootstrapped subsets of features $F_m \subset F$. These features were randomly drawn from F such that (1) $|F_u|=|F_v|=V$, (2) $F_u \cap F_v \neq .$, (3) each of N features appears in at least one $F_m$, and (4) one feature from each of $F_{T2}$, $F_{T1}$, $F_{ADC}$ appears in each $F_m$, where u, v, m∈{1, ..., M}. The feature space associated with each feature subset $F_m$ then was embedded in n-D space via GE (Shi, J. and Malik, J., Normalized Cuts and Image Segmentation," Pattern Analysis and Machine Intelligence, IEEE Transactions on 22(8), 888-905, 2000), yielding M corresponding weak embeddings $R_m^n$.

The corresponding M embedding strengths, $\psi^{ACC}(R_m^n)$, then were calculated based on the supervised classification accuracy of a probabilistic boosting tree classifier (PBT) (Tu, Z., "Probabilistic Boosting-Tree: Learning Discriminative Models for Classification, Recognition, and Clustering," in [Proc. IEEE ICCV], 1589-1596, 2005), using labels Y (c), ∀c∈C. A leave-one-out cross-validation approach was utilized in the training and evaluation of this PBT classifier. Embeddings with $\psi^{ACC}(R_m^n) > \theta$ then were selected as strong, and combined as described in Section 3. The final result of EMPrAvISE is the ensemble embedding vector $F^{Em}(c)=[e_v(c)|v \in \{1, \ldots, n\}] \in \tilde{R}^n$, ∀c∈C (n, the intrinsic dimensionality, is estimated via the technique presented in (Levina, E. and Bickel, P., "Maximum likelihood estimation of intrinsic dimension," in [Adv. NIPS], 17, 777-784, 2005).

6. Classification of Multi-Parametric MRI Via PBTs

A voxel-level probabilistic boosting tree classifier (PBT) classifier was constructed for each feature set, $F^\beta$ (c), β∈{T1, T2, ADC, Feats, Em}, ∀c∈C, considered in Table 3. The PBT algorithm has recently demonstrated success in the context of multi-modal data analysis (Tiwari, P. et al, "Spectral embedding based probabilistic boosting tree (ScEPTre): classifying high dimensional heterogeneous biomedical data," in [Proc. MICCAI], 12, 844-51, 2009) as it leverages a powerful ensemble classifier (Adaboost) in conjunction with the robustness of decision tree classifiers (Tu, Z., "Probabilistic Boosting-Tree: Learning Discriminative Models for Classification, Recognition, and Clustering," in [Proc. IEEE ICCV], 1589-1596, 2005) to allow for the computation of weighted probabilistic decisions for difficult to classify samples. The PBT classifier comprises the following main steps, 1. A tree structure of length L is iteratively generated in the training stage, where each node of the tree is boosted with T weak classifiers.

2. The hierarchical tree is obtained by dividing new samples into two subsets of $\hat{F}_{Right}^\beta$ and $\hat{F}_{Right}^\beta$, and recursively training the left and right sub-trees using Adaboost (Freund, Y. and Schapire, R., "A decision-theoretic generalization of on-line learning and an application to boosting," in [Proc. 2nd European Conf. Computational Learning Theory], 23-37, Springer-Verlag, 1995).

3. To solve for over-fitting, an error parameter Q is introduced such that samples falling in the range [0.5−ϵ, 0.5+ϵ] are assigned to both subtrees such that $p(Y(c)=1|F^\beta(c)) \to \hat{F}_{Right}^\beta$ (c) and $p(Y(c)=0|F^\beta(c)) \to \hat{F}_{Left}^\beta(c)$. The function $h^\beta(c)=p(Y(c)|F^\beta(c))$ represents the posterior class conditional probability of sample c belonging to class Y(c)∈{0, 1}, given the feature vector $F^\beta(c)$, β∈{T1, T2, ADC, Feats, Em}.

4. The PBT algorithm stops when the misclassification error (of Adaboost) hits a pre-defined threshold.

During testing, the conditional probability of the object c is calculated at each node based on the learned hierarchical tree. A discriminative model was obtained at the top of the tree by combining the probabilities associated with propagation of the object at various nodes, yielding a posterior conditional probability belonging to the cancer class, $h^\beta(c)=p(Y(c)=1|F^\beta(c))\in[0, 1]$, β∈{T1, T2, ADC, Feats, Em}, for every voxel c∈C.

7. Incorporating Spatial Constraints Via Markov Random Fields

The use of a novel probabilistic pairwise Markov model (PPMMs) to detect CaP lesions on prostate histopathology via the incorporation of spatial constraints to a classifier output. PPMMs was shown previously (Monaco, J. et al., "High-throughput detection of prostate cancer in histological sections using probabilistic pairwise Markov models," Medical Image Analysis 14(4), 617-629, 2010). PPMMs formulate Markov priors in terms of probability densities, instead of the typical potential functions (Potts, R., "Some generalized order-disorder transformations," in [Mathematical Proceedings of the Cambridge Philosophical Society], 48(01), 106-109 (1952).), facilitating the creation of more sophisticated priors. This approach is used to similarly impose spatial constraints to the classifier output (per-voxel), with the objective of accurately segmenting CaP lesions on MRI.

Performance Evaluation Measures $h_\rho^\beta(C)$ is defined herein as the binary prediction result for classifier $h^\beta(c)$ at each threshold $\rho \in [0, 1]$, such that $h_\rho^\beta(c)=1$ when $h^\beta(c) \geq \rho$, 0 otherwise; $\forall \beta \in \{T1, T2, ADC, Feats, Em\}$. For every scene C, threshold $\rho$, and classifier $h^\beta(c)$, the set of voxels identified as CaP is denoted $\Omega_\rho^\beta(C) = \{c | h_\rho^\beta(C)=1\}$, $c \in C$, $\forall \beta \in \{T1, T2, ADC, Feats, Em\}$. Then ROC analysis is performed by calculating the sensitivity (SN) and specificity (SP) of $\Omega_\rho^\beta(C)$ with respect to the corresponding ground truth CaP extent G(C), at every $\rho \in [0, 1]$.

A leave-one-out cross validation strategy over the 39 slices was used to evaluate the performance of each of the classifiers constructed (Table 3). An ROC curve is generated for each slice, each curve then corresponding to a single run of leave-one-out cross validation. These ROC curves are averaged by first fitting a smooth polynomial through each of the resulting 39 ROC curves. Mean and standard deviation of Area Under the ROC (AUC) values are then calculated. The operating point Θ on the ROC curve is defined as value of $\rho$ which yields detection SN, SP that is closest to 100% sensitivity and 100% specificity (the top left corner of the graph).

Example 3

Comparison of EMPrAvISE Against Individual Feature Based Classifiers

This Example provides a comparison of feature-based classifiers.

Figure 10:
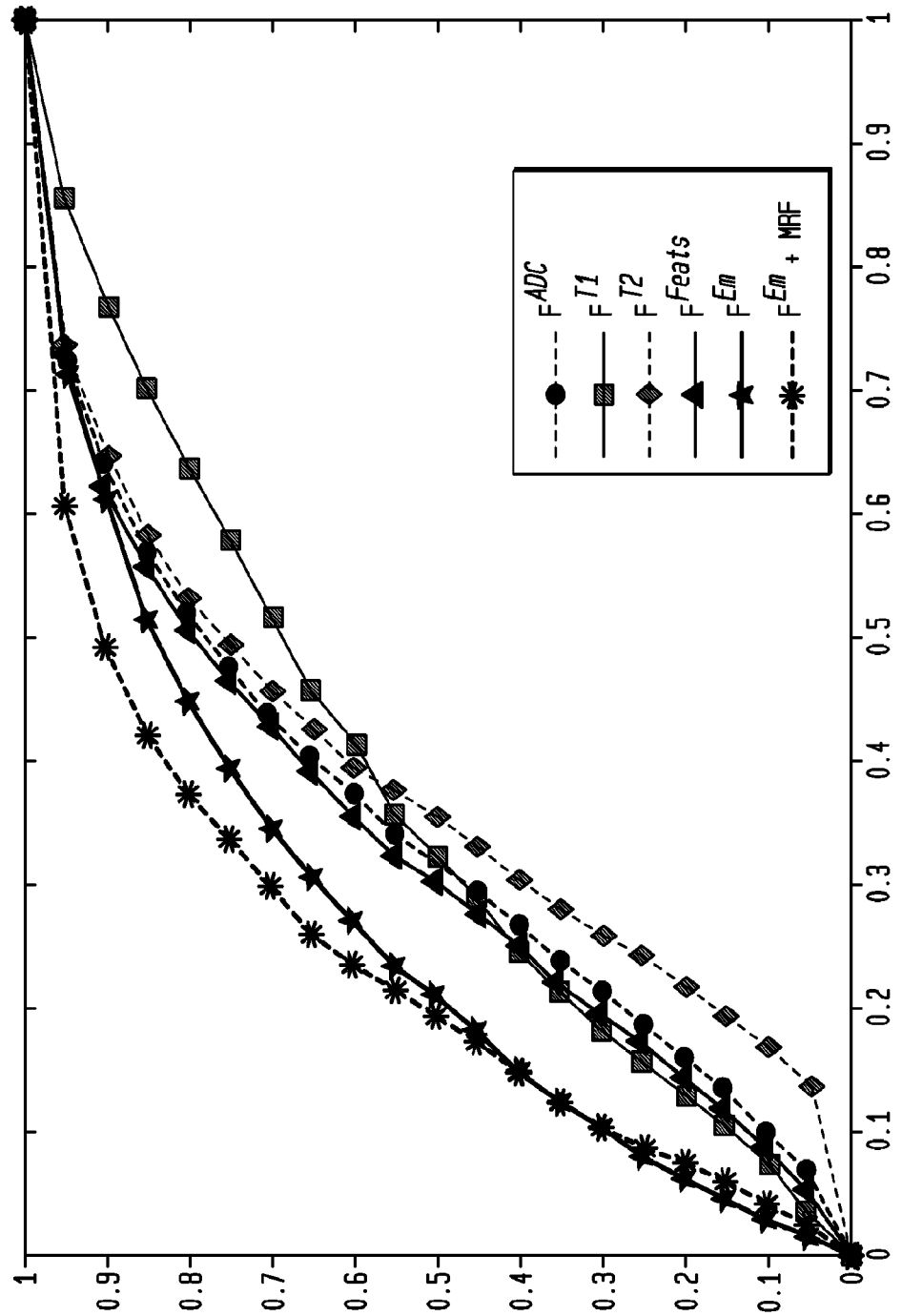
FIG. 10 shows average ROC curves plotting sensitivity (y-axis) vs. (1-specificity) (x-axis) across 39 leave-one-out cross validation runs. Different labeled ROC curves correspond to different classifiers. The best performing classifier was $h_{MRF}^{Em}$(c) ($F^{Em}$+MRF).

First, $h^{Em}$ (via EM PrAvISE) is compared against classifiers constructed using the different uni-modal feature sets corresponding to T2w, DCE, and DWI MRI data ($h^{T2}$, $h^{T1}$, $h^{ADC}$). FIG. 10 shows average ROC curves across 39 leave-one-out cross-validation runs, for the different classifier strategies in Table 3. Table 4 summarizes average and standard deviation of AUC and accuracy values for different classifiers averaged over the 39 leave-one-out cross-validation runs, for the different classifier strategies in Table 3. As can be gleaned from Table 4, $h^{Em}$ yields a higher classification accuracy and AUC compared to $h^{T2}$, $h^{T1}$, or $h^{ADC}$.

TABLE 4

Summary of average and standard deviation of AUC and accuracy values for different classifiers averaged over the 39 leave-one-out cross-validation runs, for the different classifier strategies in Table 3.

| Classifier | AUC | Accuracy |
|---|---|---|
| $h^{T2}$ | 0.62 ± 0.22 | 0.58 ± 0.19 |
| $h^{T1}$ | 0.62 ± 0.14 | 0.61 ± 0.12 |
| $h^{ADC}$ | 0.65 ± 0.21 | 0.62 ± 0.19 |
| $h^{Feats}$ | 0.67 ± 0.21 | 0.63 ± 0.19 |
| $h^{Em}$ | 0.73 ± 0.13 | 0.70 ± 0.10 |
| $h_{MRF}^{Em}$ ($h^{Em}$ + MRF) | 0.77 ± 0.16 | 0.76 ± 0.12 |

Example 4

Comparison of EMPrAvISE Against Multi-Modal Classifier Strategies

This Example provides a comparison of EMPrAvISE against multi-modal classifier strategies.

Figure 11:
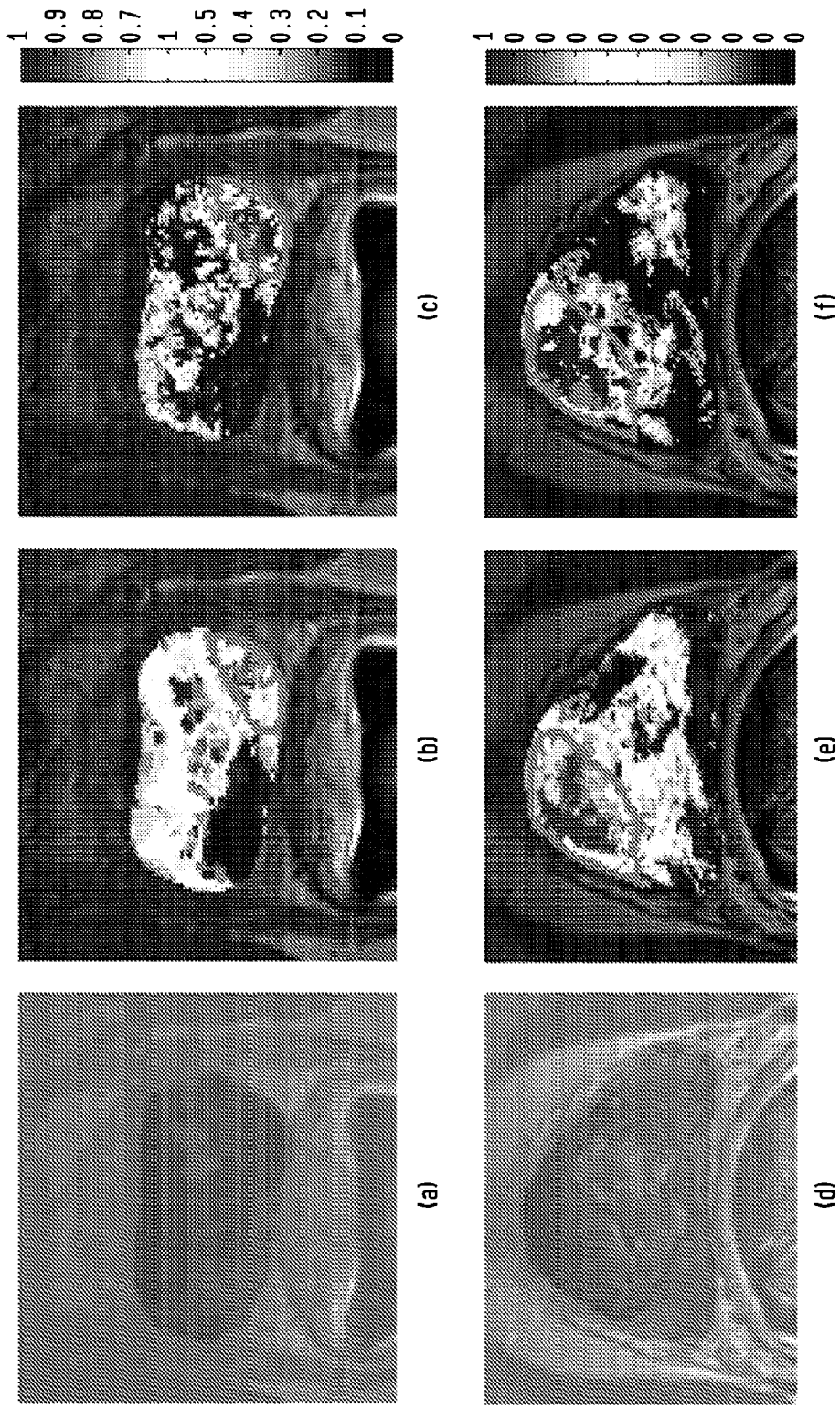
FIG. 11 shows representative results for 2D slices from 2 different studies (on each row). (a), (d) CaP extent outline delineated on WMHS-T2w MRI overlay (via MACMI). Probability heatmaps are shown for (b), (e) $h^{Feats}$, and (c), (f) $h^{Em}$. On each probability heatmap, regions in grey correspond to a higher probability of CaP presence, and the mapped CaP extent (from WMHS) is delineated. Note that EMPrAvISE ((c), (f)) is far more accurate, with significantly fewer false positives and false negatives compared to either of (b), (e).

In the described invention, the performance of $h^{Em}$ with $h^{Feats}$ is compared. Qualitative comparisons of the probability heatmaps so obtained are shown in FIG. 11 (where dark grey corresponds to a higher probability of CaP presence and light grey corresponds to lower CaP probabilities). The ground truth spatial extent of CaP obtained by mapping disease extent from WMH onto MR imaging is outlined in grey in FIGS. 12(a) and (d). It can be seen that $h^{Em}$ (FIGS. 12(c) and (f)) shows significantly more accurate and specific predictions of CaP presence compared to $h^{Feats}$ (FIGS. 12(b) and (e)). This is also reflected in the quantitative evaluation, with $h^{Em}$ resulting in an AUC of 0.73 (FIG. 5(a)) compared to an AUC of 0.67 for $h^{Feats}$ (FIG. 5(a)). Additionally, it can be observed that classification based on multi-parametric integration ($h^{Feats}$, $h^{Em}$) outperforms classification based on the individual protocols ($F^{T1}$, $F^{T2}$, $F^{ADC}$). The quantitative results corroborate findings in the clinical literature, which suggest that the combination of multiple imaging protocols yield superior diagnostic accuracy compared to any single protocol (Kitajima, K. et al., J Magn Reson Imaging 31(3), 625-631, 2010; Kurhanewicz, J. et al, Curr Opin Urol 18(1), 71-77, 2008; Chen, M. et al., Acta Radiol 49(5), 602-10, 2008).

Example 5

Comparison of EMPrAvISE Against Multi-Modal Classifier Strategies

This Example provides a comparison of EMPrAvISE against multi-modal classifier strategies.

Figure 12:
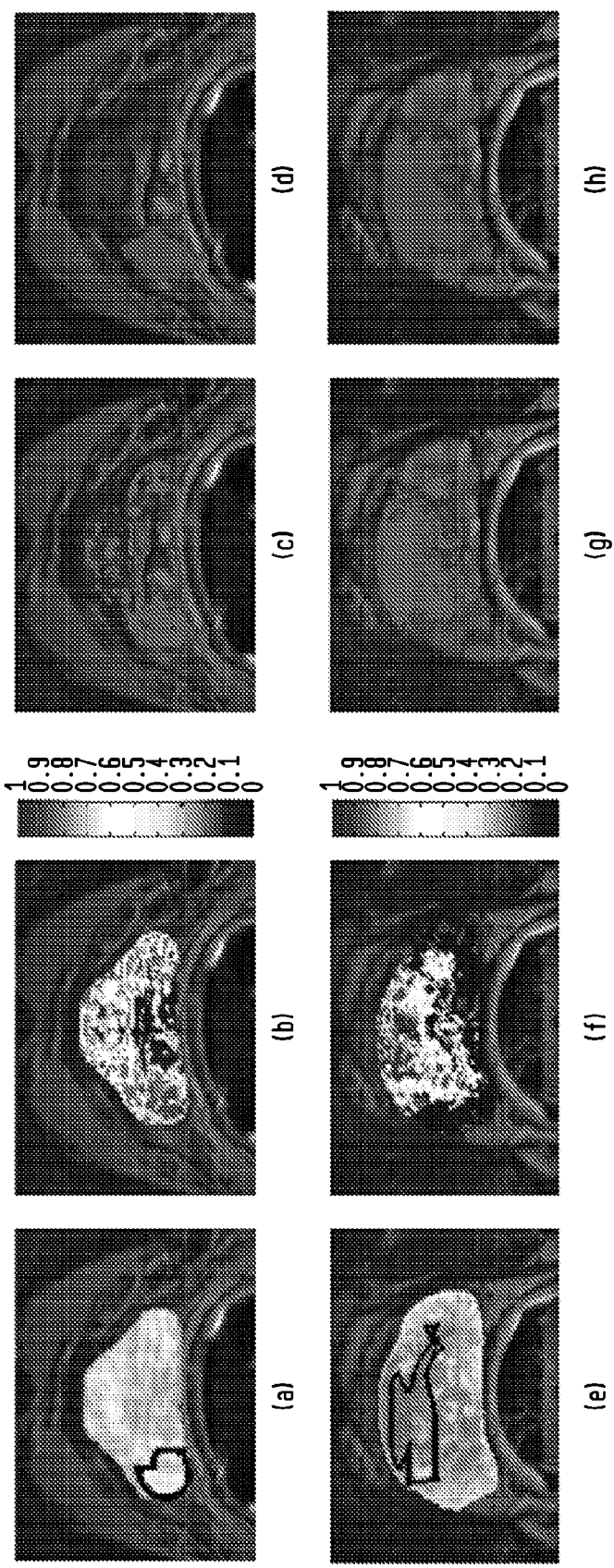
FIG. 12 shows (a), (e) RGB representation of the ensemble embedding (calculated via EMPrAvISE) with the CaP ground truth region superposed in black (obtained via registration with corresponding WMHS). (b), (f) Probability heatmap for $h^{Em}$, where grey corresponds to a higher probability for presence of CaP. Note the significantly higher accuracy and specificity of CaP segmentation results via application of MRFs in (d), (h) $\Omega_{MRF,\Theta}$ (C) compared to (c), (g) (C) $\Omega_{\Theta}^{Em}$(C) (obtained by thresholding the heatmaps in (b), (f) at the operating point threshold a).

FIG. 12 illustrates results of applying MRFs to the probability heatmaps obtained via EMPrAvISE ($h^{Em}$) to yield $h_{MRF}^{Em}$. At the operating point of the ROC curve, $\Omega_\Theta^{Em}(C)$ can be seen to have a number of extraneous regions (FIGS. 13(c) and (g)). In contrast, $\Omega_{MRF,\Theta}^{Em}(C)$ results in a more accurate and specific CaP detection result (FIGS. 13(d) and (h)). Also shown are RGB color map representations based on scaling the values in $\tilde{e}_1(c)$, $\tilde{e}_2(c)$, $\tilde{e}_3(c)$ (from $F_{Em}(c)$) into the RGB colorspace (FIGS. 13(a), (e)). Similarly colored regions are those that are similar in the ensemble embedding space $\tilde{R}^n$. Note relatively uniform coloring within ground truth CaP areas in FIGS. 6(a) and (e), suggesting that EMPrAvISE is able to accurately represent the data in a reduced dimensional space while preserving disease-pertinent information.

The ROC curves in FIG. 10 further d detection accuracy via $h_{MRF}^{Em}$ light blue curve, AUC=0.77). These improvements in AUC and classification accuracy were found to be statistically significant (p<0.01) in a paired two-tailed Students' t-test across the 39 leave-one-out cross validation runs (Table 4), with the null hypothesis being that no improvement was offered by $h_{MRF}^{Em}$.

TABLE 4 p values for a paired Students t-test comparing the improvement in CaP detection performance (in terms of AUC and accuracy) of $h_{MRF}^{Em}$ over $h^{T2}, h^{T1}, h^{ADC}, h^{Feats}, h^{Em}$, respectively. Improvements in accuracy and AUC for $h_{MRF}^{Em}$ were found to be statistically significantly better (p < 0.01) compared to each of $h^{T2}, h^{T1}, h^{ADC}, h^{Feats}, h^{Em}$, respectively; the null hypothesis being that no improvement was seen via $h^{Em}$ in each comparison.

|  | $h^{T2}/h_{MRF}^{Em}$ | $h^{T1}/h_{MRF}^{Em}$ | $h^{ADC}/h_{MRF}^{Em}$ | $h^{Feats}/h_{MRF}^{Em}$ | $h_{Em}/h_{MRF}^{Em}$ |
| --- | --- | --- | --- | --- | --- |
| AUC | 2.15e−07 | 1.40e−05 | 1.33e−04 | 5.86e−06 | 2.43e−04 |
| Accuracy | 9.64e−08 | 3.16e−08 | 1.89e−05 | 3.32e−05 | 3.32e−05 |

EQUIVALENTS

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed is:

1. A method for analyzing multimodal data derived from a biological sample, comprising:
    (a) inputting, via a computing device, the multimodal data comprising a plurality of data;
    (b) generating, via the computing device, a plurality of quantitative descriptors in the multimodal data;
    (c) constructing, via the computing device, a higher dimensional multi-parametric feature space using the plurality of quantitative descriptors;
    (d) reducing, via the computing device, the higher dimensional multi-parametric feature space to a lower dimensional ensemble embedding by an ensemble embedding method comprising:
        (i) generating, via the computing device, a plurality of base embeddings derived from the higher dimensional multi-parametric feature space, wherein the plurality of base embeddings comprise weak embeddings and strong embeddings;
        (ii) calculating, via the computing device, an embedding strength for each base embedding;
        (iii) selecting, via the computing device, a plurality of the strong embeddings, wherein the embedding strength of each strong embedding is greater than a pre-specified threshold value;
        (iv) constructing, via the computing device, the lower dimensional ensemble embedding by:
            (1) quantifying, via the computing device, a plurality of pair-wise relationships for all quantitative descriptors in each strong embedding in step (iii) via a Euclidean pair-wise distance method;
            (2) normalizing, via the computing device, the plurality of pair-wise relationships to yield a plurality of normalized relationships;
            (3) propagating, via the computing device, the plurality of normalized relationships by a projection method; and
            (4) obtaining, via the computing device, the lower dimensional ensemble embedding;
        (v) optimizing, via the computing device, the generating a plurality of independent embeddings step (i), the calculating an embedding strength step (ii), the select-ing a plurality of strong embeddings step (iii), and the constructing the lower dimensional ensemble embedding step (iv); and
    (e) obtaining, via the computing device, a classification for the biological sample based on the ensemble embedding; and
    (f) outputting, via the computing device, the classification for the biological sample.

2. The method according to claim 1, wherein the multimodal data is an image.

3. The method according to claim 2, wherein the image is selected from the group consisting of a magnetic resonance imaging (MRI) image, a positron emission tomography (PET) image, a single-photon emission computed tomography (SPECT) image, an ultrasound image, an x-ray image, a computed tomography (CT) image, a micro-array image, and a gene expression image.

4. The method according to claim 1, wherein the quantitative descriptor is a pixel.

5. The method according to claim 1, wherein the plurality of base embeddings is generated using space perturbation method comprising:
    (1) generating, via the computing device, a plurality of boostrapped feature sub-sets from each quantitative descriptor of the plurality of quantitative descriptors contained within the higher dimensional multi-parametric feature space; and
    (2) embedding, via the computing device, a feature space associated with each bootstrapped feature subset of the plurality of boostrapped feature sub-sets into the higher dimensional multi-parametric feature space to create the plurality of independent embeddings.

6. The method according to claim 1, wherein the plurality of base embeddings is generated by implementing Algorithm CreateEmbed, as given below:

```
Input: °F(c) R" for all objects c ∈ C, η
Output: X (c) ∈ R_m", m ∈ {1, . . . , M}
Data Structures: Feature subsets η"_m, total number of subsets M,
number of features in each subset V, DR method Φ
begin
    0.   for m = 1 to M do
    1.       Select V < N features from R", forming subset ηm;
    2.       Calculate X_m (c) ∈ R_m", m for all c ∈ C using n_m and
             method Φ;
    3.   end for
End.
```

7. The method according to claim 1, wherein the plurality of base embeddings is generated by implementing Algorithm (CreateWeakEmbed) as follows:

| Algorithm CreateWeakEmbed |
| --- |
| Input: °F(c) ∈ F(c) R$^n$ for all objects RN for all objects c ∈ C, η<br>Output: X$_m$ (c) ∈ R$_m$$^n$, m ∈{1, . . . , M}<br>Data Structures: Feature subsets F$_m$., total number of subsets M, number of features in each subset V begin<br>   0.   for m = 1 to M do<br>   1.   Select V < N features from R$^N$, forming subset F$_m$;<br>   2.   Calculate X$_m$ (c) ∈ R$_m$$^n$, for all c ∈ C via GE of the feature space associated with each F$_m$;<br>   3.   endfor<br>End. |

8. The method according to claim 1, wherein the plurality of strong embeddings are selected by implementing Algorithm SelErnbed, as follows:

| Algorithm SelEmbed |
| --- |
| Input: X$_m$ (c) ∈ R$_m$$^n$, for all objects c ∈ {1, . . . , M}<br>Output: X$_m$ (c) ∈ R$_m$$^n$, k ∈{1, . . . , K}<br>Data Structures: A list Q, embedding strength function ψ$^{ES}$, embedding strength threshold θ<br>begin<br>   0.   for m = 1 to M do<br>   1.   Calculate ψ$^{ES}$ (R$_m$$^n$,);<br>   2.   If ψ$^{ES}$ (R$_m$$^n$,) > θ;<br>   3.   Put m in Q;<br>   4.   endif<br>   5.   endfor<br>   6.   For each element k of Q, store X$_k$ (c) ∈ R$_m$$^n$, for all objects c ∈ C;<br>End. |

9. The method according to claim 1, wherein the lower dimensional embedding is constructed by implementing Algorithm CalcEnsembleEmbed:

| Algorithm CalcEnsembleEmbed |
| --- |
| Input: X$_k$ (c) ∈ R$_m$$^n$, for all objects c ∈ C; k ∈ {1, . . . , k}<br>Output: X (c) = R$^N$<br>Data Structures: Confusion matrix W, ML estimator, Ω, projection method γ<br>begin<br>   0.   for k k = 1 to k do<br>   1.   Calculate W$_k$ (i, j) ‖ X$_k$ (d) ‖$_2$ for all objects c, d ∈ C with indices i, j<br>   2.   endfor<br>   3.   Apply normalization to all W$_k$, k ∈ {1, . . . , k}<br>   4.   Obtain ω (i, j) = Ω [W_k (i, j)] ∀ c, d ∈ C;<br>   5.   Apply projection method γ to w to obtain final ensemble embedding R$^N$;<br>End. |

10. The method according to claim 1, wherein the biological sample is derived from a diseased tissue.

11. The method according to claim 10, wherein the diseased tissue is a cancer tissue.

12. The method according to claim 11, wherein the cancer is selected from the group consisting of a brain cancer, a prostate cancer, a breast cancer, a pancreatic cancer, a colon cancer, a leukemia, a lymphoma, a myeloma, a ovarian cancer, a skin cancer, a lung cancer, and a renal-cell cancer.

13. A method for analyzing multimodal data derived from a biological sample by a multi-protocol analysis using an intelligent supervised embedding (EMPrAvISE) scheme, comprising:

(a) inputting, via a computing device, the multimodal data, wherein the multimodal data comprises a plurality of data;

(b) generating, via the computing device, a plurality of voxels in the multimodal data;

(c) assigning, via the computing device, an intensity value to each voxel in the multimodal data;

(d) registering, via the computing device, the plurality of data to create a plurality of registered data, such that the plurality of registered data have the same spatial frame as a reference datum, and computing a ground truth extent of disease for each voxel;

(e) extracting from the plurality of registered data, via the computing device, a plurality of features and computing a plurality of quantitative descriptors corresponding to the plurality of features;

(f) fusing, via the computing device, the plurality of quantitative descriptors to create a plurality of ensemble embeddings by:

(i) constructing, via the computing device, a higher dimensional multi-parametric feature space using the plurality of quantitative descriptors;

(ii) computing, via the computing device, a plurality of pair-wise relationships for all quantitative descriptors of the plurality of quantitative descriptors in the higher dimensional multi-parametric feature space via a Euclidean pairwise distance method and storing the plurality of pair-wise relationships in a confusion matrix;

(iii) generating, via the computing device, a plurality of independent embeddings derived from the higher dimensional multi-parametric feature space, wherein the plurality of independent embeddings comprise weak embeddings and strong embeddings;

(iv) computing, via the computing device, an embedding strength for each independent embedding;

(v) selecting, via the computing device, a plurality of strong embeddings from the plurality of independent embeddings, wherein the embedding strength of each strong embedding is greater than a pre-specified threshold value and wherein a pair-wise relationship between two quantitative descriptors in the higher dimensional multi-parametric feature space is preserved in each strong embedding;

(vi) computing, via the computing device, a maximum likelihood estimate (MLE) of a probability distribution of each pair-wise relationship of the plurality of pairwise relationships in step (v) over the plurality of independent embeddings in the higher dimensional multi-parametric feature space to create a plurality of maximum likelihood estimates (MLEs) corresponding to the plurality of pairwise relationships, and storing the plurality of maximum likelihood estimates (MLEs) in an ensemble matrix; and (vii) computing, via the computing device, the plurality of ensemble embeddings by a multi-dimensional scaling method, wherein each pair-wise relationship in each ensemble embedding equals the corresponding maximum likelihood estimate (MLE) of the pair-wise relationship in the ensemble matrix;

(g) classifying, via the computing device, the biological sample into a disease class; and (h) outputting, via the computing device, the disease class.

14. The method according to claim 13, wherein the multimodal data is an image.

15. The method according to claim 14, wherein the image is selected from the group consisting of a magnetic resonance imaging (MRI) image, a positron emission tomography (PET) image, a single-photon emission computed tomography (SPECT) image, an ultrasound image, an x-ray image, a computed tomography (CT) image, a micro-array image, and a gene expression image.

16. The method according to claim 15, wherein the disease is a cancer.

17. The method according to claim 16, wherein the cancer is selected from a breast cancer, a prostate cancer, a brain cancer, a pancreatic cancer, a colon cancer, a leukemia, a lymphoma, a myeloma, a ovarian cancer, a skin cancer, a lung cancer, and a renal-cell cancer.

\* \* \* \* \*